(12) United States Patent
Nishimura et al.

(10) Patent No.: US 9,067,789 B2
(45) Date of Patent: *Jun. 30, 2015

(54) NITROGEN-FREE OZONE GENERATION UNIT AND OZONE GAS SUPPLY SYSTEM

(75) Inventors: Shinichi Nishimura, Tokyo (JP);
Yoichiro Tabata, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/110,828

(22) PCT Filed: Apr. 13, 2011

(86) PCT No.: PCT/JP2011/059164
§ 371 (c)(1),
(2), (4) Date: Oct. 9, 2013

(87) PCT Pub. No.: WO2012/140747
PCT Pub. Date: Oct. 18, 2012

(65) Prior Publication Data
US 2014/0030152 A1     Jan. 30, 2014

(51) Int. Cl.
*C01B 13/11*     (2006.01)

(52) U.S. Cl.
CPC ............ *C01B 13/11* (2013.01); *C01B 2201/12* (2013.01); *C01B 2201/64* (2013.01); *C01B 2201/66* (2013.01); *C01B 2201/76* (2013.01); *C01B 2201/90* (2013.01)

(58) Field of Classification Search
USPC ............... 422/186.12, 186.1, 186.14, 186.07, 422/186.2
See application file for complete search history.

(56) References Cited

U.S. PATENT DOCUMENTS

| | | | |
|---|---|---|---|
| 4,954,321 | A | 9/1990 | Jensen |
| 5,942,196 | A | 8/1999 | Tabata et al. |
| 2001/0007645 | A1* | 7/2001 | Honma ............... 422/186.09 |
| 2003/0133854 | A1 | 7/2003 | Tabata et al. |
| 2006/0049738 | A1 | 3/2006 | Tabata et al. |

(Continued)

FOREIGN PATENT DOCUMENTS

| | | |
|---|---|---|
| CN | 1774394 A | 5/2006 |
| CN | 101389387 A | 3/2009 |

(Continued)

OTHER PUBLICATIONS

International Search Report Issued Aug. 9, 2011 in PCT/JP11/59164 Filed Apr. 13, 2011.

(Continued)

*Primary Examiner* — Kishor Mayekar
(74) *Attorney, Agent, or Firm* — Oblon, McClelland, Maier & Neustadt, L.L.P.

(57) ABSTRACT

A gas pipe integrated block includes a plurality of internal pipe paths. The plurality of internal pipe paths are connected to a nitrogen-free ozone generator in which a photocatalytic material for generating ozone is applied to a discharge surface, a controller (an MFC, a gas filter, and an APC), a raw material gas supply port, and an ozone gas output port. Thereby, a raw material gas input pipe path extending from the raw material gas supply port through the APC to the nitrogen-free ozone gas generator, and an ozone gas output pipe path extending from the nitrogen-free ozone generator through the gas filter and the MFC to the ozone gas output port, are formed in an integrated unit.

8 Claims, 28 Drawing Sheets

(56) References Cited

U.S. PATENT DOCUMENTS

| | | |
|---|---|---|
| 2007/0020160 A1 | 1/2007 | Berkman et al. |
| 2008/0251012 A1 | 10/2008 | Tabata et al. |
| 2010/0162752 A1 | 7/2010 | Tabata et al. |

FOREIGN PATENT DOCUMENTS

| | | |
|---|---|---|
| CN | 101878182 A | 11/2010 |
| JP | 10 025104 | 1/1998 |
| JP | 2003 089508 | 3/2003 |
| JP | 2003 212517 | 7/2003 |
| JP | 2009/500855 | 1/2009 |
| TW | 1 263 617 | 10/2006 |
| WO | 2005/080263 | 9/2005 |
| WO | WO 2007/008561 A2 | 1/2007 |
| WO | WO 2007/008561 A3 | 1/2007 |
| WO | 2011 065087 | 6/2011 |
| WO | 2011 065088 | 6/2011 |
| WO | WO 2012/127670 A1 | 9/2012 |

OTHER PUBLICATIONS

Taiwanese Office Action Issued Jul. 19, 2013 in corresponding Taiwanese Patent Application No. 100121781(with partial English translation).

Search Report Issued in Taiwanese Patent Application No. 095120608.

International Preliminary Report on Patentability and Written Opinion issued Oct. 24, 2013, in PCT/JP2011/059164 filed Apr. 13, 2011 with English translation.

European Search Report issued Sep. 11, 2014 in European Patent Application No. 11 86 3582.

Search Report issued Nov. 2, 2014 in Chinese Patent Application No. 2011800700041 (with partial English translation).

\* cited by examiner

F I G . 2
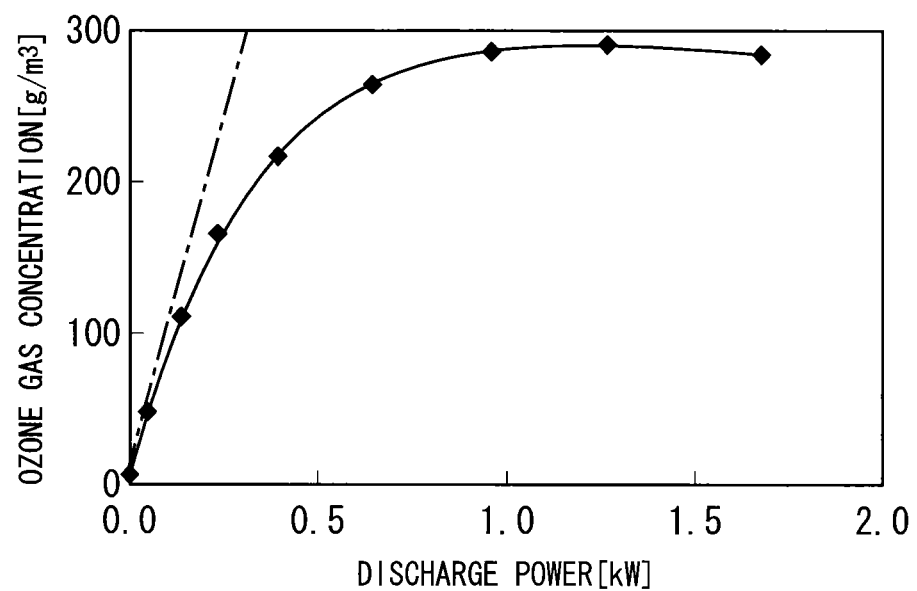

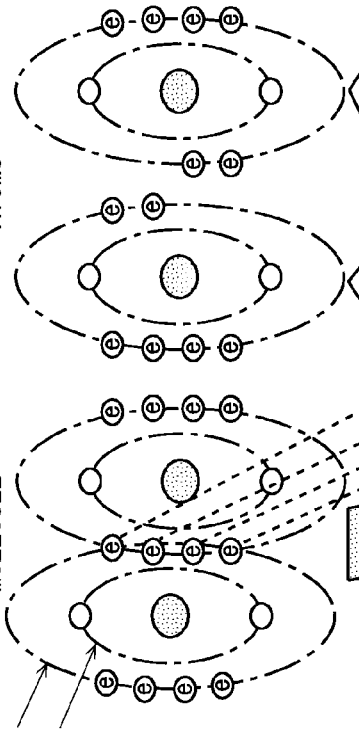
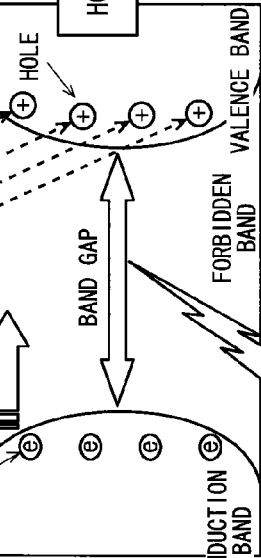
FIG. 3

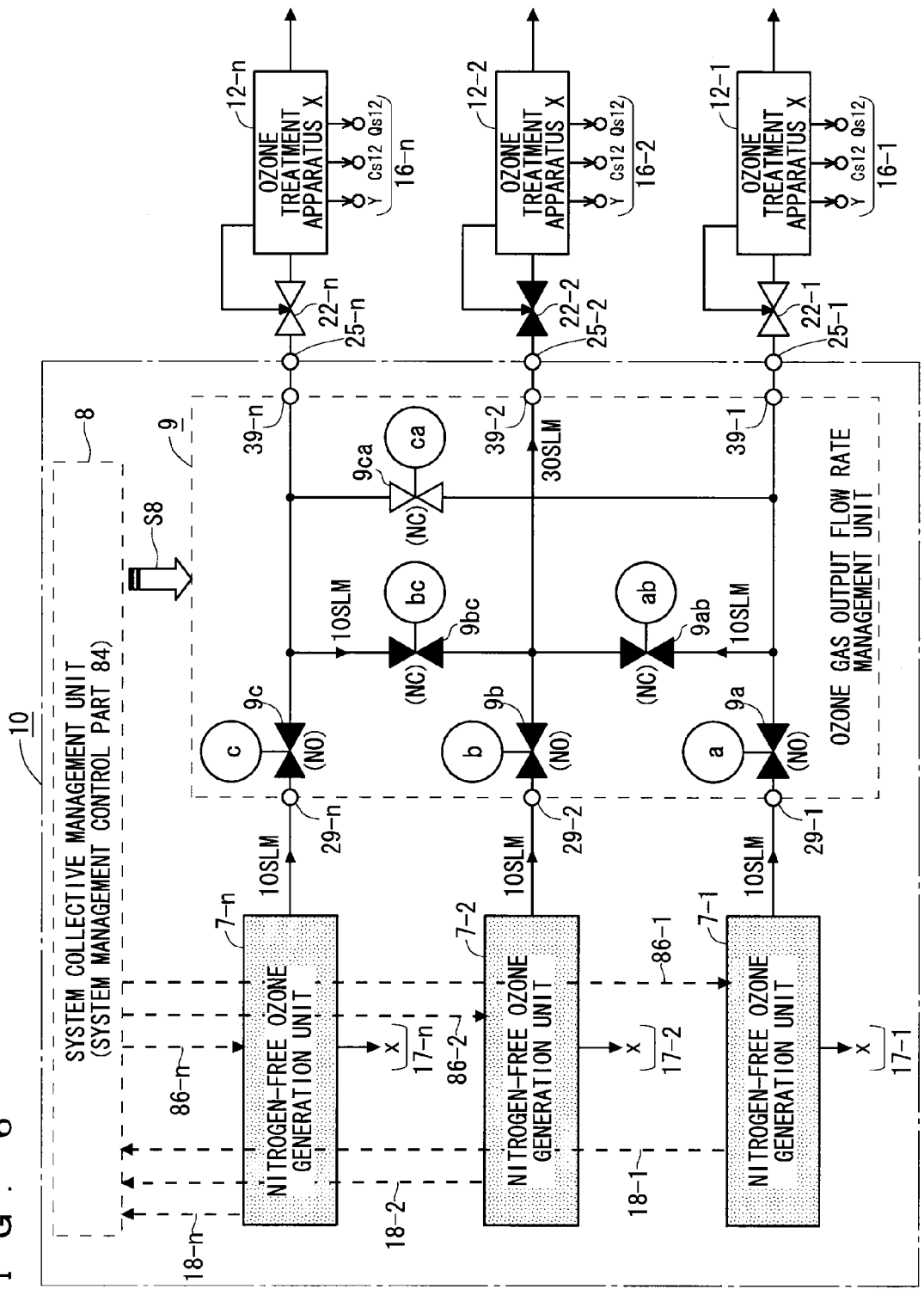
F I G. 6

F I G. 7

85

| UNIT INFORMATION 18 \ (OPERATION INFORMATION Y) USER INFORMATION 17 | OZONE TREATMENT APPARATUS 12-n | | OZONE TREATMENT APPARATUS 12-2 | | OZONE TREATMENT APPARATUS 12-1 | |
|---|---|---|---|---|---|---|
| OZONE GENERATION UNIT 7-n | 9c (NO) | OPEN | 9bc (NC) | OPEN CLOSE | 9ca (NC) | OPEN CLOSE |
| OZONE GENERATION UNIT 7-2 | 9bc (NC) | OPEN | 9b (NO) | OPEN CLOSE | 9bc (NC) | OPEN CLOSE |
| OZONE GENERATION UNIT 7-1 | 9ca (NC) | OPEN | 9ab (NC) | OPEN CLOSE | 9c (NO) | OPEN CLOSE |
| REQUEST OZONE FLOW RATE Qs12 (SLM) | — | | 30 | | — | |
| REQUEST OZONE CONCENTRATION Cs12 (g/m3) | — | | 280 | | — | |

F I G . 9
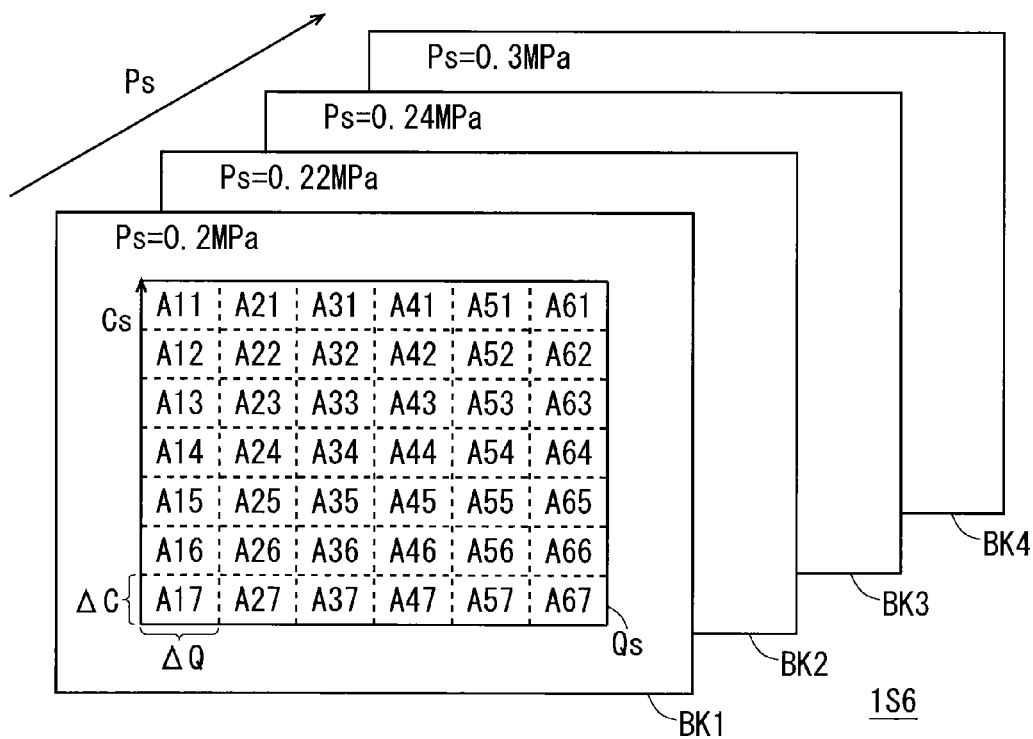

FIG. 10
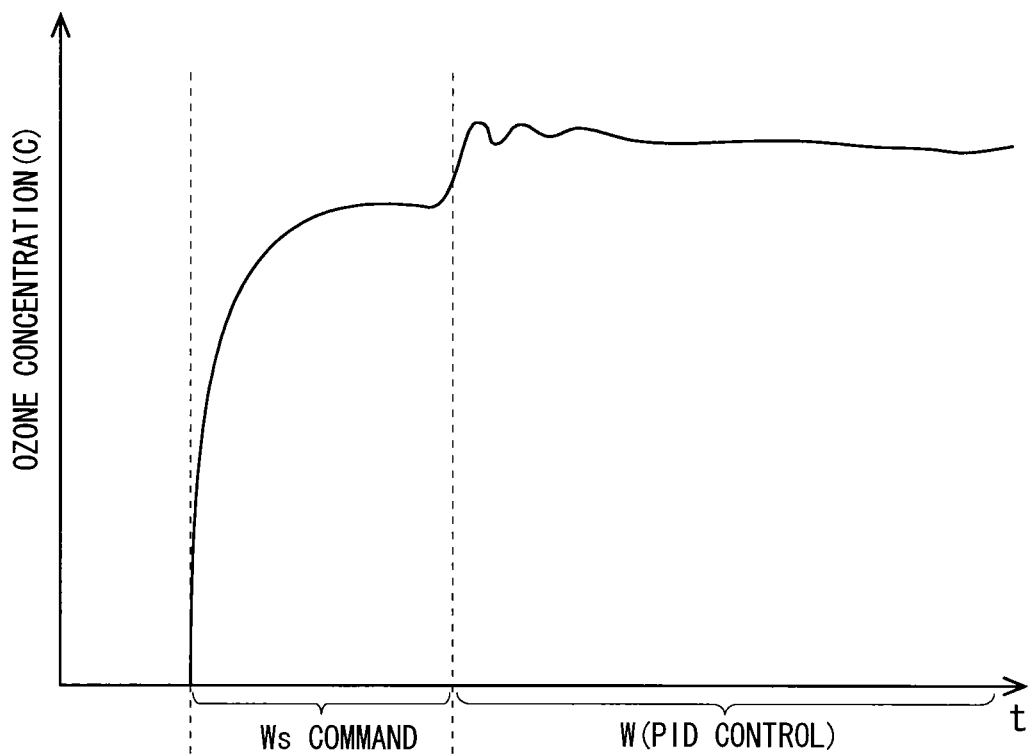
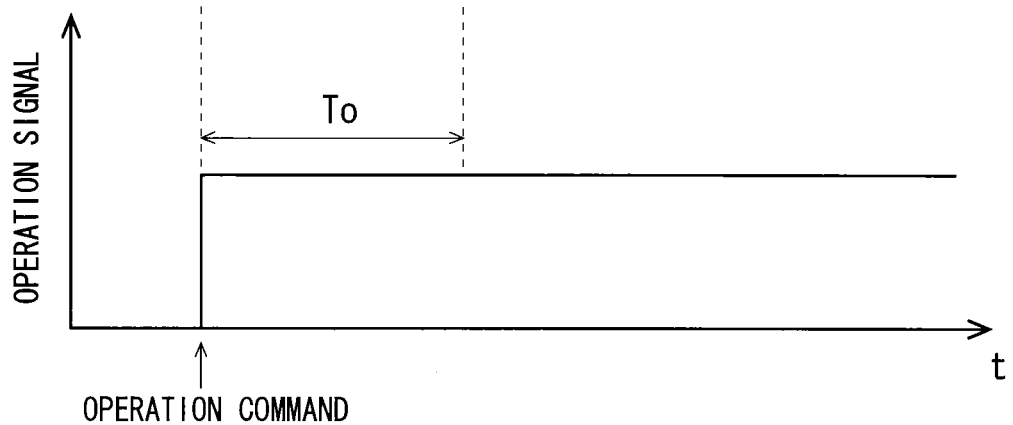

F I G . 1 8
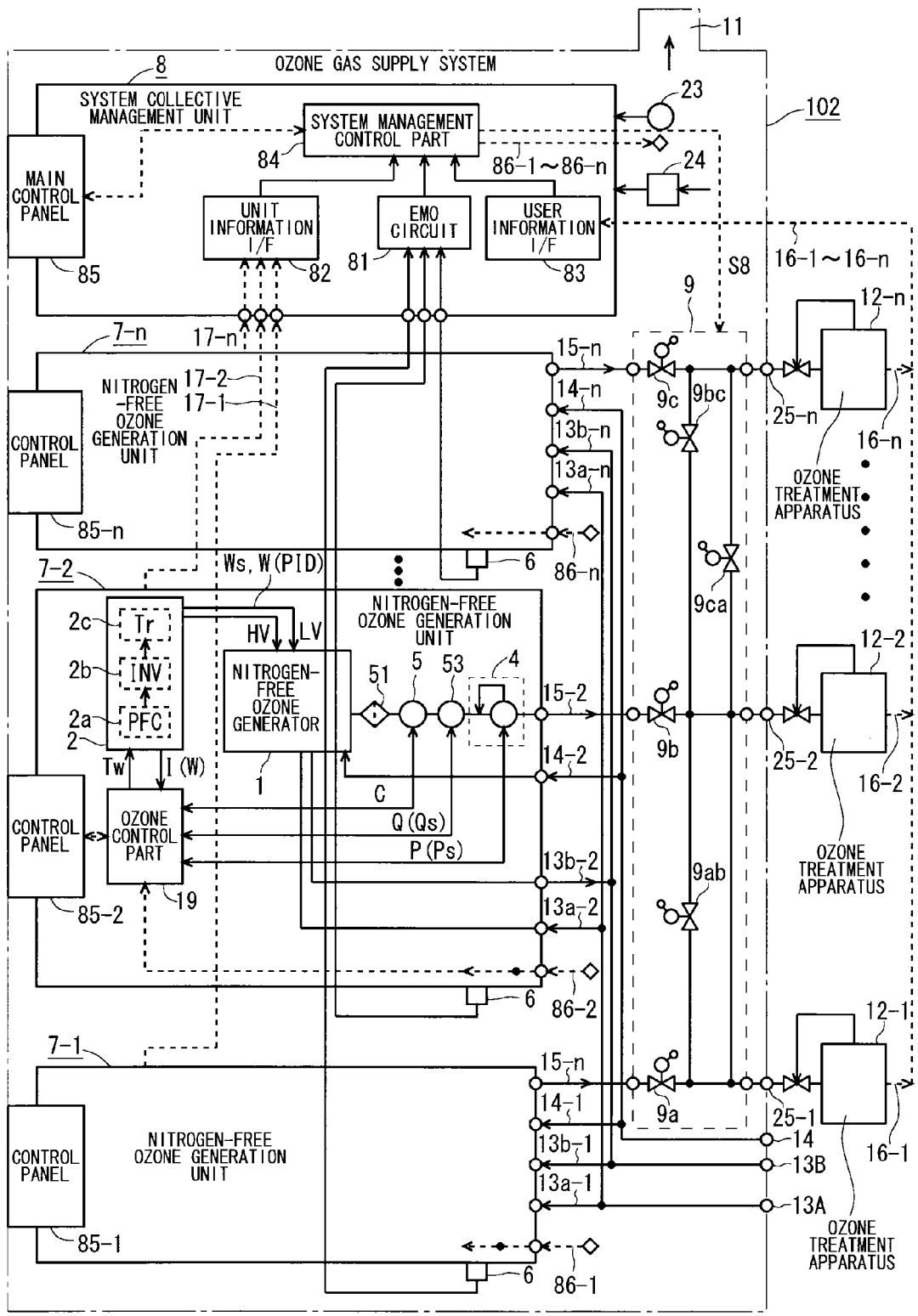

NITROGEN-FREE OZONE GENERATION UNIT AND OZONE GAS SUPPLY SYSTEM

TECHNICAL FIELD

The present invention relates to an ozone gas supply system that includes a nitrogen-free ozone generation unit and supplies a stable ozone gas to a plurality of ozone treatment apparatuses, the nitrogen-free ozone generation unit having a nitrogen-free ozone generator to which a high purity oxygen gas containing added nitrogen of less than several thousands ppm is supplied as a raw material gas, the nitrogen-free ozone generation unit having a function with a plurality of means for outputting an ozone gas.

BACKGROUND ART

Conventionally, various techniques have been developed, as follows. A raw material gas obtained by adding a nitrogen gas of several thousands ppm or more to an oxygen gas is supplied to an ozone generator to generate a high concentration ozone gas, and this high concentration ozone gas is often used in an ozone treatment process such as formation of an ozone oxide insulating film and ozone washing in the field of semiconductor fabrication. In the field of semiconductor fabrication and the like, in a case of supplying an ozone gas to a multiple ozone treatment apparatus including a plurality of ozone treatment apparatuses, it is generally conceivable to build an ozone gas supply system in which a plurality of ozone generation mechanisms (means) each including an ozone generator, an ozone power source, a flow rate controller (MFC), and the like, are provided corresponding to the plurality of ozone treatment apparatuses, respectively, so that the ozone generation mechanisms independently supply an ozone gas to the corresponding ozone treatment apparatuses.

Conventionally, as shown in FIG. 26, in order that an ozone generator 71 that includes electrodes 71a and 71b, a dielectric material 71c, and the like, and that is supplied with power from an ozone power source 72 can generate an ozone gas with an increased efficiency, an ordinary oxygen gas contains a nitrogen gas of about 50 to several thousands ppm, and in a case of a high purity oxygen gas containing less nitrogen (less than 50 ppm), a small amount of a $N_2$ gas (500 ppm or more) as well as the high purity oxygen gas is added to the interior of the ozone generator.

Accordingly, in a case of a $N_2$ gas of 500 ppm or more is contained in a raw material oxygen gas, high concentration ozone is generated due to a catalytic reaction of a small amount of $NO_2$ that is generated as a result of a discharge reaction shown in FIG. 27. Particularly, adding a nitrogen gas of 500 to 20000 ppm allows ozone to be generated efficiently due to a catalytic reaction of a small amount of nitrogen dioxide that is generated as a result of the discharge. This consequently generates ozone having the highest concentration. It has been verified from experiments that a raw material gas in which the amount of added nitrogen is 500 to 20000 ppm is the optimal condition in terms of ozone generation performance.

As shown in (1) to (3) below, the discharge reaction shown in FIG. 27 achieves generation of high concentration ozone by using raw material oxygen $O_2$, photoelectric discharge light, and a catalytic gas of a small amount of $NO_2$.

(1) Reaction for Generating a Small Amount of $NO_2$ Gas by Discharge
Reaction for Ionizing Nitrogen Molecule $N_2+e \rightarrow 2N^+$ Reaction for Generating $NO_2$ $2N^+ + O_2 + M \rightarrow NO_2$ (generate a $NO_2$ gas of several ppm to several tens ppm)

(2) Generation of an Oxygen Atom O by a Catalytic Effect of $NO_2$ Caused by Discharge Light
Photodissociation Reaction of $NO_2$ $NO_2 + h\nu \rightarrow NO + O$ Oxidation Reaction of NO $NO + O_2\text{(raw material oxygen)} \rightarrow NO_2 + O$

* In these two reactions, $NO_2$ acts as a catalyst to generate an oxygen atom.

A large amount of oxygen atoms O generated by the reaction (2) react with oxygen gas molecules $O_2$, to generate ozone $O_3$.

(3) Generation of Ozone $O_3$ (Three-Body Collision)

$R2; O + O_2 + M \rightarrow O_3 + M$

Through (1) to (3) described above, high concentration ozone is generated.

However, when a large amount of $N_2$ gas is contained in the raw material oxygen gas, not only an ozone gas but also $NO_X$ by-product gases, such as a $N_2O_5$ gas and $N_2O$ gas, and nitric acid, are generated as a result of a silent discharge in the ozone generator. Specific formulas of generation of the $NO_X$ by-product gases and nitric acid are as follows.

$N_2 + e \rightarrow N_2^* + e \rightarrow N_2 + h\nu(310, 316, 337, 358 \text{ nm})$ $N_2^*$; excitation of nitrogen
ultraviolet light by nitrogen gas $H_2O + e \rightarrow H + OH + e \text{(dissociation of water vapor)}$ $N_2 + e \rightarrow 2N^- + e \text{(dissociation of nitrogen molecule)}$ $NO_2 + h\nu(295 \text{ to } 400 \text{ nm}) \rightarrow NO + O(^3P)$ $H + O_2 + M \rightarrow HO_2 + M$ $HO_2 + NO \rightarrow OH + NO_2$ $N_2O_5 + H_2O \rightarrow 2HNO_3$ $OH + NO_2 + M \rightarrow HNO_3 + M$ In this manner, not only the ozone gas but also $NO_X$ by-product gases and nitric acid are generated.

When a large amount of $NO_X$ by-product is generated, a $NO_X$ gas component reacts with moisture contained in the raw material gas, to generate a nitric acid ($HNO_3$) cluster (vapor). Thus, an ozonized gas is extracted under a state where a small amount of $NO_X$ gas and nitric acid cluster, together with oxygen and the ozone gas, are mixed. When the small amount of nitric acid cluster is several hundred ppm or more, the following problems are caused. That is, rust of chromium oxide or the like resulting from nitric acid is deposited on an inner surface of a stainless pipe that is an ozone gas outlet pipe. As a result, a metal impurity is mixed into a clean ozone gas. In a reaction gas for a semiconductor manufacturing apparatus, the metal impurity adversely affects fabrication of a semiconductor. Additionally, the small amount of nitric acid cluster thus generated acts as a reaction poisonous substance and adversely affects "an etching process on a silicon oxide film by using ozone" and "washing of a wafer or the like by using ozone water", which are performed in the semiconductor manufacturing apparatus.

In a ozone gas supply system including an ozone generator, an ozone power source, and the like, it is generally conceivable that an ozone generator, an ozone power source, a raw material gas pipe system line, an output gas pipe system line, and the like, are provided, and the number of each of them is equal to the number of system lines included in a multiple ozone treatment apparatus. The raw material gas pipe system line supplies an ozone gas or a raw material gas to the ozone generator via a flow rate adjuster such as an MFC for controlling the flow rate of the ozone gas or the raw material gas. The output gas pipe system line includes an ozone concentration detector and an ozone flow meter. The ozone concentration detector has pressure adjuster, such as an APC, for controlling gas atmosphere pressure in the ozone generator. The ozone concentration detector detects a concentration of the ozone gas outputted from the ozone generator.

However, it is impossible to supply high concentration ozonized oxygen with a very small amount of $NO_X$ by-product though the amount of $NO_X$ is large. Additionally, a very large space is required for building an ozone generation system compatible with such a multiple ozone treatment apparatus, and moreover, a still larger system configuration is required for building a system that supplies an ozone gas while coordinately controlling the multiple ozone treatment apparatus. Thus, there are problems of costs, an installation space, and the like, which causes many disadvantages in a practical use.

Accordingly, an attempt was made to generate ozone by using only a high purity oxygen gas without any nitrogen gas being contained in the conventional ozone generator. As a result, however, only a small amount ozone was generated. The reason therefor is considered as follows. The oxygen molecule, which constitutes the raw material gas, has a light absorption spectrum (ultraviolet wavelength of 130 to 200 nm) of a continuous spectrum at wavelengths of an ultraviolet light of 245 nm or less. By absorbing excimer light of ultraviolet light of 245 nm or less, the oxygen molecule is dissociated into oxygen atoms, and ozone is generated by three-body collision among the oxygen atom resulting from the dissociation, the oxygen molecule, and a third material, which is known in an excimer lamp or the like that emits ultraviolet rays. However, in a silent discharge under high pressure of one atmospheric pressure or higher, which is used in, for example, an ozone generator based on an oxygen gas, there is no emission of excimer light of ultraviolet light of 245 nm or less. Thus, dissociation into oxygen atoms caused by the silent discharge light and a reaction constant during a reaction process in ozone generation are very small. Therefore, it cannot be considered as a reaction that generates a high concentration ozone gas having a high concentration of several % or higher.

Therefore, for supplying ozone to a multiple ozone treatment apparatus, the following ozone gas supply system has been conventionally adopted as disclosed in Patent Document 1, for example. That is, a raw material gas that is a raw material oxygen gas containing a nitrogen gas of several thousands ppm or more, or a raw material gas obtained by forcibly adding a nitrogen gas of several thousands ppm or more to a raw material oxygen gas, is supplied to an ozone generator, to generate high concentration ozone. Additionally, in order to supply an ozone gas to a plurality of ozone treatment apparatuses, the volume of one ozone generator is increased, and a pipe system line that outputs an ozone gas is divided into a plurality of pipes. Thereby, ozone gases each having a predetermined flow rate and a predetermined concentration are stepwisely outputted to a multiple ozone treatment apparatus.

FIG. 28 is a block diagram showing an internal configuration of a conventional ozone gas supply system 70, which can be simulated based on the disclosure of the Patent Document 1.

In FIG. 28, the ozone gas supply system 70 includes one ozone generator 71, one ozone power source 72, one ozone control unit 77, and one system collective management unit 80. The ozone control unit 77 has a raw material gas pipe system line that supplies a raw material gas to the ozone generator 71 via a flow rate controller (MFC) 73a, a flow rate controller (MFC) 73b, and a pressure meter 62. The flow rate controller (MFC) 73a controls the flow rate of a raw material gas that is supplied from a raw material gas supply port 64a. The flow rate controller (MFC) 73b controls the flow rate of a nitrogen gas that is supplied from a nitrogen gas supply port 64b such that the nitrogen gas having a predetermined flow rate is added to the raw material oxygen gas. The pressure meter 62 monitors the pressure of the generator. Additionally, the ozone control unit 77 includes a valve switch 61 and an ozone concentration meter 75. The valve switch 61 adjusts opening/closing of a valve depending on a pressure fluctuation in the ozone generator 71. A part of the output gas pipe system line located subsequent to an output pipe in which an ozone flow meter 67 is provided is divided into a plurality of pipes. Furthermore, in the ozone gas supply system 70, individual ozone gas flow rate controllers (MFC) 68-1 to 68-n are provided to the divided parts of the output gas pipe system line, respectively, so that the ozone gas is independently supplied to a plurality of ozone treatment apparatuses 12-1 to 12-n that are provided corresponding to the individual MFCs 68-1 to 68-n, respectively. An amount of ozone gas exceeding the amount that can be supplied through the individual MFCs 68-1 to 68-n is discharged by a flow rate discharge unit 69.

In an ozone generator disclosed in Patent Document 2, light having a wavelength of the visible light region (visible light of 428 nm to 620 nm) can be emitted (discharged) in a silent discharge caused by an oxygen gas in the ozone generator. A photocatalytic material that absorbs the light having a wavelength of the visible light region which is emitted in the discharge, is applied to a discharge surface of the generator. This causes a raw material oxygen gas to be dissociated due to a photocatalytic effect. A chemical reaction between an oxygen atom resulting from the dissociation and an oxygen molecule of a raw material oxygen generates an ozone gas.

PRIOR-ART DOCUMENTS

Patent Documents

Patent Document 1: Japanese Unexamined Patent Application Publication (Translation of PCT Application) No. 2009-500855 (FIGS. 2, 3, and 5)

Patent Document 2: International Publication No. WO2005/080263 (FIGS. 1, 3, 4, and 5; Tables 2-(a), (b), and (c))

SUMMARY OF THE INVENTION

Problems to be Solved by the Invention

The conventional ozone gas supply system for supplying ozone to a multiple ozone treatment apparatus, which is disclosed in the Patent Document 1, has the above-described configuration. In the configuration, a raw material oxygen gas containing nitrogen and moisture is supplied, and an ozone gas is outputted from a single ozone generator 71, and a pipe system line for the output is divided into distribution pipes. As a result, an active gas containing a by-product substance of a nitrogen oxide, a nitric acid cluster, and an OH radical substance is supplied as the outputted ozone gas. This involves a problem that the supplied ozone gas contains a large amount of metal contamination caused by abnormal heating and corrosion which occur due to a chemical decomposition and a oxidation reaction between the material of the output pipe and the by-product substance of the nitrogen oxidation, the nitric acid cluster, and the OH radical substance. Moreover, in an ozone apparatus including the ozone generator disclosed in the Patent Document 1, it is necessary that an ozone gas is supplied to the multiple ozone treatment apparatus (ozone treatment apparatuses 12-1 to 12-n) with a constant flow rate and at a constant ozone concentration. Only a single ozone supply condition is commonly adopted for supplying ozone to the respective ozone treatment apparatuses. This involves a problem that the flow rate and concentration of the ozone gas cannot be independently controlled and changed for the plurality of ozone treatment apparatuses.

Additionally, there is also a problem that the reliability of the supply of the ozone gas is low, because the ozone gas is supplied from the single ozone generator to the multiple ozone treatment apparatus, and therefore if the ozone generator breaks down, the supply of the ozone gas to all the ozone treatment apparatuses is stopped.

Moreover, as shown in FIG. 28, the ozone generator 71, the ozone power source 72, and the gas pipe system are separate. Therefore, an ozone generation part including the ozone generator 71, the ozone power source 72, and the gas pipe system occupies a large space. This arises a problem that it is very difficult in practical use to build an ozone gas supply system having a plurality of such ozone generation parts, and also a problem that the maintainability of the ozone generation part is poor.

The present invention has been made to solve the above-described problems, and an object of the present invention is to provide a downsized nitrogen-free ozone generation unit and an ozone gas supply system including a plurality of such nitrogen-free ozone generation units, the nitrogen-free ozone generation unit having various functions concerning a process from supply of a raw material gas to generation of ozone, such as an ozone generator, an ozone power source, and a gas pipe system, and also having a function for outputting an ozone gas with an extremely increased quality which is generated by the ozone generator capable of generating an ozone gas having a high purity and a high concentration by using only a high purity oxygen gas in which no nitrogen gas is added to a raw material gas.

Means for Solving the Problems

A nitrogen-free ozone generation unit according to the present invention is a nitrogen-free ozone generation unit that supplies, to an ozone treatment apparatus, an ozone gas having been set to a predetermined supply flow rate and a predetermined concentration. The nitrogen-free ozone generation unit includes: a nitrogen-free ozone generator for generating an ozone gas, in which a photocatalytic material for generating ozone is applied to a discharge surface; an ozone power source for controlling power that is supplied to the nitrogen-free ozone generator; a controller associated with the ozone generator, the controller including at least two of a flow-rate-detector/flow-rate-adjuster including a mass flow controller (MFC) for controlling a flow rate of a raw material gas that is inputted to the nitrogen-free ozone generator, a gas filter for processing an ozone gas outputted from the nitrogen-free ozone generator so as to remove an impurity and a foreign substance therefrom, a pressure-detector/pressure-adjuster including an automatic pressure controller (APC) for automatically controlling internal pressure that is pressure within the nitrogen-free ozone generator, and an ozone concentration detector including an ozone concentration meter for detecting an ozone concentration value of the ozone gas outputted from the nitrogen-free ozone generator; a raw material gas supply port for supplying the raw material gas from outside to the nitrogen-free ozone generator; an ozone gas output port for outputting, to the outside, an ozone gas obtained from the nitrogen-free ozone generator through at least part of the controller; and cooling water inlet/outlet ports for supplying cooling water obtained from the outside to the nitrogen-free ozone generator and discharging the cooling water from the nitrogen-free ozone generator. The nitrogen-free ozone generation unit is formed as an integrated structure in which the nitrogen-free ozone generator, the ozone power source, the controller, the raw material gas supply port, the ozone gas output port, and the cooling water inlet/outlet ports are assembled together.

Effects of the Invention

The nitrogen-free ozone generation unit according to the present invention is formed as the integrated structure in which the nitrogen-free ozone generator, the ozone power source, the controller (at least two of the flow-rate-detector/flow-rate-adjuster, the gas filter means, the pressure-detector/pressure-adjuster, and the ozone concentration detector), the raw material gas supply port, the ozone gas output port, and the cooling water inlet/outlet port, are assembled together. This achieves considerable downsizing as compared with a similar, conventional configuration.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 A graph showing output ozone concentration characteristics of ozone obtained by the nitrogen-free ozone generator shown in FIG. 1.

FIG. 3 A diagram schematically showing a mechanism of dissociation of an oxygen molecule into oxygen atoms caused by an oxygen molecule and a photocatalyst during ozone generation.

FIG. 6 An explanatory diagram showing an internal configuration of an ozone gas output flow rate management unit of the ozone gas supply system shown in FIG. 5.

FIG. 7 An explanatory diagram schematically showing a display state of a main control panel of the ozone gas supply system according to the embodiment 1.

FIG. 9 An explanatory diagram schematically showing memory contents of a data memory included in the nitrogen-free ozone generation unit shown in FIG. 5.

FIG. 10 A graph showing an output concentration control waveform obtained in a case where an output concentration control is performed on the nitrogen-free ozone generation unit shown in FIG. 5.

FIG. 18 A block diagram showing a configuration of an ozone gas supply system according to an embodiment 5 of the present invention.

EMBODIMENT FOR CARRYING OUT THE INVENTION

<Nitrogen-Free Ozone Generator>

Figure 1:
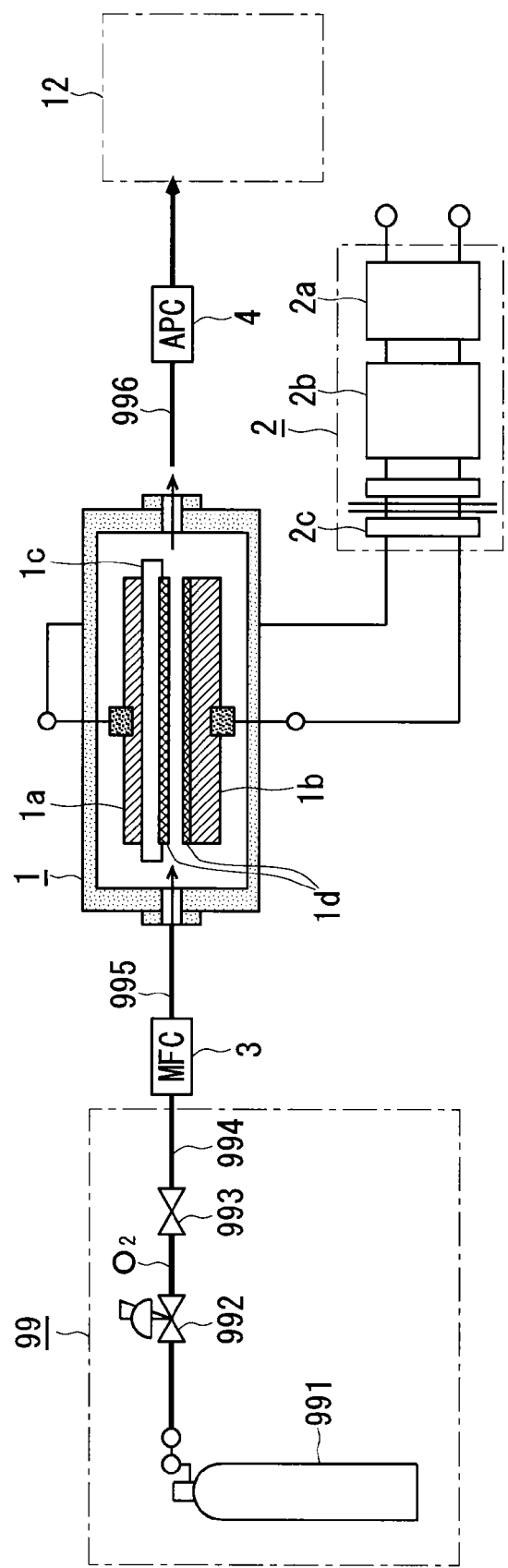
FIG. 1 A block diagram showing a configuration of a nitrogen-free ozone generator employed in embodiments of the present invention.

A nitrogen-free ozone generator employed in an ozone gas supply system according to embodiments of the present invention will be described with reference to FIGS. 1 to 4. FIG. 1 is a block diagram showing a configuration of a gas system line including a nitrogen-free ozone generator as a main part thereof.

In a narrow sense, an ozone generator using a high purity oxygen raw material gas in which the amount of added nitrogen is 10 ppm or more and 1000 ppm or less is called "nitrogen-suppressed ozone generator", while an ozone generator using a high purity oxygen raw material gas in which the amount of added nitrogen is less than 10 ppm is called "nitrogen-free ozone generator". In this specification, ozone generators using a high purity oxygen raw material gas in which the amount of added nitrogen is 1000 ppm or less, including the "nitrogen-suppressed ozone generator", are collectively called the "nitrogen-free ozone generator" in a broad sense.

FIG. 2 is a diagram showing ozone concentration characteristics of ozone obtained by the nitrogen-free ozone generator 1 shown in FIG. 1. FIG. 3 is a diagram schematically showing a mechanism of dissociation of an oxygen molecule into oxygen atoms caused by an oxygen molecule and a photocatalyst.

Figure 4:
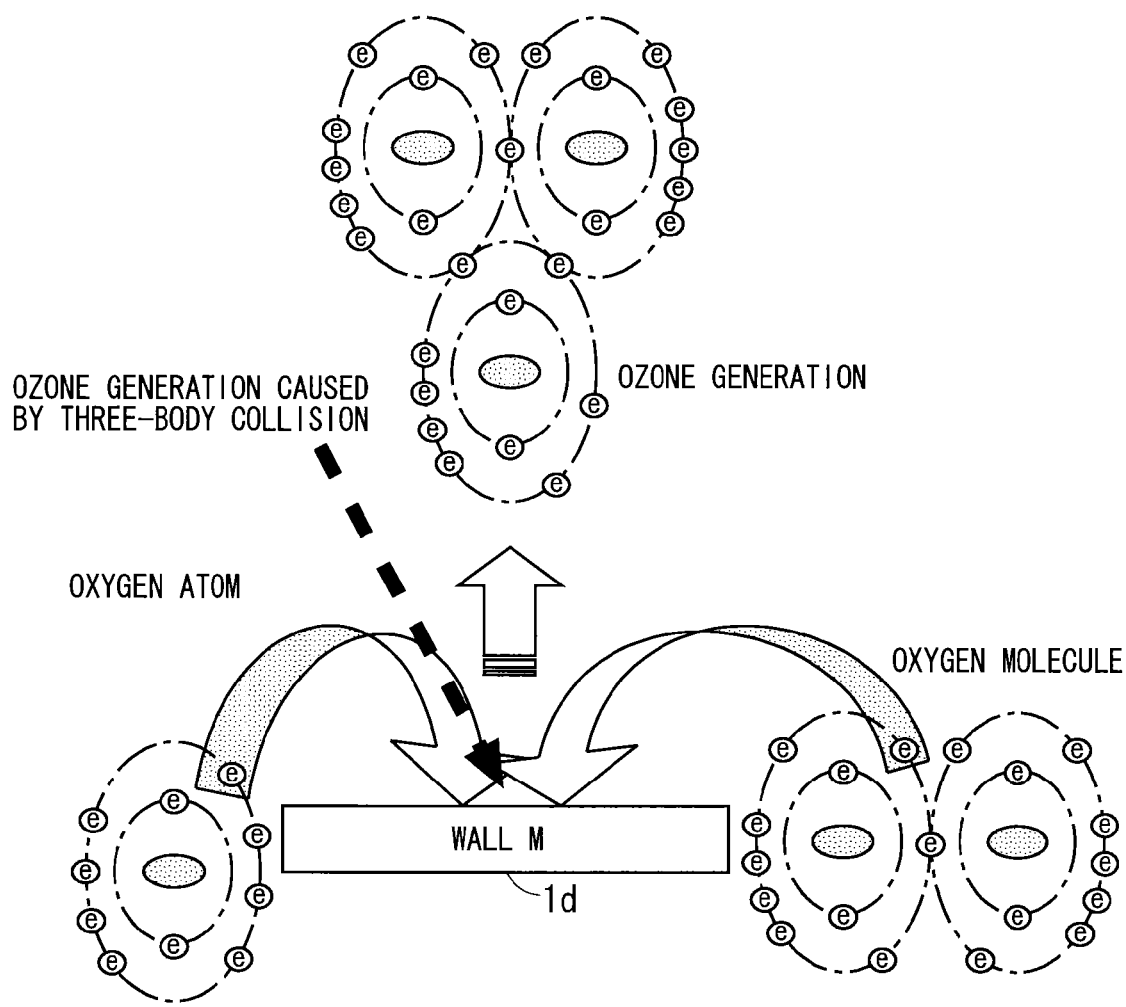
FIG. 4 A diagram schematically showing a mechanism of generation of ozone caused by three-body collision among an oxygen atom and an oxygen molecule.

FIG. 4 is a diagram schematically showing a mechanism of generation of ozone caused by three-body collision among an oxygen atom and an oxygen molecule, which occurs in the nitrogen-free ozone generator 1. In this specification and the drawings, the same reference sign denotes the same or similar part.

The nitrogen-free ozone generator according to the present invention is effective in a case where there is a need for a high concentration ozone gas having a concentration of 200 g/m$^3$ or higher, a clean ozone gas for use in a semiconductor manufacturing apparatus, a washing apparatus, or the like, a nitrogen-free ozone gas from which a by-product such as $NO_X$ or an OH radical substance is eliminated, and an apparatus having a high efficiency of ozone generation.

In FIG. 1, a raw material supply system 99 that supplies oxygen (raw material gas) having a purity of 99.99% or higher includes a high purity oxygen cylinder 991, a pressure reducing valve 992, and an open/close valve 993. The raw material supply system 99 supplies an oxygen gas 994 to the outside. The oxygen gas 994, serving as a raw material gas 995, is supplied to the nitrogen-free ozone generator 1 via an MFC 3. In the nitrogen-free ozone generator 1, electrodes 1a and 1b, a dielectric material 1c, and a photocatalyst 1d are provided. The two electrodes 1a and 1b are opposed to each other. The dielectric material 1c is provided on a surface of the electrode 1a opposed to the electrode 1b. The photocatalyst 1d is applied to each of the surfaces of the dielectric material 1c and the electrode 1b opposed to each other.

A gas filter for removing moisture is provided, by which a moisture content in high purity oxygen that is supplied from the cylinder is reduced to 0.1 ppm or less, though not shown in FIG. 1. The oxygen gas 994 serving as the raw material gas 995 is supplied to the nitrogen-free ozone generator 1, through the flow rate adjuster (MFC) 3 that adjusts the amount of nitrogen-free and moisture-free raw material gas in which a nitrogen content and a moisture content are suppressed as low as possible.

Here, even when oxygen having a purity of 99.99% or higher and more specifically high purity oxygen having a purity of 99.995% is adopted as the oxygen gas, $N_2$ of 151×

$10^2$ ppb (that is, 15 ppm) is contained and thus $N_2$ is unavoidably mixed. However, in order to obtain an ozone gas having a high purity, it is desirable to use a raw material oxygen gas having a smaller amount of mixed $N_2$.

FIG. 3 schematically shows an electronic configuration structure of a solid of a photocatalyst in accordance with the solid state electron theory (band gap theory) in a silent discharge, and a mechanism of dissociation of an oxygen molecule. A description will be given to the operation and action of the function of a photocatalytic reaction caused by a photocatalytic material with discharge light. A photocatalyst is applied to a wall surface of an electrode or the like in a silent discharge space, and the electronic configuration structure of a band gap of the photocatalyst optically absorbs silent discharge light having energy equal to or greater than the band gap, as shown in FIG. 3. As a result, in the photocatalyst, an electron is jumped out from a valence band and transferred (pumped) to a conduction band.

In the valence band from which the electron is transferred, the positive hole (hole) occurs. The electron having been transferred into the conduction band moves to the periphery, or the electron is discharged to a discharge region. Thus, the lifetime of the electron ends. That is, the lifetime of the electron having been transferred into the conduction band is very short, several tens psec. Since the positive hole in the valence band continuously exists unless the electron having been transferred into the conduction band reruns due to recombination, the lifetime of the positive hole is long, 200 to 300 nsec. When the photocatalyst in the excited state where the positive hole exists is brought into quantum contact with an oxygen molecule, the electron shared with the oxygen molecule is stolen, thus physically dissociating the oxygen molecule (phenomenon of adsorption and dissociation of oxygen by the photocatalyst [oxidation reaction]).

On the other hand, in a photocatalyst with a band gap of 2.0 eV to 2.9 eV, the light absorption wavelength is 428 nm to 620 nm, which is visible light. In either of a case of oxygen containing no nitrogen and a case of oxygen and an argon gas, light having a light wavelength within the visible light region can be emitted (discharged) in a silent discharge. Therefore, it has been revealed that when the photocatalyst with a band gap of 2.0 eV to 2.9 eV is applied to an electrode surface (wall surface) of an ozone generator, the photocatalyst absorbs discharge light emitted in the silent discharge in either of a case of oxygen containing no nitrogen and a case of oxygen and an argon gas. As a result, the photocatalyst is excited, and oxygen can be dissociated due to the adsorption and dissociation caused between the excited photocatalyst and the oxygen gas. Moreover, as shown in the schematic diagram of FIG. 4, due to the three-body collision among the oxygen atom resulting from the dissociation, the supplied oxygen molecule (raw material oxygen gas), and a third material, the binding action is accelerated on the photocatalyst $1d$ (wall M). Thus, ozone is generated.

In a silent discharge in the ozone generator with use of a nitrogen gas, light having a light wavelength in the ultraviolet region (ultraviolet light of 413 nm to 344 nm) can be emitted (discharged).

Therefore, in the nitrogen-free ozone generator 1 of the present application in which a photocatalytic material is applied to a discharge surface, a photocatalyst with a band gap of 3.0 eV to 3.6 eV can be optically excited. The photocatalyst thus excited is able to dissociate an oxygen molecule, and thereby an ozone gas can be generated in a silent discharge including nitrogen.

In the silent discharge including nitrogen, the photocatalyst with a band gap of 3.0 eV to 3.6 eV can be optically excited. In the silent discharge with oxygen, the photocatalyst with a band gap of 2.0 eV to 2.9 eV can be optically excited. Therefore, by adding a small amount of nitrogen (a suppressed amount of nitrogen) to oxygen, the photocatalyst provided on a dielectric material or an electrode in the discharge region acquires an allowable band gap ranging from 2.0 eV to 3.6 eV. This enables the reaction of ozone generation to be accelerated using discharge light (ultraviolet light) with not only oxygen but also nitrogen. That is, containing a $N_2$ gas can enhance the effect of an ozone generation function obtained by the invention of the present application.

The photocatalytic material applied to the discharge surface of the ozone generator is regarded as one kind of semiconductor. The photocatalytic material is a substance having a band gap unique to the semiconductor. The band gap has a greater value than a band gap of an ordinary semiconductor substance. Normally, the photocatalytic material is a metal oxide substance in which a metal is bound to an oxygen atom. Among such metal oxide substances, a metal oxide substance having a crystal structure with an oxygen defect in which a metal atom and an oxygen atom are not completely bound, is considered as a substance having a semiconductor effect and a photocatalytic effect.

For example, as for iron oxide ($Fe_2O_3$) which is a photocatalytic material disclosed in the Patent Document 2, to be exact, the iron oxide serving as a photocatalytic material is $Fe_2O_X$. The iron oxide in which the number X of bound oxygen is less than three (X<3) has a crystal structure that serves as a photocatalytic material. That is, although at most three oxygen atoms can be bound to two iron atoms, a crystal structure that can serve as a photocatalytic material is a structure having an oxygen defect portion.

In the nitrogen-free ozone generator employed in the ozone gas supply system according to the present invention, the photocatalytic material is applied to the discharge surface, and in order to enhance the photocatalytic effect and thereby generate high concentration ozone, the discharge surface through which the oxygen gas in the discharge passes is designed such that the surface area of the photocatalytic material applied to the discharge surface is considerably increased.

Therefore, in the nitrogen-free ozone generator 1, even though a small amount of (several ppm or less) moisture is contained in the raw material gas, the moisture is likely to be adsorbed onto a surface of the photocatalytic material applied to the discharge surface, because the photocatalytic material has an increased surface area. Causing a discharge under a state where the moisture is adsorbed dissociates the moisture into an H atom and an OH molecule. The H atom and OH molecule resulting from the dissociation are bound to an oxygen defect portion of the photocatalytic material. In the photocatalytic material to which the H atom and OH molecule are bound, the photocatalytic effect is deteriorated or lost. This results in a considerable loss of the ozone generation ability.

As described above, in the nitrogen-free ozone generator 1 employed in the ozone gas supply system according to the present invention, even a small amount of (several ppm or less) moisture contained in the raw material oxygen causes a deterioration in the performance of the nitrogen-free ozone generator 1. Desirably, therefore, as means for removing a small amount of moisture contained in the raw material oxygen, a moisture removal filter for removing a small amount of moisture and thereby suppressing a moisture content to 300 ppb (0.3 ppm) or less is provided in a raw material oxygen gas supply port.

Embodiment 1

Figure 5:
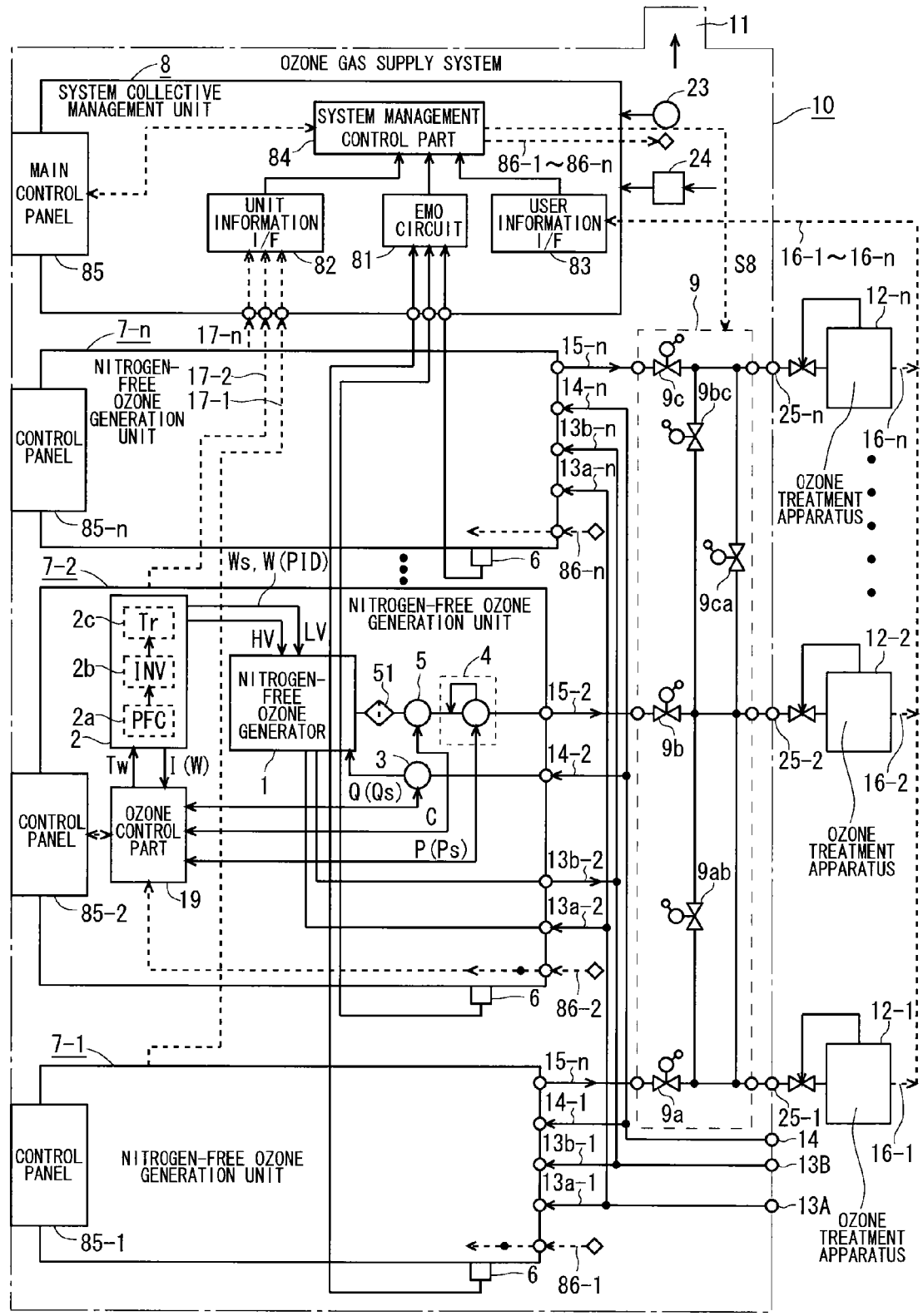
FIG. 5 A block diagram showing a configuration of an ozone gas supply system including a nitrogen-free ozone generator according to an embodiment 1 of the present invention.
Figure 8:
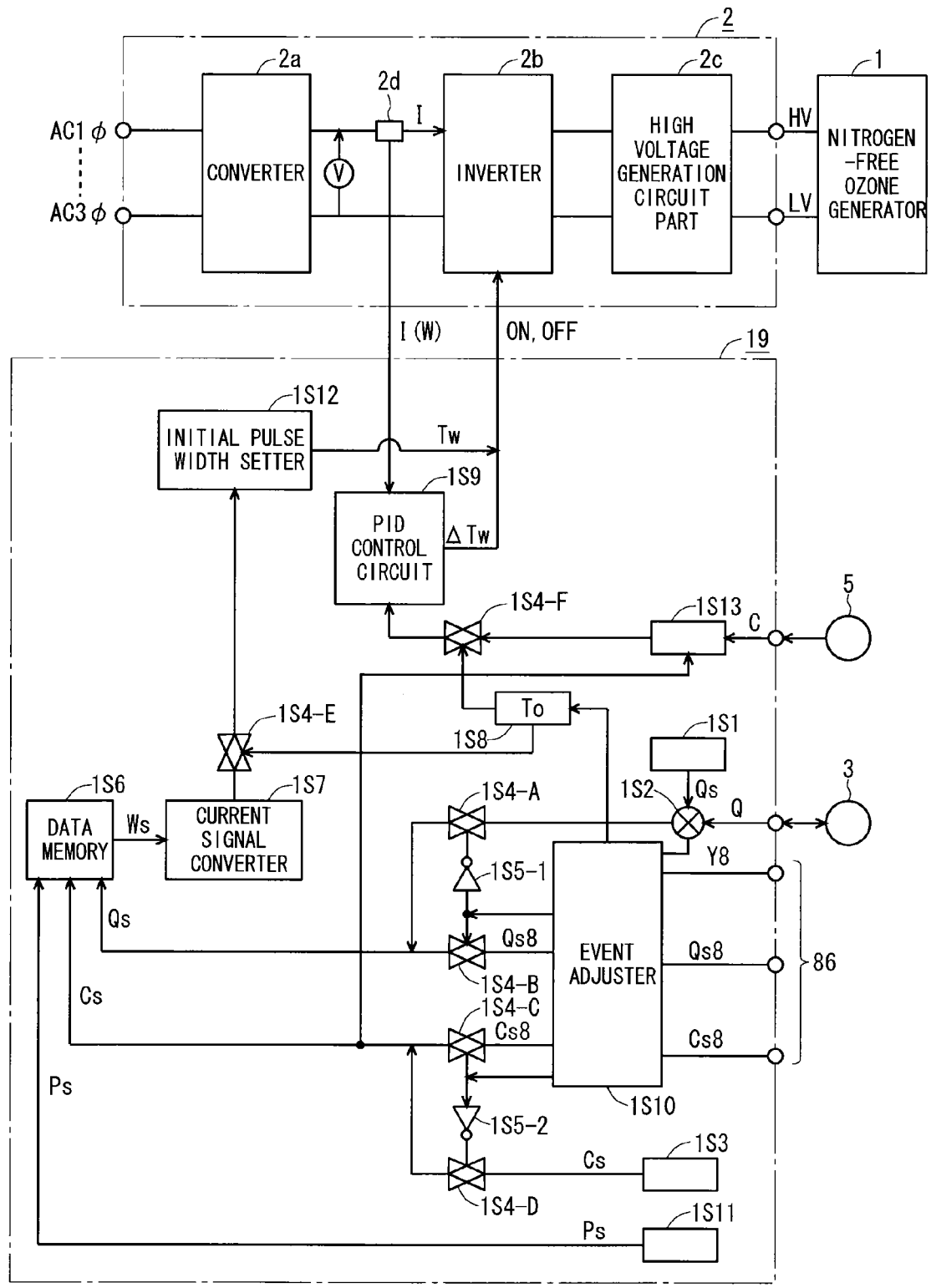
FIG. 8 A block diagram showing a configuration of an ozone control part included in a nitrogen-free ozone generation unit shown in FIG. 5.

Hereinafter, an embodiment 1 of the present invention will be described with reference to FIGS. 5 to 10. The outline of FIGS. 5 to 10 is as follows. FIG. 5 is a block diagram showing a configuration of an ozone gas supply system according to the embodiment 1 of the present invention. FIG. 6 is an explanatory diagram showing an internal configuration of an ozone gas output flow rate management unit of the ozone gas supply system shown in FIG. 5. FIG. 7 is an explanatory diagram schematically showing a display state of a main control panel of the ozone gas supply system according to the embodiment 1. FIG. 8 is a block diagram showing a configuration of an ozone control part included in a nitrogen-free ozone generation unit shown in FIG. 5. FIG. 9 is an explanatory diagram schematically showing memory contents (for example, initial conditions for the ozone generation unit to control the concentration and flow rate) of a data memory included in the ozone generation unit shown in FIG. 5. FIG. 10 is a graph showing an output concentration control waveform obtained in a case where an output concentration control is performed on the nitrogen-free ozone generation unit 7 shown in FIG. 5.

(Overall Configuration)

As shown in FIG. 5, an ozone gas supply system 10 has n (≥2) nitrogen-free ozone generation units 7-1 to 7-n included therein. In the following, among the nitrogen-free ozone generation units 7-1 to 7-n, the nitrogen-free ozone generation unit 7-2 will be taken as a representative, and an internal configuration thereof will be described mainly with reference to FIG. 5.

The interior of the nitrogen-free ozone generator 1 included in the nitrogen-free ozone generation unit 7-2 is filled with a gas containing an oxygen gas. An ozone power source 2 provided in the nitrogen-free ozone generation unit 7-2 applies high frequency high voltages HV and LV across the electrodes in the nitrogen-free ozone generator 1, thus causing a dielectric-barrier discharge (silent discharge) between these electrodes. Thereby, due to the discharge, a gas existing in the discharge space produces an ozone gas. The ozone power source 2 includes a converter 2a, an inverter 2b, and a high voltage circuit part 2c, which will be detailed later.

In this embodiment, as a structure of the nitrogen-free ozone generator 1, an ozone generator having a structure that employs the silent discharge has been described as a representative. Here, as a function for generating ozone, there may be also adopted an ozone generator having a structure that employs a creeping discharge or a glow discharge without addition of any nitrogen, or an ozone generator having a structure that employs a super-high frequency or a microwave discharge.

In order to obtain a stable output of ozone, it is important to limit gas types of the raw material gas that is supplied to the ozone generator, and to provide a function for constantly adjusting environmental conditions such as a flow rate value, the gas pressure in the ozone generator, the temperature of water for cooling the electrodes, the amount of water, and the like.

Desirably, a high purity oxygen gas for generating an ozone gas such as an oxygen gas or a high purity oxygen raw material gas containing a small amount of nitrogen gas less than 10 ppm (these high purity oxygen raw material gases are collectively called "nitrogen-free oxygen raw material gas" in a narrow sense) is supplied to the raw material gas supply port 14. These raw material gases contain a small amount of impurities, an impure gas, and moisture which are unnecessary for generating the ozone gas. The moisture and the impurities contained in the raw material gas are adsorbed to the discharge surface of the nitrogen-free ozone generator 1, to deteriorate the performance of the photocatalytic material of the nitrogen-free ozone generator 1. Accordingly, in order to remove a small amount of the impurities, the impure gas, and the moisture contained in the raw material gas, it is desirable that, for example, a gas filter and a moisture removal filter for removing moisture contained in a gas are provided in an inlet for the raw material gas.

A raw material gas having a predetermined raw material gas flow rate Q is obtained through a raw material gas supply port 14 of the ozone gas supply system 10 and a raw material gas supply port 14-2 of the nitrogen-free ozone generation unit 7-2, and supplied to the nitrogen-free ozone generator 1 with a constant flow rate through the gas flow rate controller (MFC) 3.

An ozone generator system is equipped with, as means for keeping the pressure in the nitrogen-free ozone generator 1 constant, means for detecting a gas pressure in the generator and a function for finely adjusting the amount of ozone gas outputted by the generator thus detected and thereby keeping the pressure in the nitrogen-free ozone generator 1 constant. One of methods therefor is implemented by an automatic pressure adjuster (APC) 4 for automatically adjusting the pressure in the generator to a predetermined pressure. The automatic pressure adjuster (APC) 4 is provided in an ozone gas output pipe gas line of the ozone generator.

A specific configuration of the ozone gas output pipe gas line is as follows. An ozone gas generated in the nitrogen-free ozone generator 1 passes through a gas filter 51 for removing impurities and foreign substances therefrom, and then through an ozone concentration meter 5 and the automatic pressure adjuster (APC) 4. Thereby, the ozone (ozonized oxygen) gas having a predetermined ozone concentration C is continuously outputted from an ozone gas output port 15-2 to the outside of the nitrogen-free ozone generation unit 7-2.

Sometimes, an ozone gas flow rate controller (MFC) for keeping the flow rate of the output ozone gas constant is provided in the ozone gas output pipe gas line. In this embodiment, no ozone-gas flow rate controller (MFC) is provided.

Accordingly, a flow rate Qx of the output ozone gas is the sum of an ozone flow rate Qc and a flow rate Qn. The ozone flow rate Qc is for the ozone obtained as a result of conversion from the raw material gas having the flow rate Q. The flow rate Qn is for raw material oxygen that has not been converted from the raw material gas having the flow rate Q. That is, the flow rate Qx of the ozone (ozonized oxygen) gas is determined by the formula (I): $\{Qx=F(Q,C) \ldots (1)\}$, which is based on the flow rate Q and the ozone concentration C of a raw material (oxygen) gas. By the gas flow rate controller (MFC) 3, the flow rate of the raw material gas supplied to the ozone generator is controlled to a constant value.

The APC 4 controls the pressure of the ozone gas flowing in an output pipe path for the ozone gas of the nitrogen-free ozone generator 1, and thereby automatically controls the gas pressure of the nitrogen-free ozone generator 1 to a constant value.

The nitrogen-free ozone generation unit 7-2 is configured as a package unit that consitutes one unit in which a plurality of function means are assembled together. The plurality of function means include, for example, the nitrogen-free ozone generator 1 having means for generating the ozone gas, the ozone power source 2 having means for supplying predetermined power to the ozone gas, the MFC 3 having means for controlling the flow rate of the supplied raw material gas to a constant value, the APC 4 having means for controlling a pressure value of the pressure in the nitrogen-free ozone generator 1 to a constant value, the gas filter 51 having means for trapping the impurity gas in the output ozone gas, and the ozone concentration meter 5 having means for detecting an output ozone concentration value. All the ozone generation units 7-1 to 7-$n$ have identical configurations (only the configuration of 7-2 is shown), and have the internal configuration that has been described with regard to the ozone generation unit 7-2 as a representative.

Each of the nitrogen-free ozone generation units 7 (ozone generation units 7-1 to 7-$n$) has a water leakage sensor 6 provided on a bottom surface thereof, to monitor presence or absence of water leakage in each ozone generation unit 7. More specifically, information obtained from the water leakage sensor 6 is supplied to an EMO circuit (emergency stop circuit) 81 in an system collective management unit 8, so that the monitoring can be made under control of a system management control part 84.

The system collective management unit 8 provided in the ozone gas supply system 10 receives detection information from each of an exhaust gas sensor 23 and an ozone leak sensor 24. The exhaust gas sensor 23 monitors and keeps a negative pressure state of the interior of the apparatus by vacuuming the interior through an exhaust duct 11. When the system collective management unit 8 receives an abnormal exhaust or an abnormal leakage from the exhaust gas sensor 23 or the ozone leakage sensor 24, the system collective management unit 8 causes the system management control part 84 to supply nitrogen-free ozone generation unit control signals 86-1 to 86-$n$ that are stop instructions to all the nitrogen-free ozone generation units 7-1 to 7-$n$, to thereby stop operations of the nitrogen-free ozone generation units 7-1 to 7-$n$.

Also, the system management control part 84 provided in the system collective management unit 8 receives process ozone gas event signals 16-1 to 16-$n$ from ozone treatment apparatuses 12-1 to 12-$n$ through a user information I/F 83. The process ozone gas event signals 16-1 to 16-$n$ include a request ozone flow rate Qs12 and a request ozone concentration Cs12.

Based on instructions indicated by the process ozone gas event signals 16-1 to 16-$n$, the system management control part 84 outputs the nitrogen-free ozone generation unit control signals 86-1 to 86-$n$ to the nitrogen-free ozone generation units 7-1 to 7-$n$, and also outputs a control signal S8 to an ozone gas output flow rate management unit 9.

As a result, the flow rate and concentration of an ozone gas outputted from each of the nitrogen-free ozone generation units 7-1 to 7-$n$ are controlled, and additionally the opening/closing of an ozone gas control valve 9$a$ and the like provided in the ozone gas output flow rate management unit 9 is controlled. Thereby, an ozone gas having a gas flow rate and a gas concentration in accordance with the instructions of the process ozone gas event signals 16-1 to 16-$n$ can be supplied to the ozone treatment apparatuses 12-1 to 12-$n$. In the following, the system collective management unit 8 will be described in more detail.

The system collective management unit 8 includes the EMO circuit 81 for stopping the apparatus in emergency, a unit information I/F 82, the user information I/F 83, the system management control part 84, and a main control panel 85.

As described above, the EMO circuit 81 is a circuit for monitoring a system error signal obtained from the water leakage sensor 6 of each nitrogen-free ozone generation unit 7. To be more specific, when the EMO circuit 81 receives detection information indicating detection of abnormal water leakage from the water leakage sensor 6, the EMO circuit 81 transmits this information to the system management control part 84. Then, the system management control part 84 supplies the ozone generation unit control signal 86 (any one of the ozone generation unit control signals 86-1 to 86-$n$) to the nitrogen-free ozone generation unit 7 corresponding to the water leakage sensor 6 that has detected the abnormal water leakage. Thus, the nitrogen-free ozone generation unit 7 is stopped.

The unit information I/F 82 receives unit information signals 17-1 to 17-$n$ from the nitrogen-free ozone generation units 7-1 to 7-$n$.

As described above, the user information I/F 83 receives the process ozone gas event signals 16-1 to 16-$n$ (indicating the request ozone flow rate Qs12, the request ozone concentration Cs12, operation information Y, an apparatus No., and the like), which are command signals, from the ozone treatment apparatuses 12-1 to 12-$n$.

The system management control part 84 outputs the control signal S8 which is a command for controlling the opening/closing of the ozone gas control valves (9$a$, 9$b$, 9$c$, 9$ab$, 9$bc$, 9$ca$) provided in the ozone gas output flow rate management unit 9, and thereby collectively controls the parts within the ozone gas output flow rate management unit 9. The system management control part 84 also receives information from the main control panel 85.

As shown in FIG. 5, the ozone gas supply system 10 includes a cooling water inlet port 13A and a cooling water outlet port 13B. Cooling water is introduced from an external cooling system (not shown) through the cooling water inlet port 13A and cooling water inlet ports 13$a$-1 to 13$a$-$n$ into the nitrogen-free ozone generation units 7-1 to 7-$n$. The water having served for the cooling is outputted from the nitrogen-free ozone generation units 7-1 to 7-$n$ to the outside through cooling water outlet ports 13$b$-1 to 13$b$-$n$ and the cooling water outlet port 13B.

The amount and temperature of cooling water supplied from the external cooling system is controlled at constant values, though not illustrated herein.

The ozone gas supply system 10 has the raw material gas supply port 14. The raw material gas is introduced from the outside into the nitrogen-free ozone generation units 7-1 to 7-$n$ through the raw material gas supply port 14 and the raw material gas supply ports 14-1 to 14-$n$. At an external inlet for the raw material gas, a gas filter for removing a small amount of impurities, an impure gas, and moisture contained in the raw material gas is provided, though not illustrated herein, to thereby control and stabilize the purity of the raw material gas.

The ozone gas output ports 15-1 to 15-$n$ of the nitrogen-free ozone generation units 7-1 to 7-$n$ are connected to the ozone gas output flow rate management unit 9 in the ozone gas supply system 10, and the ozone gas is outputted from the ozone gas output flow rate management unit 9 through ozone gas output ports 25-1 to 25-$n$ to the outside of the ozone gas supply system 10.

The process ozone gas event signals 16-1 to 16-$n$ outputted from the n ozone treatment apparatuses 12-1 to 12-$n$ are inputted to the system management control part 84 via the user information I/F 83. The process ozone gas event signal 16 (16-1 to 16-$n$) indicates the request ozone flow rate Qs12, the raw material gas set concentration Cs12, the operation information Y, and the like. The system management control part 84 outputs the nitrogen-free ozone generation unit control signals 86-1 to 86-$n$ for controlling the nitrogen-free ozone generation units 7-1 to 7-$n$ based on the process ozone gas event signals 16-1 to 16-$n$.

The nitrogen-free ozone generation units 7-1 to 7-$n$ include nitrogen-free ozone generation unit control panels 85-1 to 85-$n$. The unit information signals 17-1 to 17-$n$ are transmitted from the nitrogen-free ozone generation units 7-1 to 7-$n$ to the system management control part 84 via the unit information I/F 82 of the system collective management unit 8. The unit information signal 17 (17-1 to 17-$n$) is an information signal indicating the breakdown and an operating/stopping state of the ozone generator 1 included in each nitrogen-free ozone generation unit 7.

The operation information Y included in the process ozone gas event signal 16 corresponds to a user information signal indicating the breakdown and an operating/stopping state of each ozone treatment apparatus 12 (12-1 to 12-$n$) and, as described above, is outputted to the user information I/F 83 of the system collective management unit 8.

Each of the nitrogen-free ozone generation units 7-1 to 7-$n$ includes an ozone control part 19. The ozone control part 19 is a control part, as will be detailed later, that receives a set flow rate Qs and a detected flow rate Q for the flow rate of the raw material gas, a set pressure Ps and a detected pressure P for the pressure of the ozone generator 1, and the ozone concentration C of the ozone outputted from each nitrogen-free ozone generation unit 7, and that controls the ozone power source 2 to thereby control the ozone concentration, the gas flow rate, and the like, of the ozone gas generated in the nitrogen-free ozone generator 1. The ozone control part 19 communicates signals with the ozone concentration meter 5, the MFC 3, the APC 4, and the ozone power source 2.

(Control of Ozone Gas Output Flow Rate Management Unit)

As shown in FIG. 6, the ozone gas output flow rate management unit 9 has ozone gas input ports 29-1 to 29-$n$ corresponding to output parts of the nitrogen-free ozone generation units 7-1 to 7-$n$, respectively, and ozone gas output ports 39-1 to 39-$n$ corresponding to input parts of the ozone treatment apparatuses 12-1 to 12-$n$, respectively. Ozone gas on/off valves 22-1 to 22-$n$ are interposed between the ozone gas output ports 39-1 to 39-$n$ (ozone gas output ports 25-1 to 25-$n$) and the ozone treatment apparatuses 12-1 to 12-$n$. At a time of supplying the ozone gas, the ozone treatment apparatuses 12-1 to 12-$n$ open the ozone gas on/off valves 22-1 to 22-$n$. This ozone gas supply system 10 is configured as a system including n ozone gas output ports, namely, the ozone gas output ports 39-1 to 39-$n$. However, if the number of ozone treatment apparatuses at the user side is less than n, a pipe fitting of the ozone gas output port 39 not serving for the output may be capped so that an output of gas is plugged.

The ozone gas output flow rate management unit 9 is provided therein with the ozone gas control valves 9$a$, 9$b$, 9$c$, 9$bc$, 9$ab$, and 9$ca$. The ozone gas control valves 9$a$, 9$b$, and 9$c$ are normally open (NO), and the ozone gas control valves 9$bc$, 9$ab$, and 9$ca$ are normally close (NC). For convenience of the description, FIG. 2 shows a specific case of n=3. As the ozone gas control valves 9$a$, 9$b$, 9$c$, 9$bc$, 9$ab$, and 9$ca$, electrically-operated valves or pneumatic valves which are openable and closable by means of electricity or air pressure are conceivable.

The ozone gas control valves 9$a$ to 9$c$ are interposed between the ozone gas input ports 29-1 to 29-$n$ for the input of the ozone gas from the nitrogen-free ozone generation units 7-1 to 7-$n$, and the ozone gas output ports 39-1 to 39-$n$. The ozone gas control valve 9$ab$ is provided between the outputs of the ozone gas control valves 9$a$ and 9$b$. The ozone gas control valve 9$bc$ is provided between the outputs of the ozone gas control valves 9$b$ and 9$c$. The ozone gas control valve 9$ca$ is provided between the outputs of the ozone gas control valves 9$c$ and 9$a$.

An open state and a closed state of each of the ozone gas control valves 9$a$, 9$b$, 9$c$, 9$bc$, 9$ab$, and 9$ca$ are controlled based on the control signal S8 supplied from the system management control part 84 of the system collective management unit 8.

In FIG. 6, among the ozone treatment apparatuses 12-1 to 12-$n$, only one ozone treatment apparatus 12-2 is operated, and the ozone gas on/off valve 22-2 thereof is in the open state (blacked out). FIG. 2 shows a state of the ozone gas output flow rate management unit 9 in a case where the flow rate of the ozone gas supplied to the ozone treatment apparatus 12-2 is 30 SLM (L/min). In other words, the ozone treatment apparatus 12-2 instructs that the ozone flow rate be 30 SLM based on the request ozone flow rate Qs12 included in the process ozone gas event signal 16-2.

The system management control part 84 provided in the system collective management unit 8 controls, by the nitrogen-free ozone generation unit control signals 86-1 to 86-$n$, the nitrogen-free ozone generation units 7-1 to 7-$n$ such that the ozone gas can be supplied at 10 SLM from each of the nitrogen-free ozone generation units 7-1 to 7-$n$.

Furthermore, the system management control part 84 controls, by the control signal S8, the opening/closing state of each of the ozone gas control valves 9$a$, 9$b$, 9$c$, 9$bc$, 9$ab$, and 9$ca$ in the ozone gas output flow rate management unit 9. More specifically, the system management control part 84 outputs, to the ozone gas output flow rate management unit 9, the control signal S8 for bringing the ozone gas control valves 9$a$, 9$b$, 9$c$, 9$bc$, and 9$ab$ into the open state (blacked out) while bringing the ozone gas control valve 9$ca$ into the closed state (shown in white).

As mentioned above, among the ozone gas on/off valves 22-1 to 22-$n$, only the ozone gas on/off valve 22-2 is in the open state, and the ozone gas on/off valves 22-1 and 22-$n$ are in the closed state. In the description given herein, the ozone treatment apparatus 12 that is not in use is brought into the closed state by means of the ozone gas on/off valves 22-1 to 22-$n$. Alternatively, it may be acceptable that the ozone treatment apparatus that is not in use is forcibly capped by a pipe fitting at the portion 25-1 to 25-$n$ in order to block the supply of the ozone gas.

In this manner, the system management control part 84 causes each of the nitrogen-free ozone generation units 7-1 to 7-$n$ to supply the ozone gas with a flow rate of 10 SLM by the nitrogen-free ozone generation unit control signals 86-1 to 86-$n$, and also controls the ozone gas output flow rate management unit 9 based on the control signal S8. Thereby, the system management control part 84 is able to supply the ozone gas to the ozone treatment apparatus 12-2 with a gas flow rate of 30 SLM (10 SLM×3).

(Main Control Panel)

As shown in FIG. 7, the main control panel 85 of the ozone gas supply system 10 displays, on a display surface thereof, the opening/closing state of the ozone gas control valves 9$a$, 9$b$, 9$c$, 9$bc$, 9$ab$, and 9$ca$ in association with the nitrogen-free ozone generation units 7-1 to 7-$n$ and the ozone treatment apparatuses 12-1 to 12-$n$. The request ozone flow rate Qs12 (SLM) and the request ozone concentration Cs12(g/m$^3$) of the ozone treatment apparatuses 12-1 to 12-$n$ are also displayed.

In an example shown in FIG. 7, only the ozone treatment apparatus 12-2 requests the request ozone flow rate Qs12=30 SLM and the request ozone concentration Cs12=280 (g/m$^3$).

Thereby, each of the nitrogen-free ozone generation units 7-1 to 7-$n$ is caused to output the ozone gas with an ozone flow rate of 10 (SLM) and an ozone concentration of 280 (g/m$^3$), and the ozone gas control valves 9$a$, 9$b$, 9$c$, 9$bc$, and 9$ab$ are brought into the open state while the ozone gas control valve 9$ca$ is brought into the closed state. Thus, the ozone gas can be supplied to the ozone treatment apparatus 12-2 with an ozone flow rate of 30 (SLM) and an ozone concentration of 280 (g/m$^3$).

(Ozone Control Part)

As shown in FIG. 8, the ozone control part 19 provided in each nitrogen-free ozone generation unit 7 controls the ozone power source 2 to thereby control the ozone generation (the gas flow rate and the ozone gas concentration) in the nitrogen-free ozone generator 1.

The ozone power source 2 includes a converter 2a, an inverter 2b, a high voltage circuit part 2c, and a current sensor 2d. The converter 2a rectifies commercial AC voltages AC1φ to AC3φ. The inverter 2b converts a DC voltage into a frequency most suitable for the nitrogen-free ozone generator 1, and controls an output voltage to supply predetermined power to the nitrogen-free ozone generator 1. The high voltage circuit part 2c raises the voltage outputted from the inverter 2b into a high voltage capable of producing a discharge that causes the ozone generation in the nitrogen-free ozone generator 1. The converter 2a, the inverter 2b, and the high voltage circuit part 2c are connected in series in the mentioned order. The current sensor 2d is interposed between the converter 2a and the inverter 2b.

In order to control the ozone gas generation (the gas flow rate Q and the ozone concentration C) in the nitrogen-free ozone generator 1, the ozone control part 19 applies the high frequency high voltages HV and LV, which are outputted by the high voltage circuit part 2c, to the nitrogen-free ozone generator 1, and causes a discharge phenomenon to thereby generate an ozone gas containing a predetermined amount of ozone from the oxygen gas which is the raw material gas.

The ozone control part 19 includes a raw material gas flow rate setter 1S1, a selector 1S2, an ozone concentration setter 1S3, analog switches 1S4-A to 1S4-F for controlling ON/OFF of the respective control signals, and inverter devices 1S5-1, 1S5-2 for inverting the respective control signals.

The ozone control part 19 further includes a data memory 1S6 and a current signal converter 1S7. The data memory 1S6 stores a set power Ws necessary for generating an optimum amount of ozone in response to the raw material gas set flow rate Qs, the set concentration Cs, and a signal including the set pressure Ps of the nitrogen-free ozone generator 1. The current signal converter 1S7 converts the set power Ws into a current signal for applying a necessary current to the ozone power source.

Additionally, the ozone control part 19 includes a timer 1S8 and a PID control circuit 1S9. The timer 1S8 drives the inverter 2b based on an initial current command, and switches to a PID control in response to the flow rate Q of the actually flowing raw material gas and the ozone concentration C of the generated ozone obtained by the MFC 3 and the ozone concentration meter 5. The PID control circuit 1S9 performs the PID control based on a result of comparison between the ozone concentration C and the gas set concentration Cs.

Moreover, the ozone control part 19 includes an event adjuster 1S10 for, in response to the ozone generation unit control signal 86 received from the system management control part 84, adjusting the signal including the set flow rate Qs and the set ozone concentration Cs based on the request ozone flow rate Qs8, the request ozone concentration Cs8, and the operation information Y8 indicated by the ozone generation unit control signal 86.

Furthermore, the ozone control part 19 includes a pressure setter 1S11, an initial pulse width setter 1S12, and a current converter 1S13. The initial pulse width setter 1S12 sets, based on the output current of the current signal converter 1S7, an initial pulse width in which the inverter 2b is turned ON, for controlling the applied power. The current converter 1S13 receives the ozone concentration C detected by the ozone concentration meter 5 and the set ozone concentration Cs, and, based on a result of comparison between the ozone concentration C and the raw material gas set concentration Cs, outputs a current signal for controlling the power applied to the inverter 2b.

(Data Memory 1S6)

As shown in FIG. 9, the data memory 1S6, which stores initial conditions for controlling the ozone concentration and the ozone flow rate in the nitrogen-free ozone generation unit 7, includes a plurality of memory banks BK1 to BK4 (four memory banks are shown in FIG. 9 for convenience of the description), with the set pressure Ps of the nitrogen-free ozone generator 1 serving as a parameter. If the set pressure Ps of the nitrogen-free ozone generator 1 is determined, accordingly the memory bank BKx (any one of 1 to 4) corresponding to the set pressure Ps is selected.

As shown in FIG. 9, the one memory bank BK selected is divided into a plurality of areas each corresponding to ΔQ along a horizontal axis (X-axis) that represents an address of the set flow rate Qs for the ozone-gas flow rate, while the one memory bank BK selected is divided into a plurality of areas each corresponding to ΔC along a vertical axis (Y-axis) that represents an address of the set concentration Cs for the ozone concentration.

The data memory 1S6 receives the signal including the set flow rate Qs and the set concentration Cs functioning as the address on the horizontal axis (X-axis) and the vertical axis (Y-axis). In the data memory 1S6, a set power amount W (A11 to A17, . . . , A61 to A67) required for generating a predetermined amount of ozone is written into a memory address which is determined by the address on the X-axis and the Y-axis. The data memory 1S6 outputs the set power amount Ws to the current signal converter 1S7 provided in the ozone control part 19. As a result, the current signal converter 1S7 converts the set power amount Ws into a current signal. The current signal is supplied through the analog switch 1S4-E to the initial pulse width setter 1S12. The initial pulse width setter 1S12 outputs a pulse signal Tw to the inverter 2b. The pulse signal Tw has a predetermined frequency and a predetermined pulse width, and is for achieving the set power amount Ws.

As shown in FIG. 10, the output concentration control waveform obtained in a case where the output concentration control is performed on the nitrogen-free ozone generation unit 7 corresponds to an operation command signal (included in the operation information Y8) supplied to the nitrogen-free ozone generation unit 7, and, in an initial state defined by a set time period To, sets the power applied to the inverter 2b based on the set power amount Ws supplied from the data memory 1S6.

After the elapse of the set time period To, the timer 1S8 performs a time control so that the control is switched to the PID control performed by the PID control circuit 1S9. The PID control circuit 1S9 slightly varies a pulse width ATw of the pulse signal Tw based on the current signal (the signal determined based on the result of comparison between the ozone gas concentration C (detected by the ozone concentration meter 5) and the gas set concentration Cs) supplied from the current converter 1S13. Thereby, the PID control circuit 1S9 performs the PID control on the power applied to the inverter 2b. As a result, the ozone concentration (C) of the ozone generated in the nitrogen-free ozone generator 1 exhibits a control responsiveness waveform shown in part (a) of FIG. 10.

Hereinafter, a concentration control shown in FIG. 10 will be described in detail. Firstly, a description will be given to an operation of the nitrogen-free ozone generation unit 7 alone, which is not based on the ozone generation unit control signal 86.

Triggered by an input of an operation command (not shown), the event adjuster 1S10 activates the timer 1S8. At this time, the event adjuster 1S10 controls a raw material gas flow rate comparator 1S2 so as to select the raw material gas set flow rate Qs of the raw material gas flow rate setter 1S1, and brings the analog switches 1S4-A and 1S4-D into the ON state while bringing the analog switches 1S4-B and 1S4-C into the OFF state. On the other hand, the timer 1S8, immediately after being activated, brings the analog switch 1S4-E into the ON state while bringing the analog switch 1S4-F into the OFF state.

Thus, the data memory 1S6 obtains the set pressure Ps from the pressure setter 1S11, the raw material gas set flow rate Qs from the raw material gas flow rate setter 1S1, and the raw material gas set concentration Cs from the ozone concentration setter 1S3. Consequently, as described above, the data memory 1S6 outputs the set power amount Ws to the current signal converter 1S7. As a result, the initial pulse width setter 1S12 generates the pulse signal Tw having the initial pulse width. The ON/OFF of the inverter 2b is controlled in accordance with "H" or "L" of the pulse signal Tw.

In this manner, within the set time period To during which the timer 1S8 is in an operation state, an initial control is performed based on the set power amount Ws supplied from the data memory 1S6.

Then, when the set time period To has elapsed since the timer 1S8 was activated, the initial state ends, and the analog switch 1S4-E is switched to the OFF state while the analog switch 1S4-F is switched to the ON state.

Thus, the PID control circuit 1S9 performs the PID control on the ozone power source 2. The PID control is mainly for, based on the current signal supplied from the current converter 1S13, causing a slight displacement ($\Delta$Tw) of the pulse width of the pulse signal Tw so as to reflect the result of comparison between the ozone concentration C obtained by the ozone concentration meter 5 and the gas set concentration Cs. Here, also based on a current I detected by the current sensor 2d, the PID control circuit 1S9 causes the slight displacement $\Delta$Tw. In this manner, the control is switched to the PID control (W) after the set time period To has elapsed since the operation command.

Next, a description will be given to an operation of the nitrogen-free ozone generation unit 7 alone, which is based on the ozone generation unit control signal 86.

Triggered by an input of the ozone generation unit control signal 86 indicating the request ozone flow rate Qs8, the request ozone concentration Cs8, and the operation information Y8, the event adjuster 1S10 activates the timer 1S8. At this time, the analog switches 1S4-A and 1S4-D are brought into the OFF state, and the analog switches 1S4-B and 1S4-C are brought into the ON state. On the other hand, the timer 1S8, immediately after being activated, brings the analog switch 1S4-E into the ON state while bringing the analog switch 1S4-F into the OFF state.

The request ozone flow rate Qs8 and the request ozone concentration Cs8 are determined by the system management control part 84 based on the request ozone flow rate Qs12 and the request ozone concentration Cs12 that are indicated by the process ozone gas event signals 16-1 to 16-n supplied from the ozone treatment apparatuses 12-1 to 12-n.

Thus, the data memory 1S6 obtains the set pressure Ps from the pressure setter 1S11, and the request ozone flow rate Qs8 and the request ozone concentration Cs8 indicated by the ozone generation unit control signal 86 which serve as the set flow rate Qs and the set concentration Cs. Consequently, as described above, the data memory 1S6 outputs the set power amount Ws to the current signal converter 1S7. As a result, the initial pulse width setter 1S12 generates the pulse signal Tw having the initial pulse width.

In this manner, also by the input of the ozone generation unit control signal 86, the initial control is performed based on the set power amount Ws supplied from the data memory 1S6 within the set time period To during which the timer 1S8 is in the operation state.

Then, after the set time period To has elapsed since the timer 1S8 was activated, the initial state ends, and the analog switch 1S4-E is switched to the OFF state while the analog switch 1S4-F is switched to the ON state.

Thus, the PID control circuit 1S9 performs the PID control on the ozone power source 2. The PID control is mainly for, based on the current signal supplied from the current converter 1S13, causing a slight displacement ($\Delta$Tw) of the pulse width of the pulse signal Tw.

Figure 11:
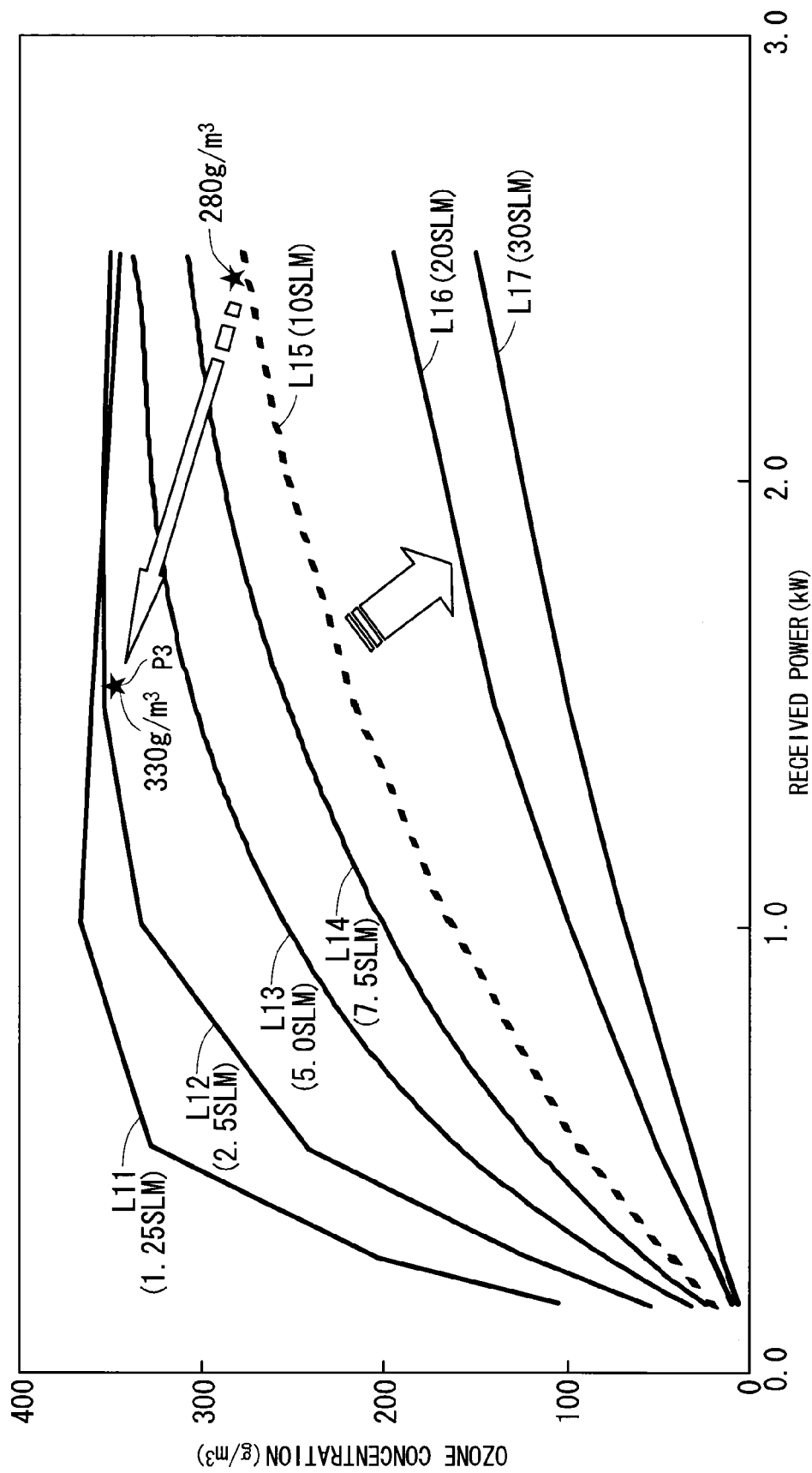
FIG. 11 A graph showing received power of an ozone power source included in one nitrogen-free ozone generation unit, and ozone concentration characteristics of ozone generated in an ozone generator.

As thus far described, the ozone control part 19 performs the initial control and the PID control on the ozone power source 2. FIG. 11 is a graph showing received power of the ozone power source 2 of 2.5 KW provided in one nitrogen-free ozone generation unit 7, and ozone concentration characteristics of ozone occurring in the nitrogen-free ozone generator 1.

In FIG. 11, ozone concentration characteristics L11 represent the ozone concentration characteristics obtained when the flow rate Q of the ozone gas supply is 1.25 L/min (=1.25 SLM). In this case, by making the received power variable in a range of 100 W to 1.0 kW, the ozone concentration of the generated ozone can be variably set in a range of about 0 g/m$^3$ to 360 g/m$^3$.

In the same manner, ozone concentration characteristics L12 represent the ozone concentration characteristics obtained when the flow rate Q of the ozone gas supply is 2.5 SLM. In this case, by making the received power variable in a range of 100 W to 2.0 kW, the ozone concentration of the generated ozone can be variably set in a range of about 0 g/m$^3$ to 360 g/m$^3$.

Ozone concentration characteristics L13 represent the ozone concentration characteristics obtained when the flow rate Q of the ozone gas supply is 5.0 SLM. Ozone concentration characteristics L14 represent the ozone concentration characteristics obtained when the flow rate Q of the ozone gas supply is 7.5 SLM. Ozone concentration characteristics L15 represent the ozone concentration characteristics obtained obtained when the flow rate Q of the ozone gas supply is 10 SLM. Ozone concentration characteristics L16 represent the ozone concentration characteristics obtained when the flow rate Q of the ozone gas supply is 20 SLM. Ozone concentration characteristics L17 represent the ozone concentration characteristics obtained when the flow rate Q of the ozone gas supply is 30 SLM.

In a case where the ozone gas is supplied from one ozone generation unit 7 with a flow rate Q of 5 SLM, the maximum ozone concentration generated with the received power 2.5 kW is 350 g/m$^3$ (see the ozone concentration characteristics L13). In a case where the ozone gas is supplied with a flow rate Q of 7.5 SLM, the maximum ozone concentration generated with the received power 2.5 kW is 300 g/m$^3$ (see the ozone concentration characteristics L14).

In a case where the ozone gas is supplied with a flow rate Q of 10 SLM, the maximum ozone concentration generated with the received power 2.5 kW is only 280 g/m$^3$ (see the ozone concentration characteristics L15). In a case where the ozone gas is supplied with a flow rate Q of 20 SLM, the maximum ozone concentration generated with the received power 2.5 kW is only 180 g/m³ (see the ozone concentration characteristics L16). In a case where the ozone gas is supplied with a flow rate Q of 30 SLM, the maximum ozone concentration generated with the received power 2.5 kW is only 140 g/m³ (see the ozone concentration characteristics L17).

In order to maintain an ozone concentration of 280 g/m³ in the nitrogen-free ozone generation unit 7 including the ozone power source 2 with a received power of 2.5 kW, the highest flow rate that can be supplied by one nitrogen-free ozone generator 1 is 10 SLM. In other words, in order to satisfy an ozone concentration of 280 g/m³ by using one nitrogen-free ozone generator 1, it is impossible to supply the ozone gas with a flow rate equal to or higher than 10 SLM.

On the other hand, the ozone gas supply system 10 of this embodiment adopts an output ozone gas output control method in which the ozone gas output flow rate management unit 9 is able to selectively output one or more of n ozone gas outputs supplied from the n nitrogen-free ozone generation units 7-1 to 7-n to any ozone treatment apparatus 12 among the ozone treatment apparatuses 12-1 to 12-n.

Therefore, in the ozone gas supply system 10 of the embodiment 1, by controlling the opening/closing of the ozone gas control valves 9ab, 9bc, and 9ca each provided between the units within the ozone gas output flow rate management unit 9 in the manner as shown in FIGS. 6 and 7, all of the ozone gases generated by the n nitrogen-free ozone generation units 7-1 to 7-n can be supplied to only one ozone treatment apparatus 12-2. Accordingly, by causing each of the nitrogen-free ozone generation units 7-1 to 7-n to output the ozone gas with a flow rate of 10 SLM and an ozone gas concentration of 280 g/m³, an ozone A gas can be supplied to the ozone treatment apparatus 12-2 with a gas flow rate of 30 SLM, and at that time, the ozone concentration can be made as high as 280 g/m³. This provides an effect that the treatment capacity of the ozone treatment apparatus, such as a processing speed and the performance, can be considerably improved while the existing ozone generator is used.

Additionally, if the flow rate of the raw material gas is 10 SLM in the nitrogen-free ozone generation unit 7, the maximum outputtable ozone concentration is 280 g/m³. However, the ozone concentration can be increased by using the control of opening/closing of the ozone gas control valves 9ab, 9bc, and 9ca each provided between the units in the ozone gas output flow rate management unit 9.

For example, in a case where the opening/closing of the ozone gas control valves 9a, 9b, 9c, 9bc, 9ab, and 9ca is controlled as shown in FIGS. 6 and 7 such that each of the three ozone generation units 7 supplies the gas with a flow rate of 3.3 SLM, the output concentration can be increased to the maximum value of the ozone concentration corresponding to 3.3 SLM. Thus, as indicated by an imaginary point P3, the ozone gas can be supplied with a total flow rate of 10 SLM and with an ozone concentration of about 330 g/m³. This provides an effect that an ozone treatment capacity of the ozone treatment apparatus 12-2 that receives the ozone gas supply can be increased.

In the ozone gas supply system 10 of this embodiment that includes the n nitrogen-free ozone generation units 7 and that adopts the output ozone gas output control method implemented by the ozone gas output flow rate management unit 9, breakdown of any of the nitrogen-free ozone generation units 7-1 to 7-n does not make the corresponding ozone treatment apparatus 12 unusable. The ozone gas outputted from the nitrogen-free ozone generation unit 7 that is not broken down can be supplied by opening/closing the ozone gas control valves 9ab, 9bc, and 9ca. This can provide an ozone gas supply system with a higher reliability of ozone gas supply.

For example, in a case where the nitrogen-free ozone generation unit 7-2 corresponding to the ozone treatment apparatus 12-2 is broken down, the ozone gas supplied from the nitrogen-free ozone generation unit 7-1 can be supplied to the ozone treatment apparatus 12-2 by opening the ozone gas control valves 9a, 9ab and the ozone gas on/off valve 22-2 into the open state.

Furthermore, even though any of the n ozone treatment apparatuses 12-1 to 12-n is broken down or stops its operation, the operation information Y of the process ozone gas event signal 16 is introduced and thereby the operation of the nitrogen-free ozone generation unit 7 that is supplying the ozone gas to the broken-down ozone treatment apparatus 12 can be promptly stopped by the ozone generation unit control signal 86.

(Effects, etc.)

In the above-described embodiment 1, one ozone gas supply system 10 includes the plurality of nitrogen-free ozone generation units 7-1 to 7-n, and each nitrogen-free ozone generation unit 7 includes the nitrogen-free ozone generator 1 having the means for generating the ozone gas, the ozone power source 2 having the means for controlling power to be supplied for ozone generation, the MFC 3 having the means for controlling the flow rate Q of the raw material gas to be a constant value, the APC 4 having the means for automatically controlling the pressure P in the nitrogen-free ozone generator 1, and the ozone concentration meter 5 having the means for detecting the concentration value C of the output ozone gas.

In the nitrogen-free ozone generator 1, the raw material gas is the oxygen gas alone, and an MFC for adding a nitrogen gas of several thousands f or more is not necessary. An ozone gas having a higher purity and a higher concentration, in which no by-product such as $NO_X$ and an OH radical substance is contained, can be independently supplied to a plurality of ozone treatment apparatuses, with separate amounts of ozone gas and separate ozone concentrations.

In the ozone gas supply system 10, the ozone gas output flow rate management unit 9 is provided in which the open/close valve (ozone gas control valves 9a to 9c) is arranged corresponding to the output ozone gas pipe of each nitrogen-free ozone generator 1, and additionally the open/close valve (9bc, 9ab, 9ca) is arranged between the output ozone gas pipes of the respective nitrogen-free ozone generators 1.

The ozone gas supply system 10 of the embodiment 1 includes the system collective management unit 8 (ozone gas output flow rate management unit control part) that can control the ozone gas output flow rate so that one or a combination of two or more of the plurality of ozone gas outputs from the nitrogen-free ozone generation units 7-1 to 7-n can be selectively outputted to any of the ozone treatment apparatuses 12-1 to 12-n by the opening/closing operation of the ozone gas control valves 9a, 9b, 9c, 9bc, 9ab, and 9ca provided in the ozone gas output flow rate management unit 9.

Accordingly, by bringing the ozone gas control valves 9a, 9b, and 9c into the open state, bringing the ozone gas control valves 9ab, 9bc, and 9ca into the closed state, and bringing the ozone gas on/off valves 22-1 to 22-n into the open state so that the ozone gas can be supplied from the nitrogen-free ozone generation units 7-1 to 7-n to the ozone treatment apparatuses 12-1 to 12-n that are in one-to-one correspondence with each other, the gas flow rate and the ozone gas concentration of the ozone gas supplied to the ozone treatment apparatuses 12-1 to 12-n can be independently controlled.

Additionally, as shown in FIGS. 6 and 7, supplying a combination of two or more ozone gas outputs to one ozone treatment apparatus (ozone treatment apparatus 12-2) makes it possible to supply the ozone gas with various gas flow rates and various concentrations.

Moreover, even when a trouble occurs in a part of the nitrogen-free ozone generation units 7-1 to 7-$n$, the other nitrogen-free ozone generation units 7 that are normally operating are able to supply the ozone gas to any of the ozone treatment apparatuses 12-1 to 12-$n$. Therefore, an ozone gas supply with a high reliability is achieved.

In this manner, the ozone gas supply system 10 controls the ozone gas output flow rate management unit 9 based on the control signal S8 supplied from the system management control part 84, to perform a combination/selection process for combining and selecting ozone gas outputs from the nitrogen-free ozone generation units 7-1 to 7-$n$, so that the ozone gas can be outputted to the ozone treatment apparatus 12 with a desired gas flow rate and a desired ozone gas concentration.

In the ozone gas supply system 10 of the embodiment 1, electrically-operated valves or pneumatic valves that are openable and closable by means of electricity or air pressure are adoptable as the ozone gas control valves 9$a$, 9$b$, 9$c$, 9$bc$, 9$ab$, and 9$ca$ provided in the ozone gas output flow rate management unit 9. Thereby, the gas flow rate and the ozone gas concentration of the ozone gas outputted from the nitrogen-free ozone generator 1 of each nitrogen-free ozone generation unit 7 to the outside can be centrally managed under control of the control signal S8.

The system collective management unit 8 includes the water leakage sensor 6, the EMO circuit 81, the unit information I/F 82, the system management control part 84, and the like. Thereby, in a case where an emergency stop or water leakage is detected in any of the nitrogen-free ozone generation units 7-1 to 7-$n$, the corresponding said nitrogen-free ozone generation unit can be stopped.

Furthermore, the exhaust gas sensor 23, the ozone leakage sensor 24, the system management control part 84, and the like, are provided. Thereby, in a case where an abnormal exhaust or an abnormal ozone leakage is detected in the system as a whole, all the nitrogen-free ozone generation units 7-1 to 7-$n$ can be stopped.

In this manner, the ozone gas supply system 10 of the embodiment 1 has a function for safety shutdown which is exerted in a case where a trouble of each nitrogen-free ozone generation unit 7, a trouble of the entire ozone gas supply system 10, and the like. Thus, a system with a high security is achieved.

Furthermore, in the ozone gas supply system 10 of the embodiment 1, an ozone gas having a higher purity and a higher concentration, in which no by-product such as $NO_X$ and an OH radical substance is contained, can be independently supplied to a plurality of ozone treatment apparatuses, with separate amounts of ozone gas and separate ozone concentrations. Thus, this apparatus is able to collectively manage the amount of ozone gas and the ozone concentration in a plurality of ozone treatment processes in the field of semiconductor fabrication. This is effective for labor-saving in an ozone treatment facility.

Embodiment 2

An embodiment 2 is characterized by focusing on the nitrogen-free ozone generation unit 7 as one unit corresponding to each of the nitrogen-free ozone generation units 7-1 to 7-$n$ in the ozone gas supply system 10, and achieving downsizing of the nitrogen-free ozone generation unit 7.

Figure 12:
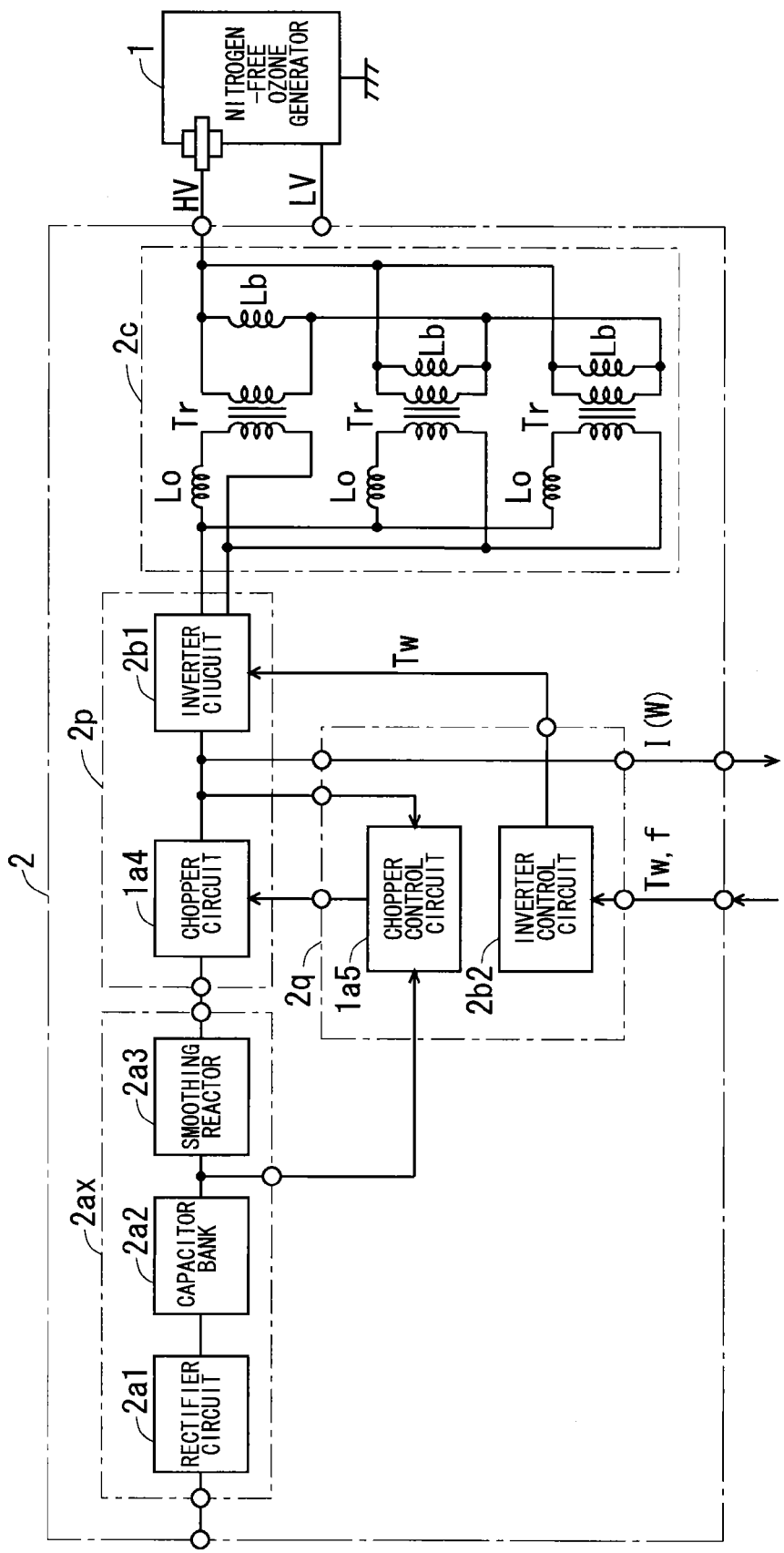
FIG. 12 A circuit diagram showing details of an internal configuration of an ozone power source provided in a nitrogen-free ozone generation unit according to an embodiment 2.
Figure 13:
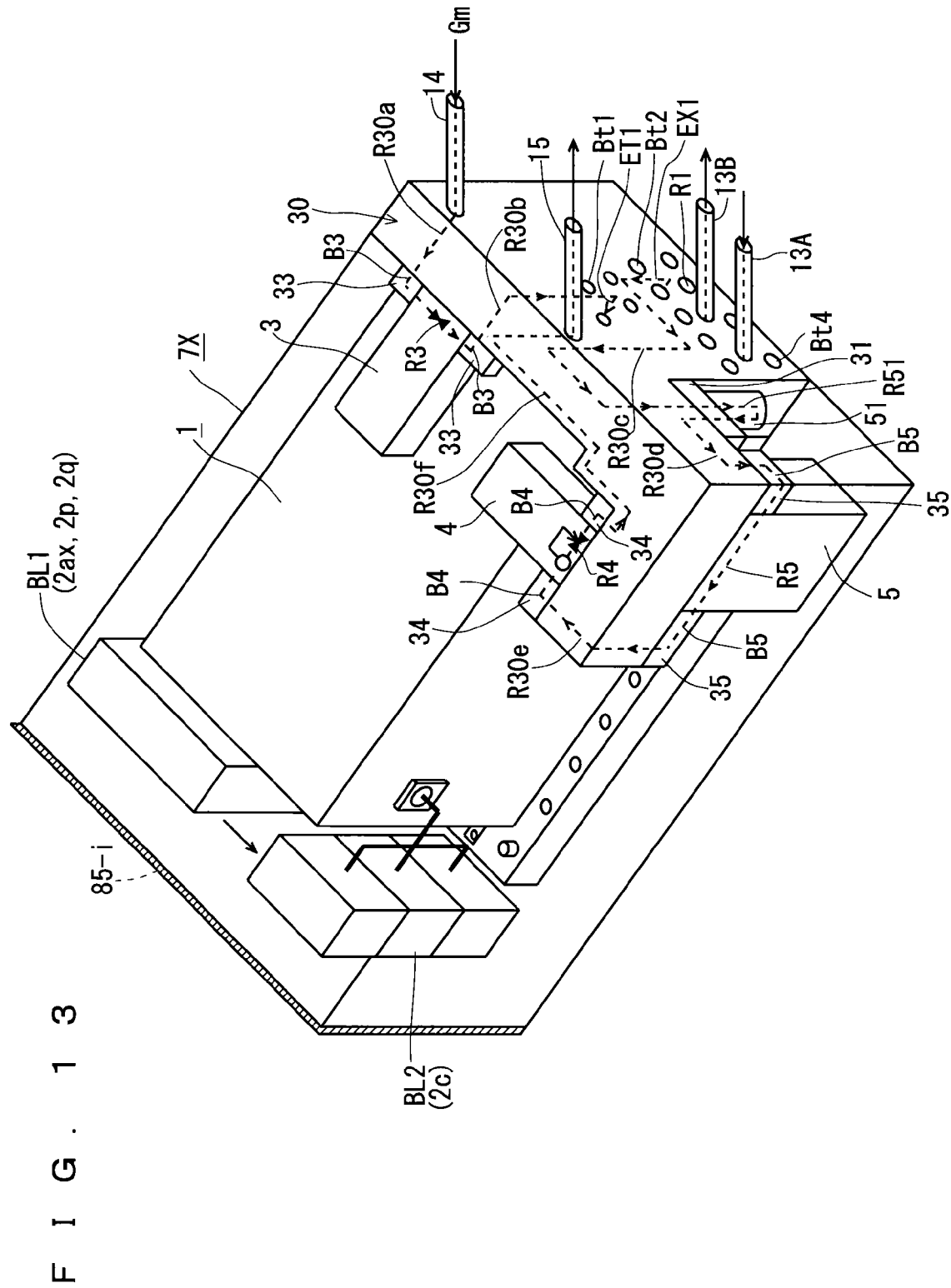
FIG. 13 A perspective view schematically showing a combined structure of the nitrogen-free ozone generation unit according to the embodiment 2.

FIG. 12 is a circuit diagram showing details of an internal configuration of the ozone power source 2. FIG. 13 is a perspective view schematically showing a combined structure of a nitrogen-free ozone generation unit 7X according to the embodiment 2.

Hereinafter, downsizing of the nitrogen-free ozone generation unit 7X will be described with reference to FIGS. 12 and 13. The nitrogen-free ozone generation unit 7X means an ozone generation unit as one unit that is configured as each of the nitrogen-free ozone generation units 7-1 to 7-$n$ according to the embodiment 1.

In the nitrogen-free ozone generation unit 7X shown in FIG. 13, each of the ozone power source 2 and the nitrogen-free ozone generator 1 is downsized. Not only the compactified ozone power source 2 configured to supply power and having the means for controlling the amount of power, and the compactified nitrogen-free ozone generator 1 having the means for generating an ozone gas, but also the MFC 3 having means for controlling the flow rate of the raw material gas, the gas filter 51 having the means for removing impurities from the ozone gas, the ozone concentration meter 5 having the means for detecting the ozone gas concentration of the outputted ozone gas, and the APC 4 having the means for controlling the gas pressure in the ozone generator to a constant value, are assembled together into a package, thereby achieving the nitrogen-free ozone generation unit 7X serving as one unit in a structural sense, too.

Additionally, a raw material gas pipe (raw material gas supply port 14) and an output gas pipe system (ozone gas output port 15) are integrated into a gas pipe integrated block 30 as a gas pipe integrated block structure. Thereby, the nitrogen-free ozone generator 1, the ozone power source 2, and the gas pipe system are packaged, and thus the nitrogen-free ozone generation unit 7X is further downsized.

Therefore, even if, as in the ozone gas supply system 10 of the embodiment 1, a plurality of nitrogen-free ozone generation units 7X are mounted as the nitrogen-free ozone generation units 7-1 to 7-$n$, an ozone gas supply system having improved functionality and improved reliability is achieved without increasing the size of the apparatus as a whole.

(Compactification of Ozone Power Source 2)

FIG. 12 shows a compactified circuit configuration achieved by integrating main components of the nitrogen-free ozone generator 1 and the ozone power source 2 with each other.

In order to obtain a desired amount of ozone generation, the nitrogen-free ozone generator 1 requires an area as a discharge area for generation of ozone. Therefore, to reduce an area occupied by the generator, a thin electrode cell is formed and moreover a cross-sectional area of one electrode cell is reduced. Thereby, the nitrogen-free ozone generator 1 of multi-layered electrode cell type is formed. This achieves the nitrogen-free ozone generator 1 that occupies a very small area.

The ozone power source 2 includes the converter 2$a$ for rectifying the commercial AC voltage, the inverter 2$b$ for converting the DC voltage into a high frequency most suitable for the nitrogen-free ozone generator and controlling the output voltage to supply predetermined power to the ozone generator, and the high voltage circuit part 2$c$ for raising the voltage outputted from the inverter 2$b$ into a high voltage capable of producing the discharge that causes the ozone generation in the nitrogen-free ozone generator 1. The ozone control part 19 controls applied power of the ozone power source.

The converter 2$a$ is made up of a rectifier circuit 2$a$1, a capacitor bank 2$a$2, a smoothing reactor 2$a$3, a chopper circuit part 2a4, and a chopper control circuit part 2a5 that are connected in series. The inverter 2b is made up of an inverter circuit 2b1 and an inverter control circuit 2b2. Each component of the converter 2a and the inverter 2b of the ozone power source 2 is sorted and formed into a module. Thus, the circuit configuration is downsized.

To be specific, the rectifier circuit 2a1, the capacitor bank 2a2, and the smoothing reactor 2a3 are integrated into a DC/smoothing circuit part 2ax as a module. Thus, the circuit configuration is downsized, and the quality of the component is increased.

The chopper circuit part 2a4 forming the converter 2a and the inverter circuit 2b1 forming the inverter 2b are made of power semiconductors such as an FET device or an IGBT device, and need to be cooled by a cooling fin. Therefore, by forming the chopper circuit part 2a4 and the inverter circuit 2b1 into a single semiconductor module, an effectively downsized power device part 2p is achieved. By forming the chopper control circuit 2a5 of the converter 2a and the inverter control circuit 2b2 of the inverter 2b on a single substrate or as an integrated circuit IC, an extremely downsized power supply control substrate 2q is achieved.

The high voltage circuit part 2c is made up of a series reactor L0 for limiting an inverter output current, a high voltage transformer Tr for raising the voltage, and a parallel reactor Lb for improving power factor. Each of the components is large and heavy in weight. However, a special transformer is formed by which the series reactor L0 and the parallel reactor Lb can be integrated and functions thereof can be incorporated into the high voltage transformer Tr. That is, a transformer is designed such that the series reactor L0 can be integrated by using a primary leakage inductance of the high voltage transformer. The parallel reactor Lb is designed such that a large excitation inductance of the transformer can be obtained. Thus, the function of the parallel reactor Lb can be incorporated into the transformer.

Furthermore, the high voltage transformer Tr is adapted to a high frequency of several tens kHz. Thereby, the transformer can be formed using a ferrite core having a light weight and good high frequency characteristics. To reduce an installation area of the transformer Tr and to ensure a predetermined capacity of the transformer, a plurality of small transformers are connected in parallel. The plurality of (in the drawing, three) transformers are vertically installed, thus achieving the very small high voltage circuit part 2c. However, the series reactor L0 for limiting the output current of the inverter may not be integrated into the transformer, but may be independently formed as a small reactor L0.

(Combined Structure of Ozone Generation Unit)

FIG. 13 shows the nitrogen-free ozone generation unit 7X as one unit in which the nitrogen-free ozone generator 1, the ozone power source 2, the MFC 3, the gas filter 51, the ozone concentration meter 5, the APC 4, and the gas pipe integrated block 30 are assembled together.

In FIG. 13, a control panel 85-$i$ (i indicates any of one to n) is provided on a front surface (at the left side in FIG. 13), and the integrated ozone control part 19 (not shown) is provided at the rear side thereof. The ozone control part 19 is connected via electrical signals to the nitrogen-free ozone generator 1, the ozone power source 2 (blocks BL1 and BL2), the MFC 3, the ozone concentration meter 5, and the APC 4 that are assembled together. Hereinafter, a description will be given on the assumption that a side where the control panel 85-$i$ exists is defined as the front surface of the nitrogen-free ozone generation unit 7X.

As shown in FIG. 8, in the nitrogen-free ozone generator 1 and the ozone power source 2, for example, each of the components is formed into a module, so that the number of components is reduced, thus compactifying each component and reducing the installation area thereof. As shown in FIG. 9, in one nitrogen-free ozone generation unit 7X, the nitrogen-free ozone generator 1 is provided at the center, and the DC/smoothing circuit part 1Ax, the power device part 2p, and the power supply control substrate of the ozone power source 2 are formed into the single block BL1 which is arranged at the front surface, while a plurality of small transformers laminated in the vertical direction are formed into the high voltage circuit part 2c as the block BL2. By such a distributed arrangement, the integration is achieved.

The gas supply pipe system including the MFC 3 for supplying the raw material gas, the ozone gas output pipe system for outputting the ozone gas to the outside via the gas filter 51, the ozone concentration meter 5, and the APC 4, and a cooling pipe system (the cooling water inlet port 13A, the cooling water outlet port 13B) for cooling the electrodes of the nitrogen-free ozone generator 1, are necessary for the nitrogen-free ozone generator 1. These pipe systems have to be arranged three-dimensionally. Therefore, if the components are connected by existing gas pipes, cooling pipes, and the like, the number of connection joints for connecting the pipes and the components is increased. This makes it necessary to ensure a connection space for connecting the joints. Thus, in order to connecting these pipe systems, a very large space is required.

Conventionally, a pipe unit separate from the nitrogen-free ozone generation unit (nitrogen-free ozone generator) is provided, for example, at the rear side, and the generator unit and the pipes are connected at the rear side. Therefore, it has been difficult to integrate the nitrogen-free ozone generation unit with the gas supply pipe system, the ozone gas output pipe system, and the cooling pipe system 13A, 13B.

In the embodiment 2, these pipe systems are assembled together into the single gas pipe integrated block 30, and pipe paths for the gas supply pipe, the ozone gas output pipe, and the cooling pipe are incorporated in the gas pipe integrated block 30. This gas pipe integrated block 30 has a three-dimensional structure, and at respective surfaces thereof, the nitrogen-free ozone generator 1, the MFC 3, the gas filter 51, the ozone monitor 5, and the APC 4 (hereinafter, these may be collectively referred to as "nitrogen-free ozone generator 1 and the like") are adjacently arranged. A connecting portion between the nitrogen-free ozone generator 1 and the like and the gas pipe integrated block 30 is, for example, screwed via an O-ring, thereby keeping air-tightness to ensure highly accurate pipe paths. As a result, the nitrogen-free ozone generator 1 and the like can be arranged integrally with the gas pipe integrated block 30. Additionally, the components of the ozone generator 1 and the like can be mounted and dismounted easily, thus improving maintainability.

In this manner, in the nitrogen-free ozone generation unit 7X of the embodiment 2, the nitrogen-free ozone generator 1 and the like are mounted in close contact with the gas pipe integrated block 30. In the following, a description will be given to the pipe paths in the nitrogen-free ozone generation unit 7X which utilizes the gas pipe integrated block 30 shown in FIG. 13. In the gas pipe integrated block 30, pipe paths R30a to R30f are provided. The cooling water inlet port 13A, the cooling water outlet port 13B, the raw material gas supply port 14, and the ozone gas output port 15 are mounted to the side surfaces of the gas pipe integrated block 30. The nitrogen-free ozone generator 1 is mounted to the gas pipe integrated block 30 using ozone generator mounting bolts Bt1 to Bt4.

The MFC 3 is interposed between MFC mounting blocks 33, 33 and thereby mounted to the gas pipe integrated block 30. The APC 4 is interposed between APC mounting blocks 34, 34 and thereby mounted to the gas pipe integrated block 30. The ozone concentration meter 5 is interposed between ozone concentration meter mounting blocks 35, 35 and thereby mounted. In these mounting blocks 33 to 35, in-block passages B3 to B5 for ensuring the pipe paths are formed. The gas filter 51 is mounted to the gas pipe integrated block 30 by using a gas filter mounting block 31.

A raw material gas input pipe path for a raw material gas Gm to be supplied from the raw material gas supply port 14 through the MFC 3 to an ozone generator input part ET1 of the nitrogen-free ozone generator 1 is a path constituted of the raw material gas supply port 14, the pipe path R30a, the in-block passage B3, the MFC 3, the in-block passage B3, the pipe path R30b, and the ozone generator input part ET1 arranged in the mentioned order. At this time, a portion of the nitrogen-free ozone generator 1 around the ozone generator input part ET1 is mounted to the gas pipe integrated block 30 by the ozone generator mounting bolt Bt1. In this manner, the input pipe path for the raw material gas Gm is formed using the gas pipe integrated block 30.

An ozone gas output pipe for an ozone gas outputted from the nitrogen-free ozone generator 1 and received by an ozone generator output part EX1 to be outputted from the ozone gas output port 15 through the gas filter 51, the ozone concentration meter 5, and the APC 4 is a path constituted of the nitrogen-free ozone generator output part EX1, the pipe path R30c, the inside of the gas filter mounting block 31, the gas filter 51, the inside of the gas filter mounting block 31, the pipe path R30d, the in-block passage B5, the ozone concentration meter 5, the in-block passage B5, the pipe path R30e, the in-block passage B4, the APC 4, the in-block passage 134, the pipe path R30f, and the ozone gas output port 15 arranged in the mentioned order. At this time, a portion of the nitrogen-free ozone generator 1 around the ozone generator output part EX1 is mounted to the gas pipe integrated block 30 by the ozone generator mounting bolt Bt2. In this manner, the output pipe path for the ozone gas is formed using the gas pipe integrated block 30.

Figure 24:
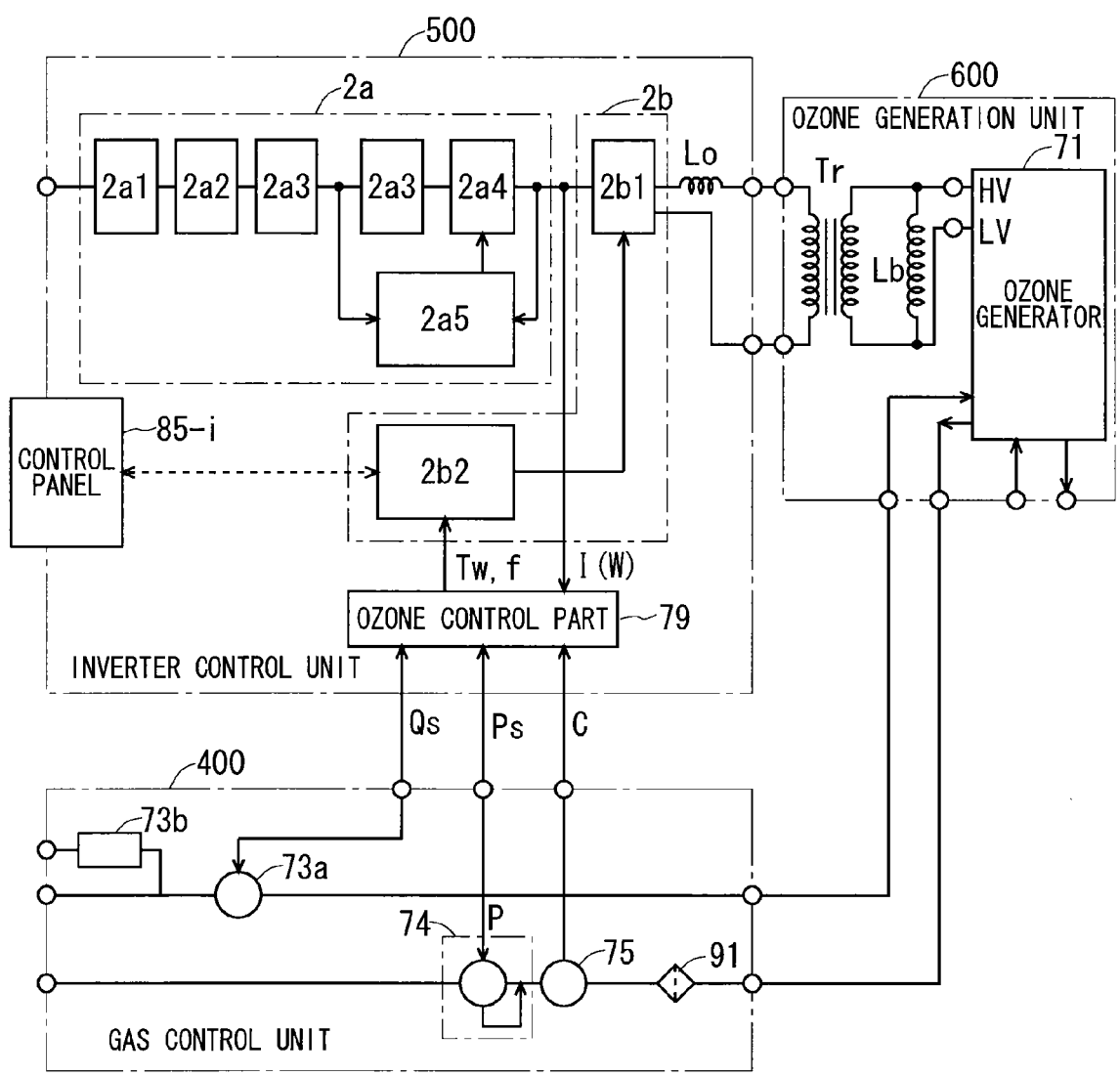
FIG. 24 An explanatory diagram schematically showing a conventional configuration corresponding to the ozone generation unit according to the embodiment 2.

FIG. 24 is an explanatory diagram schematically showing a conventional configuration corresponding to the nitrogen-free ozone generation unit 7X. As shown in FIG. 24, conventionally, the configuration corresponding to the nitrogen-free ozone generation unit 7X generally has a gas control unit 400, an inverter control unit 500, and an ozone generation unit 600 that are divided from one another.

The gas control unit 400 is provided therein with an MFC 73, an APC 74, an ozone concentration meter 75, and a gas filter 91. The inverter control unit 500 is provided therein with a converter 2a, an inverter 2b, an ozone control part 79, an control panel 85-i, a series reactor L0, and the like. The nitrogen-free ozone generation unit 600 includes an ozone generator 71, and a high voltage transformer Tr and a parallel reactor Lb.

The inside of the converter 2a includes a rectifier circuit 2a1, a capacitor bank 2a2, a smoothing reactor 2a3, a chopper circuit part 2a4, and a chopper control circuit part 2a5. The inverter 2b includes an inverter circuit 2b1 and an inverter control circuit 2b2. Herein, a description of the connection relationship and details of the operation is omitted.

In a conventional ozone gas supply system or a conventional ozone generation apparatus, as shown in FIG. 24, merely an electrical connection or a gas pipe connection is allowed between three divided blocks of the gas control unit 400, the inverter control unit 500 corresponding to the ozone power source, and the ozone generation unit 600. Thus, the structure shown in FIG. 13 cannot be achieved.

As shown in FIG. 13, in the nitrogen-free ozone generation unit 7X, these three units (400, 500, 600) are assembled together, to achieve considerable downsizing as compared with the configuration shown in FIG. 24.

Thus, the nitrogen-free ozone generation unit 7X of the embodiment 2 is formed as an integrated structure in which the nitrogen-free ozone generator 1, the ozone power source 2, the MFC 3, the gas filter 51, the APC 4, the ozone concentration meter 5, the raw material gas supply port 14, the ozone gas output port 15, the cooling water inlet port 13A, and the cooling water outlet port 13B are assembled together. This can achieve considerable downsizing as compared with the similar, conventional configuration.

Additionally, the gas pipe integrated block 30 of the nitrogen-free ozone generation unit 7X has the pipe paths R30a to R30f that are a plurality of internal pipe paths. Therefore, by connecting the pipe paths R30a to R30f to the ozone generator 1, the MFC 3, the gas filter 51, the APC 4, the ozone concentration meter 5, the raw material gas supply port 14, the ozone gas output port 15, and each of the cooling water inlet/outlet ports 13A and 13B, the input pipe path for the raw material gas Gm described above and the output pipe path for the ozone gas described above are formed. Accordingly, downsizing of the part including these pipe paths can be effectively achieved.

In this manner, by downsizing each of the nitrogen-free ozone generation units 7-1 to 7-n as the nitrogen-free ozone generation unit 7X of the embodiment 2, the ozone gas supply system 10 shown in the embodiment 1 can be achieved at a practical use level.

As a result, in the ozone gas supply system of the embodiment 2, similarly to in the ozone gas supply system 10 of the embodiment 1, it is possible that a plurality of the nitrogen-free ozone generation units 7X are installed. By connecting the output pipes of the nitrogen-free ozone generation units 7X by the gas control valve 9, the supply of the ozone gas can be distributed among the respective ozone treatment apparatuses 12 including the ozone treatment apparatuses 12-1 to 12-n or a large amount of ozone gas or an ozone gas having a high concentration can be selectively supplied to one ozone treatment apparatus 12, as described in the embodiment 1.

Moreover, in the ozone gas supply system of the embodiment 2, a part corresponding to the nitrogen-free ozone generation system is configured as an integrated nitrogen-free ozone generation unit. This enables the ozone gas having a high purity and a high concentration to be independently supplied to a plurality of ozone treatment apparatuses under separate amount parameter conditions, which is an effect of the embodiment 2. Therefore, not only the effect that "this apparatus is able to collectively manage the amount of ozone gas and the ozone concentration in a plurality of ozone treatment processes in the field of semiconductor fabrication, so that labor-saving in an ozone treatment facility is achieved", but also an effect that the ozone gas supply system itself can be made compact and inexpensive, is exerted.

Embodiment 3

An embodiment 3 is, similarly to the embodiment 2, characterized by focusing on the nitrogen-free ozone generation unit 7 as one unit, and achieving downsizing of the nitrogen-free ozone generation unit 7 in combination with the ozone gas output flow rate management unit 9.

(Control of Ozone Gas Output Flow Rate Management Unit)

Figure 14:
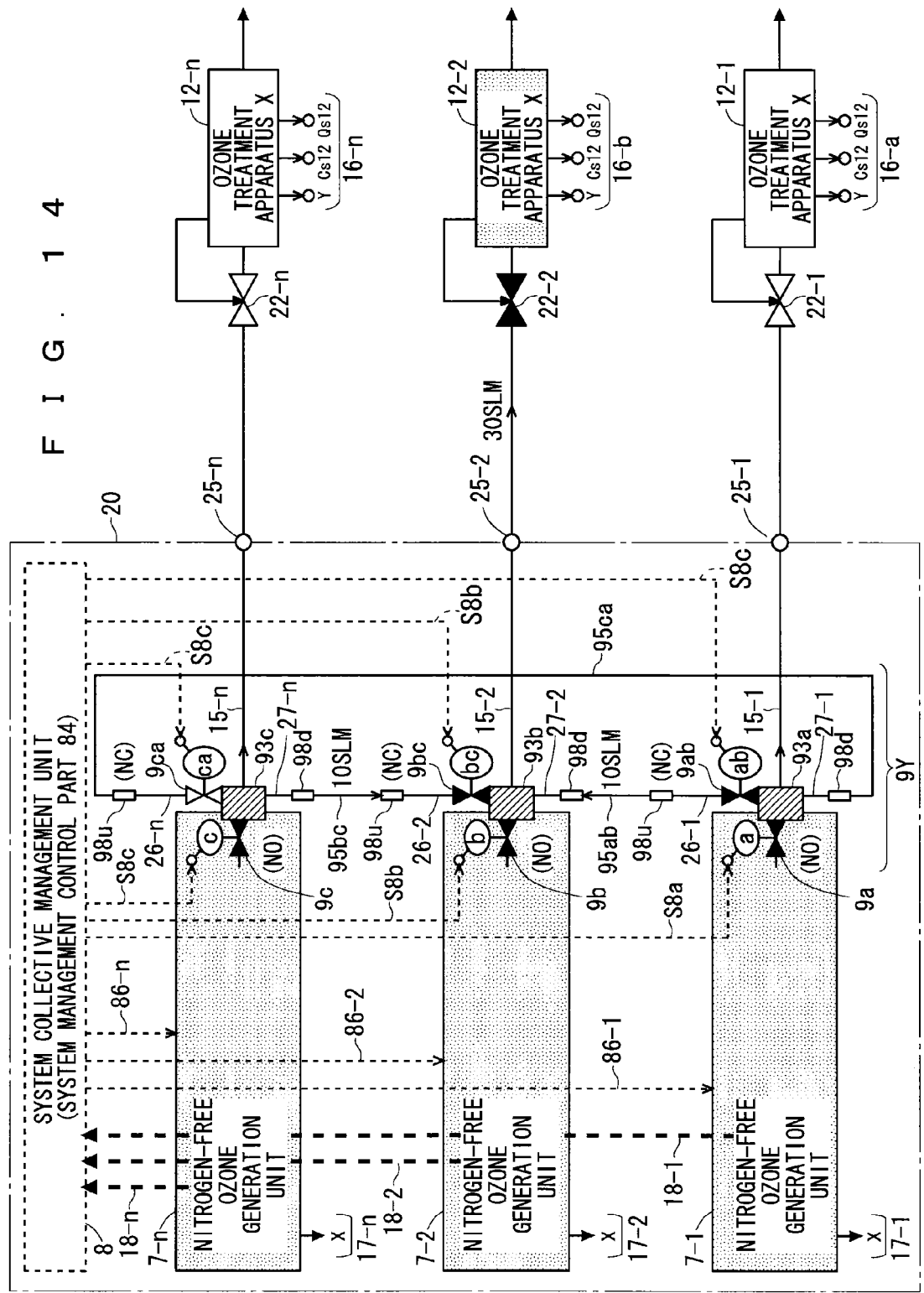
FIG. 14 An explanatory diagram showing an internal configuration of an ozone gas output flow rate management unit according to an embodiment 3, which is included in the ozone gas supply system shown in FIG. 5.

FIG. 14 is an explanatory diagram showing an internal configuration of an ozone gas output flow rate management unit based on an ozone gas supply system 20 of the embodiment 3 that corresponds to the ozone gas supply system 10 shown in FIG. 5.

As shown in FIG. 14, in an ozone gas output flow rate management unit 9Y of the embodiment 3 corresponding to the ozone gas output flow rate management unit 9 of the embodiment 1, portions corresponding to the respective nitrogen-free ozone generation units 7-1 to 7-n are formed integral with one another. In the following, for convenience of the description, a case of n=3 will be described as an example with reference to FIG. 14.

The ozone gas control valves 9a to 9c are integrally provided corresponding to the nitrogen-free ozone generation units 7-1 to 7-n. Mounting blocks 93a to 93c are provided in close contact with the ozone gas control valves 9a to 9c. The ozone gas control valve 9ab, the ozone gas control valve 9bc, and the ozone gas control valve 9ca are provided at one path side (at the upper side in FIG. 14) of the mounting blocks 93a, 93b, and 93c.

The ozone gas control valve 9ab provided at the one path side of the mounting block 93a is connected to the other path side (the lower side in FIG. 14) of the mounting block 93ab via a pipe fitting 98u, an inter-unit ozone gas pipe 95ab, and a pipe fitting 98d. In the same manner, the ozone gas control valve 9ab provided at the one path side of the mounting block 93ab is connected to the other path side of the mounting block 93ac via a pipe fitting 98u, an inter-unit ozone gas pipe 95bc, and a pipe fitting 98d. The ozone gas control valve 9ca provided at the one path side of the mounting block 93ac is connected to the other path side of the mounting block 93a via a pipe fitting 98u, an inter-unit ozone gas pipe 95ca, and a pipe fitting 98d.

Furthermore, the output is made from output parts (at the right side in FIG. 14) of the mounting blocks 93a to 93c through the ozone gas output ports 25-1 to 25-n to the outside of the ozone gas supply system 20 of the embodiment 3.

Accordingly, the ozone gas output flow rate management unit 9Y has the ozone gas control valves 9a, 9b, 9c, 9bc, 9ab, and 9ca as a circuit configuration similar to the ozone gas output flow rate management unit 9.

The ozone gas on/off valves 22-1 to 22-n are interposed between the ozone gas output ports 25-1 to 25-n and the ozone treatment apparatuses 12-1 to 12-n.

In the ozone gas control valves 9a, 9b, 9c, 9bc, 9ab, and 9ca that form the ozone gas output flow rate management unit 9Y, the ozone gas control valves 9a, 9b, and 9c are of the normally open type (NO), and the ozone gas control valves 9bc, 9ab, and 9ca are of the normally close type (NC).

A control signal S8a supplied from the system management control part 84 of the system collective management unit 8 is given to the ozone gas control valve 9a and the ozone gas control valve 9ab, and a control signal S8b is given to the ozone gas control valve 9b and the ozone gas control valve 9bc, and a control signal S8c is given to the ozone gas control valve 9c and the ozone gas control valve 9ca.

In this manner, the open state and the closed state of the ozone gas control valves 9a, 9b, 9c, 9bc, 9ab, and 9ca of the ozone gas output flow rate management unit 9Y are controlled based on the control signal S8 (S8a to S8c) supplied from the system management control part 84 of the system collective management unit 8.

In FIG. 14, among the ozone treatment apparatuses 12-1 to 12-n, only one ozone treatment apparatus 12-2 is operated (the ozone gas on/off valve 22-2 is in the open state). FIG. 14 shows a state of the ozone gas output flow rate management unit 9Y in a case where the flow rate of the ozone gas supplied to the ozone treatment apparatus 12-2 is 30 SLM.

In other words, based on the ozone generation unit control signals 86-1 to 86-n supplied from the system management control part 84, the ozone gas with a flow rate of 10 SLM is outputted from each of the ozone generation units 7-1 to 7-n, and the ozone gas control valves 9a, 9b, 9c, 9bc, and 9ab are brought into the open state (blacked out) while the ozone gas control valve 9ca is brought into the closed state (shown in white).

On the other hand, among the ozone gas on/off valves 22-1 to 22-n, only the ozone gas on/off valve 22-2 is in the open state, while the ozone gas on/off valves 22-1 and 22-n are in the closed state, as described above. In a case where only the ozone treatment apparatus 12-2 is used and the other ozone treatment apparatuses 12 are not used, the ozone gas on/off valve 22 is closed. Here, in a case where there is no ozone treatment apparatus, pipe portions of the ozone gas outlet ports 25-1 and 25-n, which are non-used ozone gas outlets, may be forcibly capped with pipe cap fittings. Moreover, needless to say, in a case where any of the connection pipes 95ab, 95bc, and 95ca connecting the ozone generation units is not provided in the ozone gas supply system 10, any of the pipe fittings 98u and 98d is formed as a pipe cap fitting and capped so that the output ozone gas is blocked.

In this manner, the nitrogen-free ozone generation units 7-1 to 7-n and the ozone gas output flow rate management unit 9Y are controlled so that each of the nitrogen-free ozone generation units 7-1 to 7-n supplies the ozone gas with a flow rate of 10 SLM. This enables the ozone gas to be supplied through the ozone gas output flow rate management unit 9 to the ozone treatment apparatus 12-2 with a gas flow rate of 30 SLM.

(Combined Structure of Ozone Generation Unit)

Figure 15:
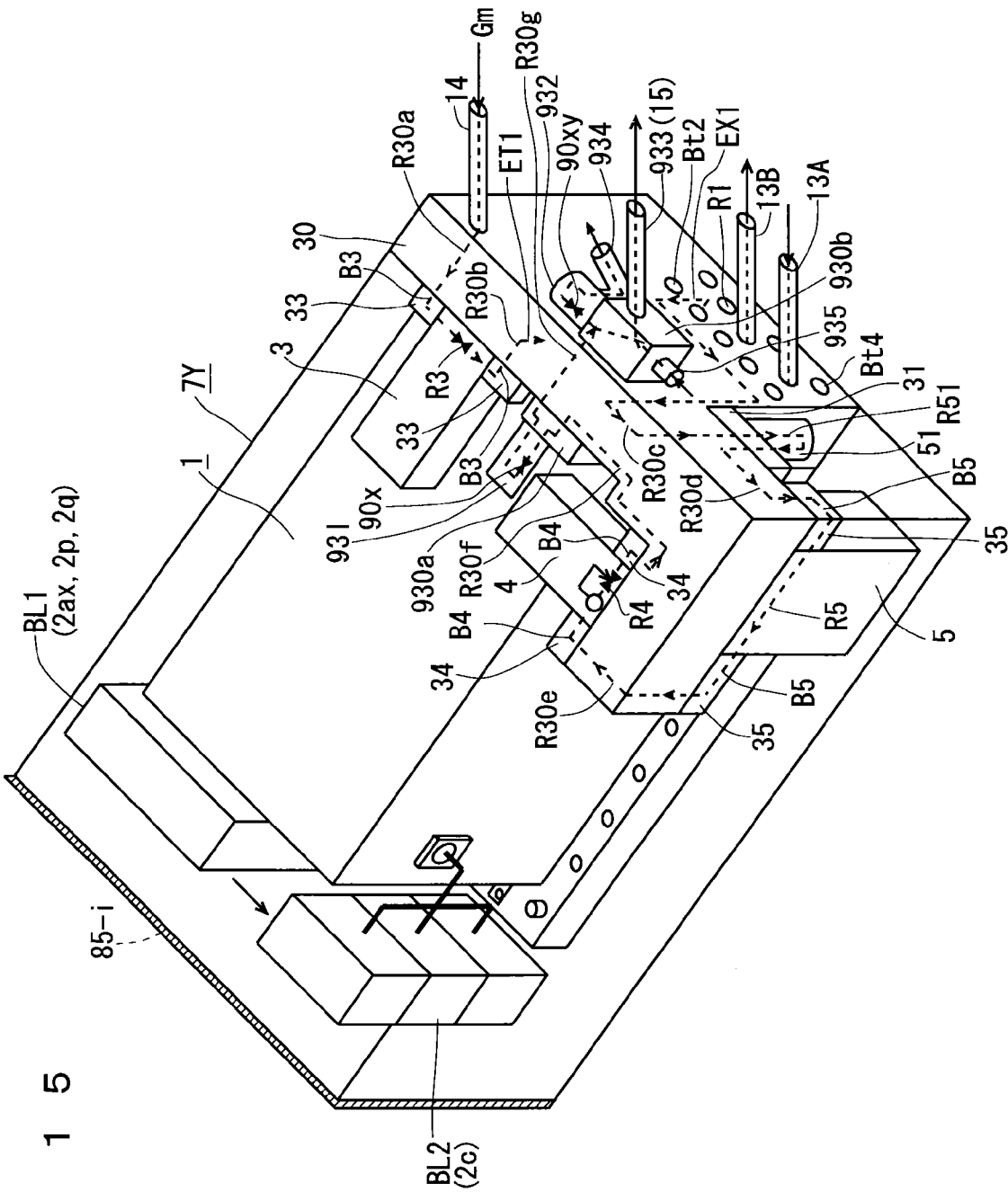
FIG. 15 A perspective view schematically showing a combined structure of a nitrogen-free ozone generation unit according to the embodiment 3.

FIG. 15 is a perspective view schematically showing a combined structure of one unit of the nitrogen-free ozone generation unit according to the embodiment 3. As shown in FIG. 15, in the nitrogen-free ozone generation unit 7Y of the embodiment 3, not only the nitrogen-free ozone generator 1, the ozone power source 2, the MFC 3, the gas filter 51, the ozone concentration meter 5, the APC 4, and the gas pipe integrated block 30, but also component parts of the ozone gas output flow rate management unit 9 are assembled together.

As shown in FIG. 15, in order to mount the component parts of the ozone gas output flow rate management unit 9 to the gas pipe integrated block 30, ozone gas control valve accommodation parts 931 and 932, an ozone gas output part 933, and ozone gas branching parts 934 and 935 are provided around block main bodies 930a and 930b (corresponding to any of the mounting blocks 93a to 93c shown in FIG. 10).

In the ozone gas control valve accommodation part 931, an ozone gas control valve 90x (corresponding to any of the ozone gas control valves 9a to 9c) is accommodated. In the ozone gas control valve accommodation part 932, an ozone gas control valve 90xy (corresponding to any of the ozone gas control valves 9ab, 9bc, and 9ca) is accommodated. The ozone gas output part 933 corresponds to the ozone gas output port 15 of the ozone generation unit 7X of the embodiment 2 shown in FIG. 13, and is connected to the ozone gas output port 25 shown in FIG. 14. The ozone gas branching part 934 functions as a branching part (inter-unit ozone gas pneumatic valve pipe connection port) at the one path side connected to the pipe fitting 98u shown in FIG. 14. The ozone gas branching part 935 functions as a branching part (inter-unit ozone gas pneumatic valve pipe connection port) at the other path side connected to the pipe fitting 98*d* shown in FIG. 14.

In the embodiment 3, similarly to the embodiment 2, all of the gas supply pipe system, the ozone gas output pipe system, and the cooling pipe systems 13A and 13B are assembled together into the single gas pipe integrated block 30. The component parts of the ozone gas output flow rate management unit 9Y are combined so that pipe paths for a gas supply pipe, an ozone gas output pipe, and a cooling pipe are incorporated in the gas pipe integrated block 30.

Substantially in the same manner as in the ozone generation unit 7X of the embodiment 2, the raw material gas input pipe path for the raw material gas Gm to be supplied from the raw material gas supply port 14 through the MFC 3 to the ozone generator input part ET1 of the nitrogen-free ozone generator 1 is a path constituted of the raw material gas supply port 14, the pipe path R30*a*, the in-block passage B3, the MFC 3, the in-block passage B3, the pipe path R30*b*, and the ozone generator input part ET1 arranged in the mentioned order.

The ozone gas output pipe extending from the ozone generator output part EX1 of the nitrogen-free ozone generator 1 through the gas filter 51, the ozone concentration meter 5, and the APC 4 to the block main body 930*b* is a path constituted of the ozone generator output part EX1, the pipe path R30*c*, the inside of the gas filter mounting block 31, the gas filter 51, the inside of the gas filter mounting block 31, the pipe path R30*d*, the in-block passage B5, the ozone concentration meter 5, the in-block passage B5, the pipe path R30*e*, the in-block passage B4, the APC 4, the in-block passage B4, the pipe path R30*f*, the block main body 930*a* (inner portion), the ozone gas control valve 90*x*, the pipe path R30*g*, and the block main body 930*b* (outer portion) arranged in the mentioned order. Here, the block main bodies 930*a* and 930*b* may be formed integral with each other and formed through the gas pipe integrated block 30.

In the block main body 930*b*, there are formed one branch path connected to the ozone gas branching part 934 through the ozone gas control valve 90*xy*, the other branch path connected to the ozone gas branching part 935, and a joint path in which the one and the other branch paths and the above-mentioned ozone gas output pipe are joined to form an output from the ozone gas output part 933.

The other parts, pipe paths, and the like, of the configuration are identical to those of the nitrogen-free ozone generation unit 7X shown in FIG. 13, and therefore a description thereof is omitted.

In the ozone gas supply system 20 of the embodiment 3, the plurality of ozone gas control valve accommodation parts 931 and 932 accommodating the ozone gas control valves 90*x* and 90*xy* therein are mounted in tight contact to the gas pipe integrated block 30 in the corresponding nitrogen-free ozone generation unit 7Y, and interposed on the output pipe path for the ozone gas described above.

This exerts an effect that, in the ozone gas supply system 20, the combined structure of the ozone gas output flow rate management unit 9Y and the nitrogen-free ozone generation units 7-1 to 7-*n* can be downsized.

In this manner, in the nitrogen-free ozone generation unit 7Y of the embodiment 3 has, the features of the nitrogen-free ozone generation unit 7X of the embodiment 2 are provided, and in addition, most part of the component parts of the ozone gas output flow rate management unit 9 and the gas pipe integrated block 30 are integrated to thereby achieve further downsizing as compared with a case where the nitrogen-free ozone generation unit 7X and the ozone gas output flow rate management unit 9 of the embodiment 2 are separately provided.

Embodiment 4

In an embodiment 4, in the configuration of the ozone gas supply system of the embodiment 2, a super-high purity moisture remover which is a gas filter for trapping moisture contained in the raw material gas is mounted to the raw material gas supply part, to thereby increase the purity of the raw material gas that is supplied into the apparatus. Thereby, an active gas that is generated together with the ozone gas within the apparatus can be suppressed.

Particularly, similarly to the embodiment 2, a super-high purity moisture remover for trapping moisture contained in the gas is mounted to the raw material gas inlet portion of one unit of the nitrogen-free ozone generation unit 7. Thus, by the combined structure, downsizing of the nitrogen-free ozone generation unit 7 and an increase in the performance and quality of the nitrogen-free ozone generator itself are achieved.

(Management of Gas Purity of Raw Material Gas)

Figure 28:
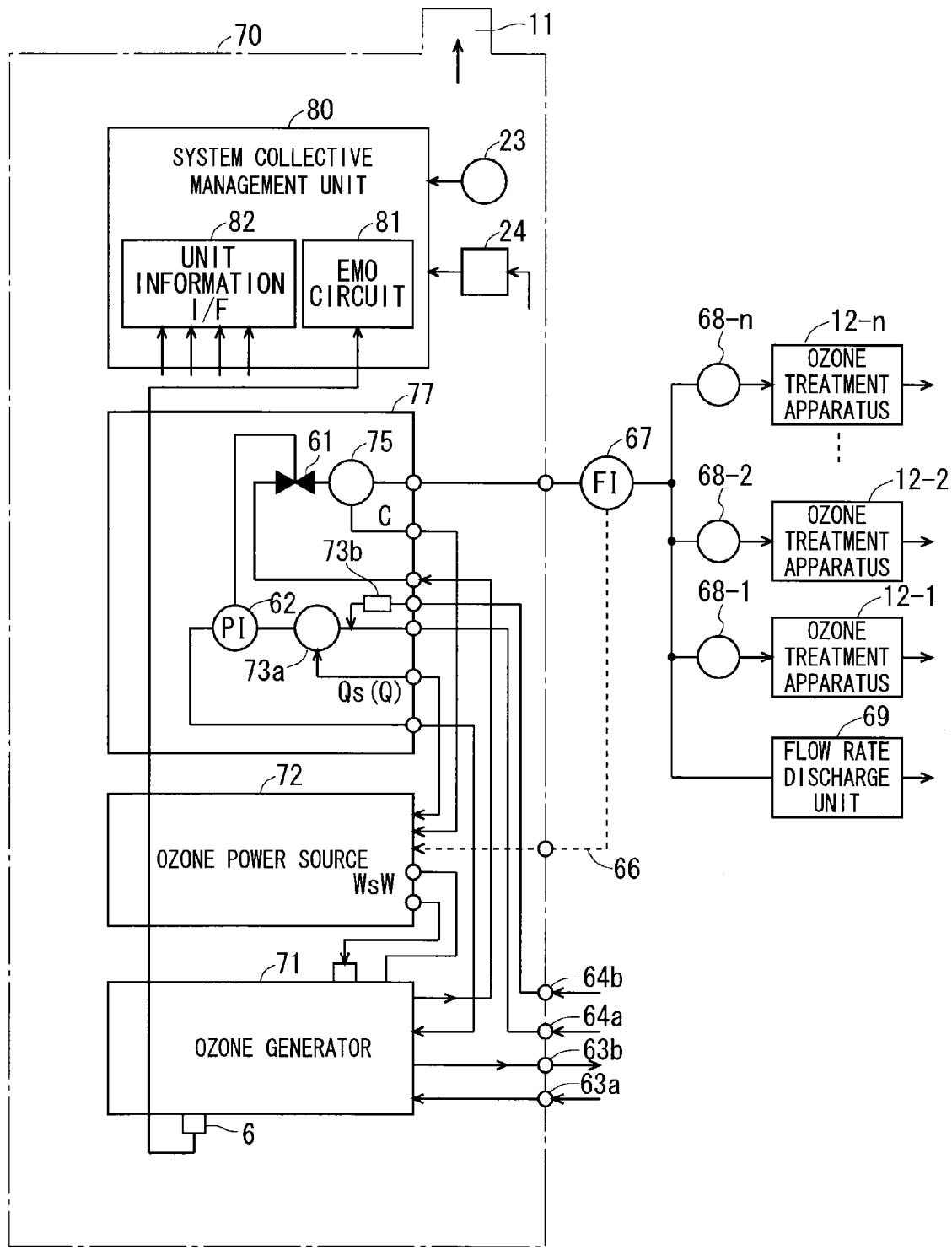
FIG. 28 A block diagram showing an internal configuration of a conventional ozone gas supply system.

In the conventional ozone generator in which nitrogen of several thousands ppm or more is added, a catalytic action of nitrogen dioxide $NO_2$ generated in the generator accelerates dissociation of the oxygen molecule. As a result, three bodies of an oxygen molecule and an oxygen atom produced as a result of the dissociation are bound, thus generating an ozonized gas having a high concentration. In this case, nitrogen dioxide $NO_2$ is in the form of a gas, and therefore there is little influence that deteriorates the ozone concentration as long as the moisture dew point of the raw material gas is equal to or lower than −50° C. (the moisture content is about 100 ppm). Accordingly, in the conventional ozone generator, a simple moisture remover that is able to ensure a moisture dew point of −50° C. or lower suffices in order to remove the moisture contained in the raw material gas (see FIG. 28).

On the other hand, the nitrogen-free ozone generator according to the invention of the present application is an apparatus that adopts a photocatalytic action as a catalytic action for generating the ozone gas, and a photocatalytic material is applied to the discharge surface so that ozone having a high purity and a high concentration is generated from a high purity oxygen gas. Accordingly, even though moisture contained in the raw material gas is a small amount of moisture of several tens ppm, the moisture contained in the gas is adsorbed by the photocatalytic material applied to the discharge surface, so that the moisture is accumulated. On the discharge surface where the moisture has been accumulated, the moisture is dissociated into a hydrogen H atom and an OH molecule due to a silent discharge. As a result, a chemical reaction of binding with the applied photocatalytic material causes reforming of the photocatalytic material itself. This deteriorates the ozone generation ability of the nitrogen-free ozone generator and accelerates the deterioration. This fact is being found out. Furthermore, when moisture is contained in the nitrogen-free ozone generator, the ozone gas containing an OH molecule and a hydrogen H atom produced as a result of dissociation is supplied to the ozone treatment apparatus. This causes a deterioration in the film formation quality in the semiconductor manufacturing process.

Therefore, in the nitrogen-free ozone generator according to the invention of the present application, the super-high purity moisture remover is mounted that removes moisture from the raw material gas that contains a small amount of moisture of 3000 ppb or more such that the moisture content is reduced to several hundred ppb or less (desirably 300 ppb or less).

Providing this super-high purity moisture remover can remove not only moisture but also $CO_2$, CO, and an extremely small amount of impurities, thus exerting an effect that an ozone gas having a higher purity can be obtained.

Figure 16:
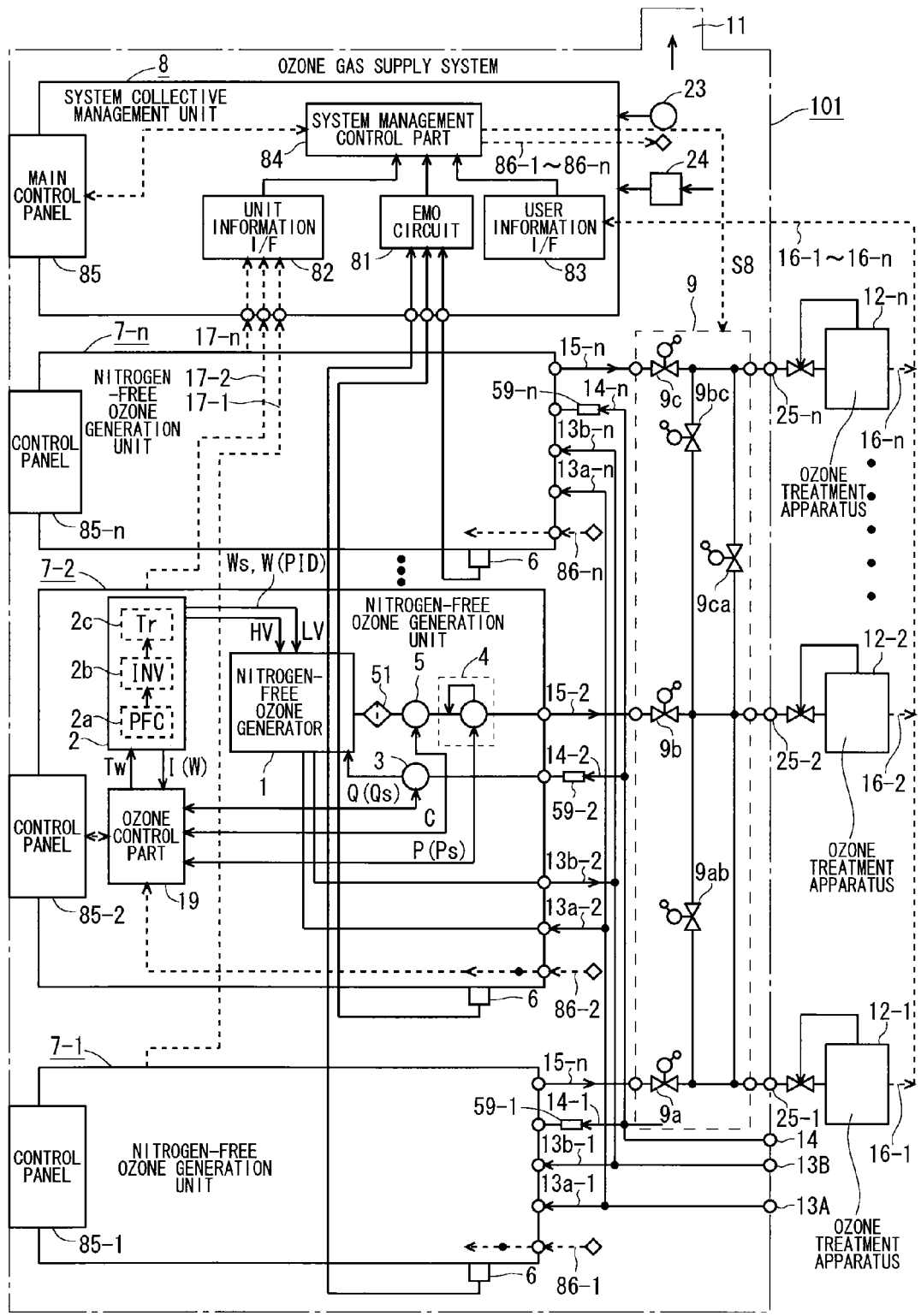
FIG. 16 A block diagram showing a configuration of an ozone gas supply system according to an embodiment 4 of the present invention.

FIG. 16 is an explanatory diagram showing an internal configuration for suppressing a small amount of moisture contained in the raw material gas supplied from an ozone gas supply system 101 of the embodiment 4, which corresponds to the ozone gas supply system 10 shown in FIG. 5.

Figure 17:
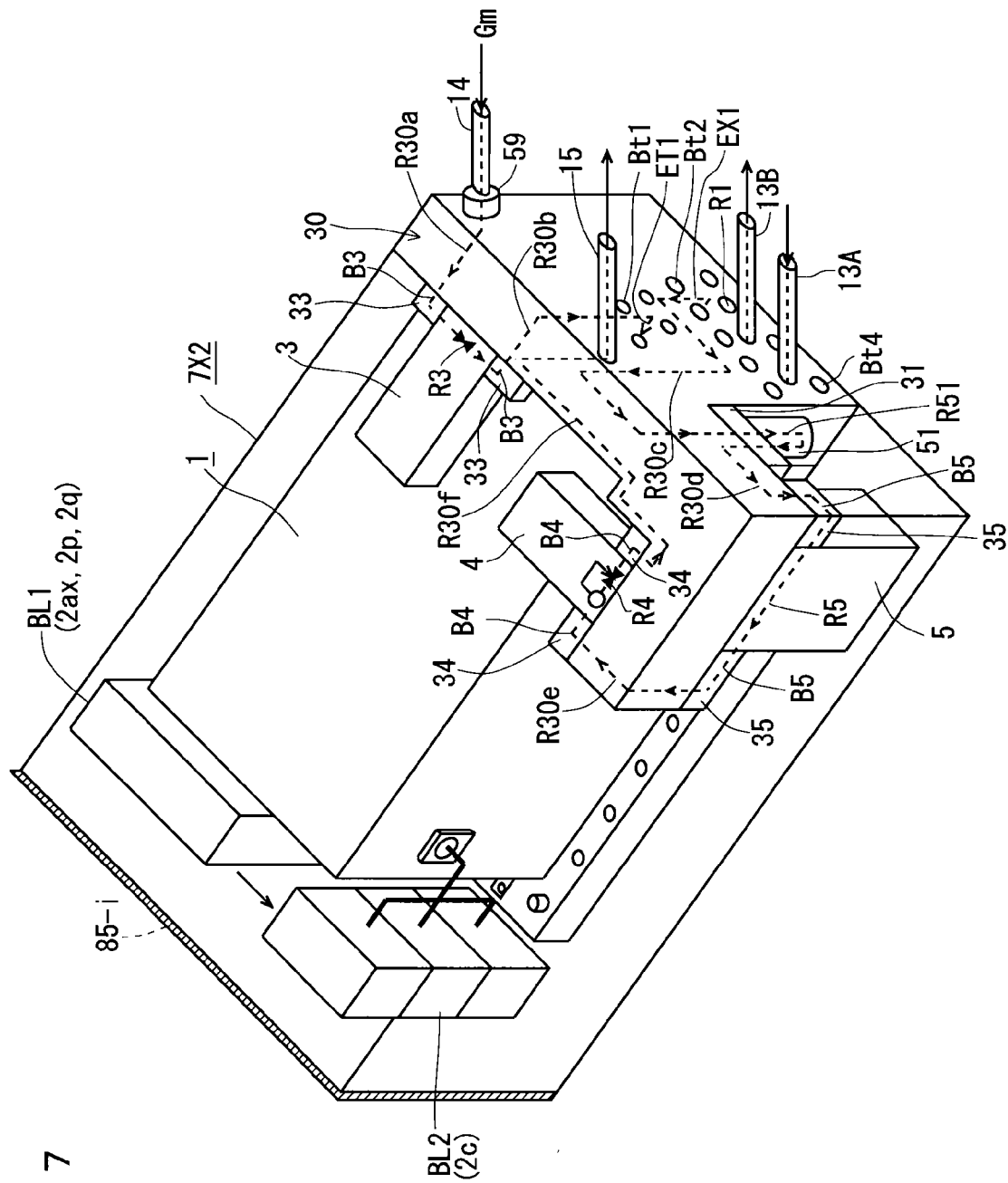
FIG. 17 A perspective view schematically showing a combined structure of a nitrogen-free ozone generation unit according to the embodiment 4.

FIG. 17 is a perspective view schematically showing a combined structure of a nitrogen-free ozone generation unit as one unit according to the embodiment 4.

As shown in FIGS. 16 and 17, in the raw material gas inlet ports 14-1 to 14-$n$ of the nitrogen-free ozone generation units 7-1 to 7-$n$, super-high purity moisture removers (gas filters) 59-1 to 59-$n$ are mounted at positions that allow easy replacement, and integrally formed. In the following, for convenience of the description, a case of n=3 will be described as an example, with reference to FIG. 16.

As shown in FIG. 17, a raw material gas pipe (the raw material gas supply port 14+the super-high purity moisture remover 59) and an output gas pipe system (the ozone gas output port 15) are integrated into a gas pipe integrated block 30 as a gas pipe integrated block structure. Thereby, the ozone generator 1, the ozone power source 2, and the gas pipe system are packaged, and thus the ozone generation unit 7X2 is further downsized. Here, the raw material gas supply port 14 and the super-high purity moisture remover 59 are coupled to each other.

As the raw material gas that is supplied to the ozone gas supply system 10, in general, a raw material gas having a high purity of 99.99% or higher is used. This high-purity raw material gas contains, in addition to the raw material gas, an impurity gas of about 0.1 to several ppm. Examples of the impurity gas include a nitrogen-based gas, a carbon-based gas, and a sulfide gas. The high-purity raw material gas also contains moisture of one to several ppm. Additionally, these impurity gas and moisture are contained in the air, too. Therefore, when a part of the pipes in the raw material gas pipe path is opened to the air, the moisture and the impurity gas such as a nitrogen gas are immediately adsorbed to a pipe surface. If the raw material gas flows in the raw material gas pipe to which the impurity gas is adsorbed, not only the impurity gas and the moisture contained in the high-purity raw material gas but also the impurity gas adhering to the pipe are separated by the gas flow, which may lower the purity of the supplied raw material gas.

If a small amount of moisture or an impurity gas such as a nitrogen-based gas, a carbon-based gas, or a sulfide gas is contained in the raw material gas, not only the ozone gas but also N radical and OH radical gases are generated by discharging. These radical gases are combined with the moisture, thus outputting the ozone gas that contains cluster molecule gases of nitric acid and hydrogen peroxide water. Since these cluster molecule gases of nitric acid and hydrogen peroxide water are very active gases, a chemical reaction occurs on a metal surface of the ozone-gas output gas pipe, the valve, or the like, to cause corrosion of the pipe surface. This may cause a corroded-metal impurity (metal contamination) to be contained in the output ozone gas.

An increase in the amount of the metal impurity (metal contamination) contained in the output ozone gas causes a deterioration in the performance of formation of, for example, an oxide film that is formed on a semiconductor by an oxide film process using the ozone gas.

From the above, it has been confirmed from tests that the quality of an output ozone gas is deteriorated if an impurity gas or a small amount of moisture is contained in the raw material gas. Accordingly, the super-high purity moisture removers (gas filters) for the purpose of trapping the impurity gas and removing a small amount of moisture are mounted to a raw material gas supply part. Particularly, in the embodiment 4, in the raw material gas inlet ports 14-1 to 14-$n$ of the nitrogen-free ozone generation units 7-1 to 7-$n$, the super-high purity moisture removers 59-1 to 59-$n$ are mounted at positions that allow easy replacement, so that the impurity gas and a small amount of moisture are removed.

To be specific, when the raw material gas supplied from the raw material gas supply port 14 contains moisture of 3000 ppb or more before the raw material gas passes through the super-high purity moisture removers 59-1 to 59-$n$, the super-high purity moisture removers 59-1 to 59-$n$ have a moisture removal ability to reduce the moisture contained in the raw material gas to 300 ppb or less.

In this manner, in the ozone gas supply system 101 of the embodiment 4, the super-high purity moisture removers 59-1 to 59-$n$ are provided in the raw material gas inlet ports 14-1 to 14-$n$ of the respective ozone generation units 7-1 to 7-$n$. Thereby, ozone having a high quality in which no impurity is contained can be obtained with a high concentration.

In this configuration, the super-high purity moisture removers 59-1 to 59-$n$ are provided in one-to-one correspondence with the nitrogen-free ozone generation units 7-1 to 7-$n$. However, depending on a type of the impurity gas, a plurality of gas filters may be provided in series and at multiple stages, or a gas filter for trapping a small amount of moisture may be configured.

The other parts, pipe paths, and the like, of the configuration are substantially identical to those of the nitrogen-free ozone generation unit 7X shown in FIG. 13. Therefore, a description thereof is omitted.

In the embodiment 4, at the raw material gas supply port 14 provided at a rear surface of the nitrogen-free ozone generation units 7-1 to 7-$n$, the super-high purity moisture remover is mounted at a position that allows easy replacement. As a result, the ozone gas having a higher purity is provided, and additionally, the mounted super-high purity moisture remover can remove a small amount of moisture. This exerts an effect that a time during which a purge gas is flowed prior to generation of the ozone gas can be considerably shortened.

In the embodiment 4, the super-high purity moisture removers 59-1 to 59-$n$ are provided corresponding to the nitrogen-free ozone generation units 7-1 to 7-$n$. Instead, one super-high purity moisture remover 59 having a function for trapping a small amount of moisture contained in the raw material gas supplied from the raw material gas supply port 14 may be additionally provided such that the one super-high purity moisture remover 59 is shared among the nitrogen-free ozone generation units 7-1 to 7-$n$. In such a case, when the raw material gas supplied from the raw material gas supply port 14 contains moisture of 3000 ppb or more before the raw material gas passes through the one super-high purity moisture remover 59, the super-high purity moisture remover 59 has a moisture removal ability to reduce the moisture contained in the raw material gas to 300 ppb or less.

Embodiment 5

An embodiment 5 illustrates another embodiment, "focusing on the nitrogen-free ozone generation unit 7 as one unit corresponding to each of the nitrogen-free ozone generation units 7-1 to 7-n, and achieving downsizing of the nitrogen-free ozone generation unit 7" of the embodiment 2. Particularly, instead of the MFC 3 of the embodiment 2 that is the means for controlling the flow rate of the raw material gas, an MFC 53 serving as flow-rate controller is arranged at the ozone gas output part for the output of the generated ozone gas, thus achieving downsizing of the nitrogen-free ozone generation unit 7.

(Ozone-Gas Flow-Rate Control)

Figure 19:
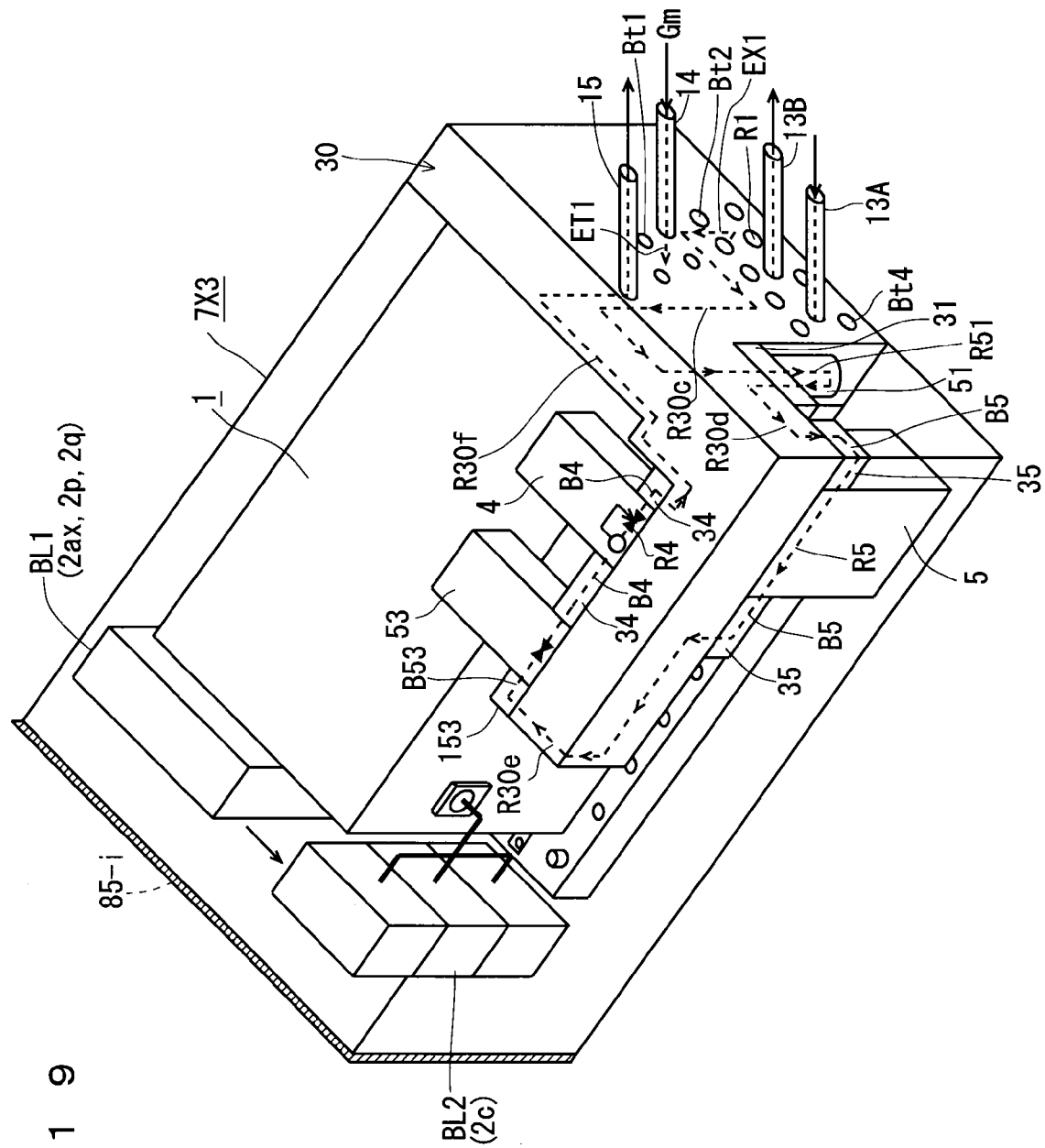
FIG. 19 A perspective view schematically showing a combined structure of a nitrogen-free ozone generation unit according to the embodiment 5.

FIG. 18 is an explanatory diagram showing an internal configuration for controlling the flow rate of the ozone gas by means of an ozone gas supply system 102 according to the embodiment 5, which corresponds to the ozone gas supply system 10 shown in FIG. 5. FIG. 19 is a perspective view schematically showing a combined structure of a nitrogen-free ozone generation unit as one unit according to the embodiment 5.

As shown in FIGS. 18 and 19, the embodiment 5 is an embodiment in which, in terms of the function, the MFC 3 serving as the gas-flow-rate controller provided in the raw material gas supply part in the embodiments 1 and 2 is displaced into the pipe system for the generated ozone gas. Since the operation, and the like, of the apparatus is identical to that of the embodiments 1 and 2, a description thereof is omitted.

In the embodiment 5, the amount of the generated output ozone gas itself is controlled by the MFC 53. This exerts an effect that the ozone-gas flow rate can be controlled so as to achieve an accurate output so that the amount of output ozone is accurately controlled.

It suffices that the raw material gas pipe system is directly piped, without the need of any pipe peripheral component. In the ozone gas output pipe part, the gas filter 51, the MFC 53, the ozone concentration meter 5, and the APC 4 are collectively mounted to the gas pipe component. Therefore, an integrated pipe configuration is allowed only in the output gas pipe system. As a result, the pipe can be made more compact, and the number of components of the integrated pipe configuration can be reduced, which makes it easier to replace components.

Embodiment 6

Figure 20:
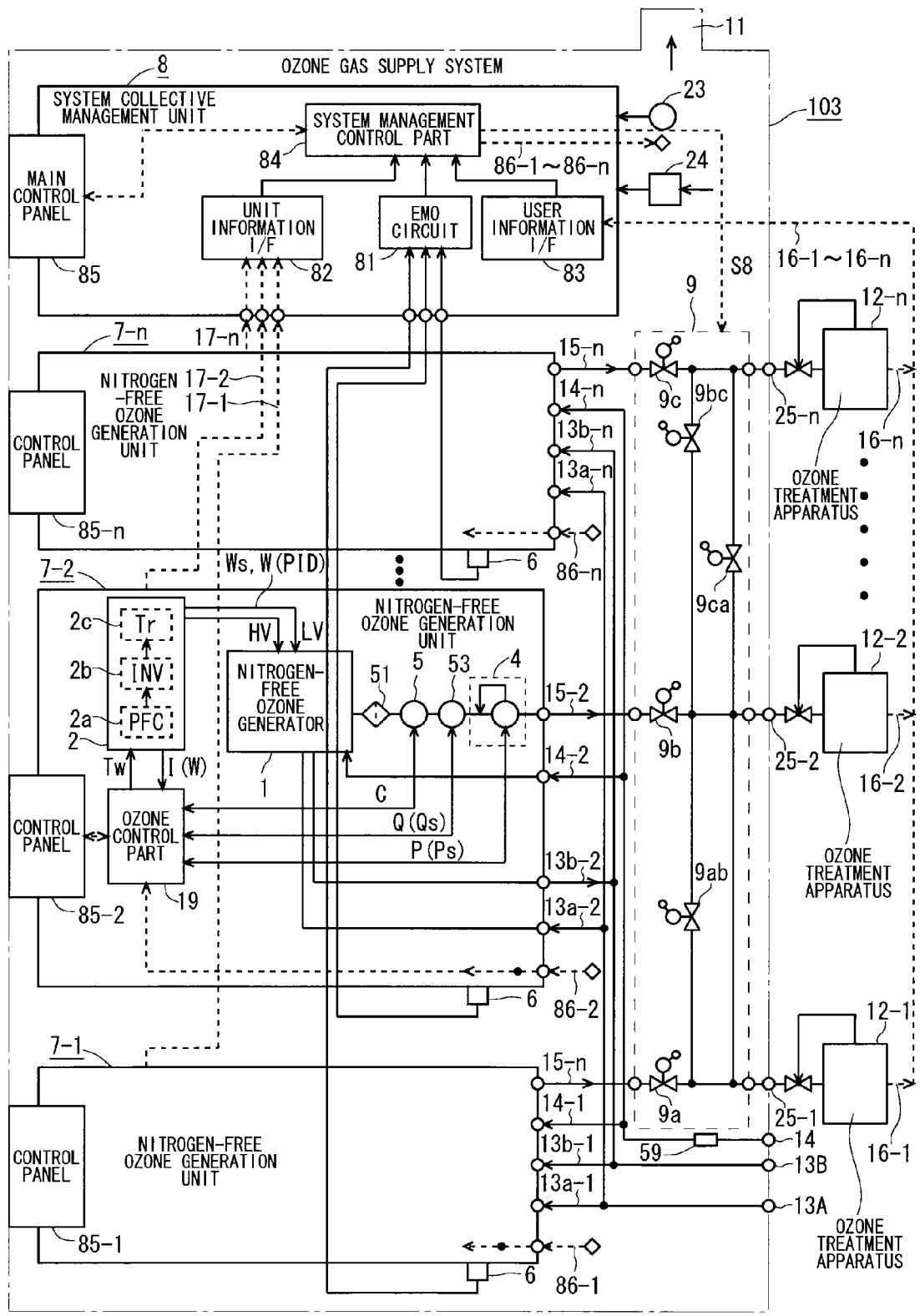
FIG. 20 A block diagram showing a configuration of an ozone gas supply system according to an embodiment 6 of the present invention.

FIG. 20 is a block diagram showing a configuration of an ozone gas supply system according to an embodiment 6 of the present invention. As shown in FIG. 17, an ozone gas supply system 103 is additionally provided with one super-high purity moisture remover 59 such that the one super-high purity moisture remover 59 is shared among the nitrogen-free ozone generation units 7-1 to 7-n. The one super-high purity moisture remover 59 has a function for trapping, with a super-high purity, a small amount of moisture contained in the raw material gas supplied from the raw material gas supply port 14

Additionally, similarly to the embodiment 4 shown in FIG. 16, a configuration (not shown) in which the super-high purity moisture removers 59-1 to 59-n are provided near the raw material gas supply ports 14-1 to 14-n of the ozone generation units 7-1 to 7-n may be adopted.

Figure 21:
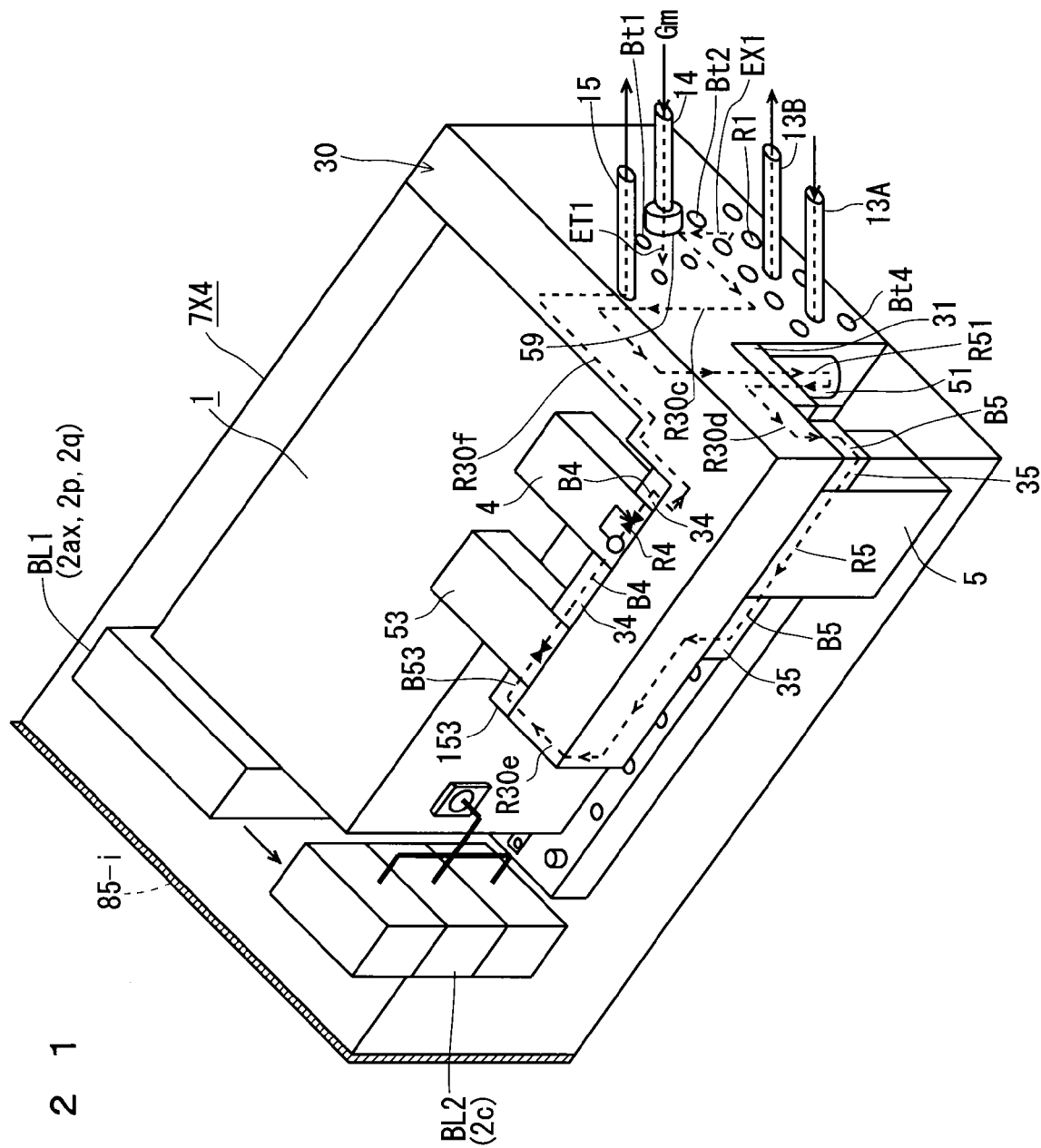
FIG. 21 A perspective view schematically showing a combined structure of a nitrogen-free ozone generation unit according to the embodiment 6.

In this case, as shown in FIG. 21, the raw material gas supply port 14 and the super-high purity moisture remover 59 (any of the super-high purity moisture removers 59-1 to 59-n) are provided in series in the ozone generator input part ET1. That is, as shown in FIG. 21, there is obtained an ozone generation unit 7X4 having a gas pipe integrated block structure in which the raw material gas pipe (the raw material gas supply port 14+the moisture removal filter 59) and the output gas pipe system (ozone gas output port 15) are integrated into the gas pipe integrated block 30.

Embodiment 7

Figure 22:
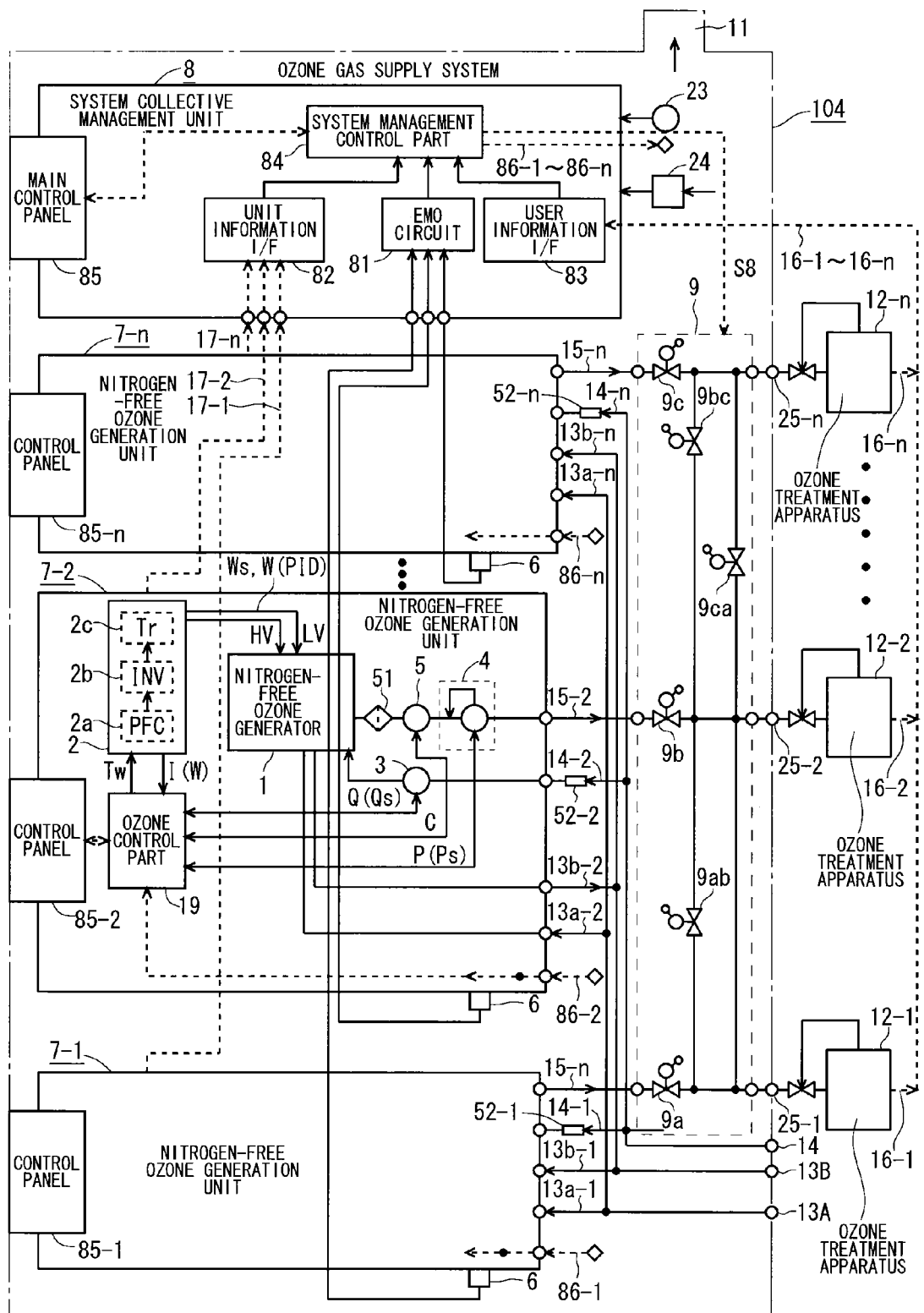
FIG. 22 A block diagram showing a configuration of an ozone gas supply system according to an embodiment 7 of the present invention.

FIG. 22 is a block diagram showing a configuration of an ozone gas supply system according to an embodiment 7 of the present invention.

In an ozone gas supply system 104 of an embodiment 7, gas filters 52-1 to 52-n (for the raw material gas) are provided for the purpose of trapping impurities, an impurity gas, or moisture contained in the raw material gas that is supplied through the raw material gas supply port 14. However, the gas filters 52-1 to 52-n are provided in one-to-one correspondence with the ozone generation units 7-1 to 7-n, and provided near the inlet portions of the raw material gas supply parts of the ozone generation units 7-1 to 7-n. Each of the gas filters 52-1 to 52-n increases the purity of the raw material gas supplied to each of the ozone generation units 7-1 to 7-n, so that the purity of the ozone gas generated in the ozone gas supply system 105 is increased.

Particularly, in the ozone generation units 7-1 to 7-n of the embodiment 7, similarly to the embodiment 2, the gas filter 52 for trapping impurities, an impurity gas, or moisture contained in the gas is mounted to the raw material gas inlet portion of one unit of the ozone generation unit 7, and thus downsizing of the ozone generation unit 7 is achieved by the combined structure.

(Management of Gas Purity of Raw Material Gas)

Figure 23:
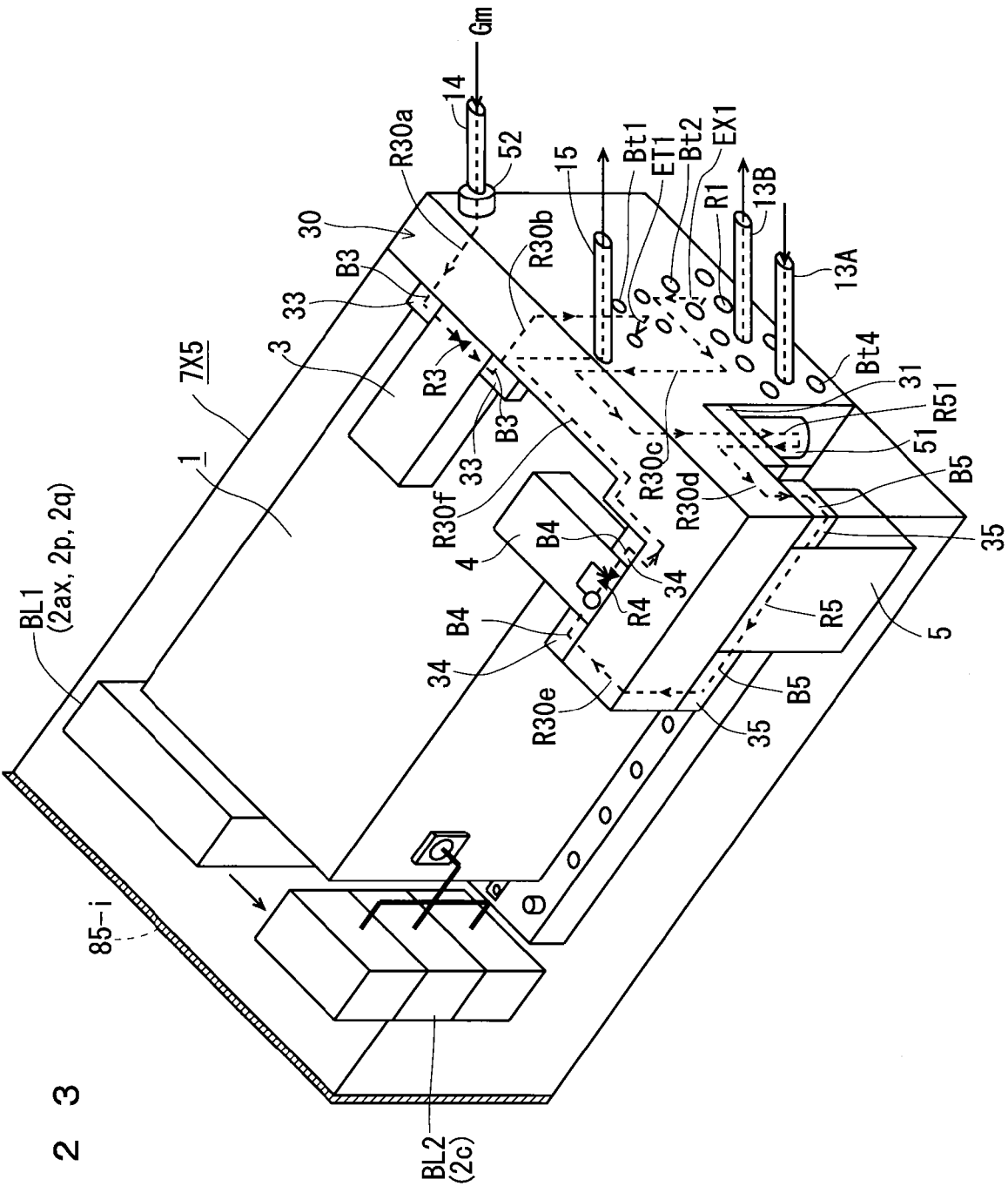
FIG. 23 A perspective view schematically showing a combined structure of a nitrogen-free ozone generation unit according to the embodiment 7.

FIG. 23 is a perspective view schematically showing a combined structure of an ozone generation unit 7X5 as one unit according to the embodiment 7.

As shown in FIGS. 22 and 23, the gas filter 52 (52-1 to 52-n) is mounted at a position that allows easy replacement and in connection with the raw material gas inlet ports 14-1 to 14-n of the ozone generation units 7-1 to 7-n, and integrally formed. In the following, for convenience of the description, a case of n=3 will be described as an example, with reference to FIG. 20.

Figure 25:
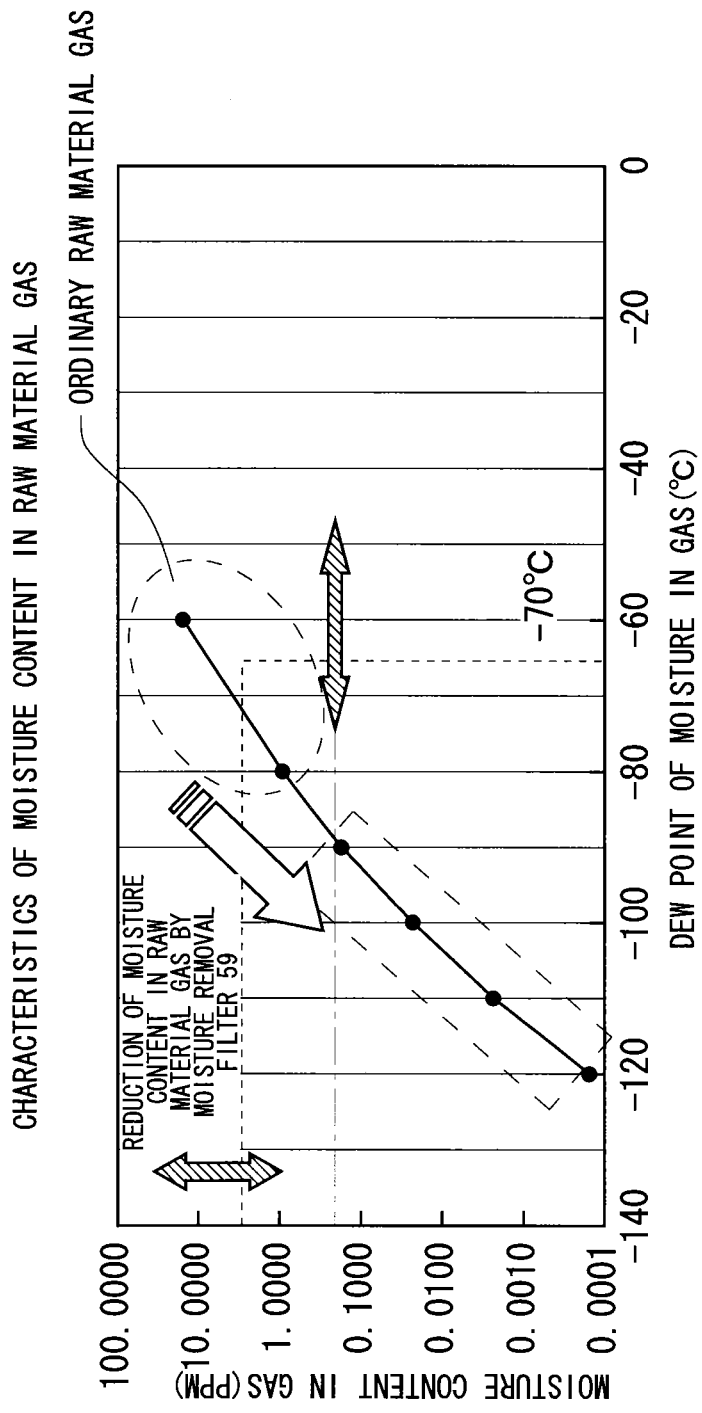
FIG. 25 An explanatory diagram showing the relationship between a dew point of a raw material gas and a moisture content in the raw material gas.
Figure 26:
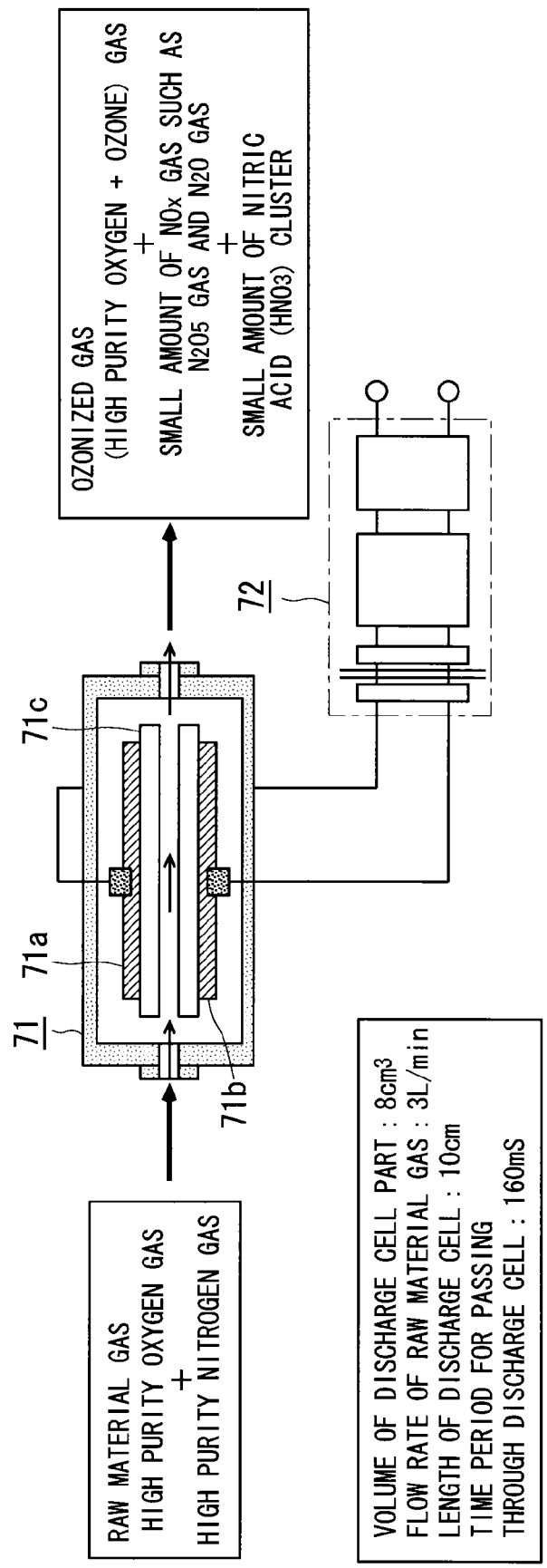
FIG. 26 A diagram showing a configuration of a conventional ozone generator, which is illustrated as a reference example.
Figure 27:
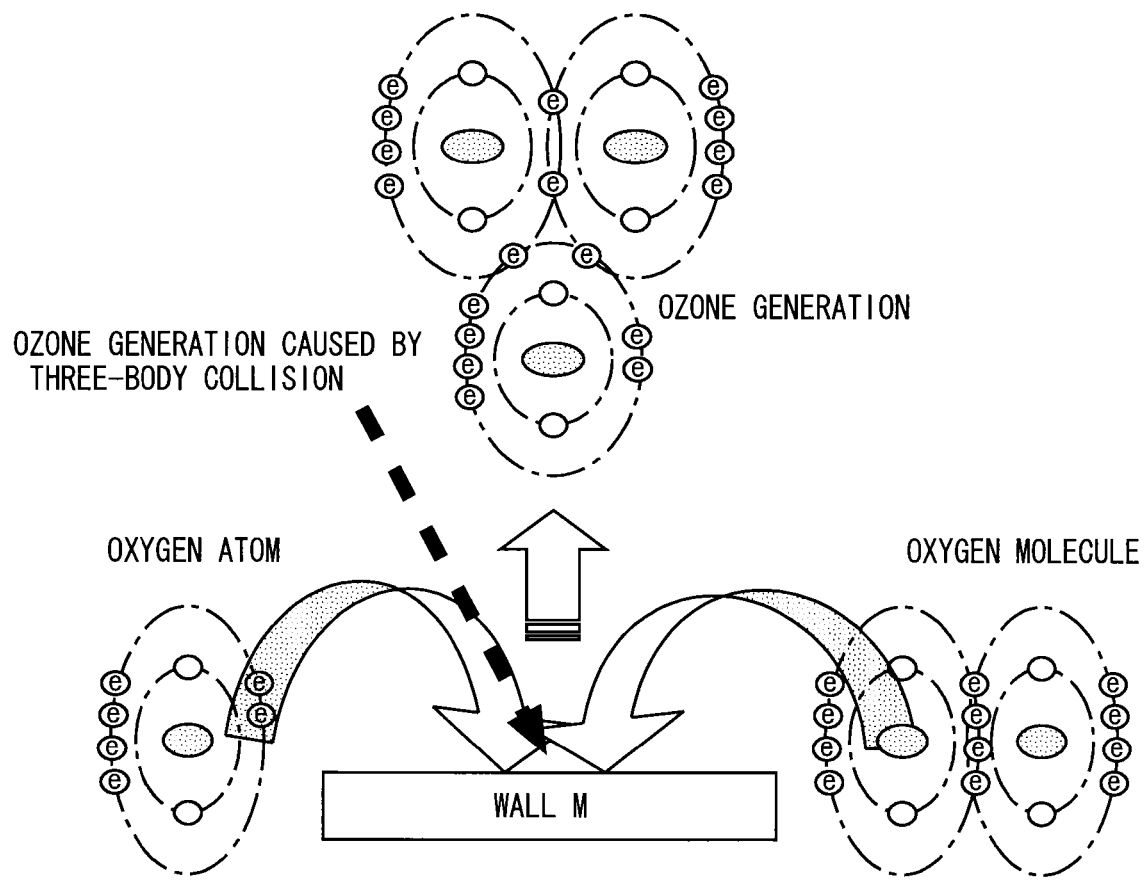
FIG. 27 An explanatory diagram schematically showing, as a reference example, details of ozone generation that is achieved by a conventional ozone generator in combination with a raw material oxygen gas containing added nitrogen.

FIG. 25 is an explanatory diagram showing the relationship between the dew point of the raw material gas and the moisture content in the raw material gas. As the raw material gas that is supplied to the ozone gas supply system 10, in general, a raw material gas having a high purity of 99.99% or higher is used. This high-purity raw material gas contains, in addition to the raw material gas, an impurity gas of about 0.1 to several ppm. Examples of the impurity gas include a nitrogen-based gas, a carbon-based gas, and a sulfide gas. The high-purity raw material gas also contains moisture of one to several ppm (see FIG. 25).

Additionally, these impurity gas and moisture are contained in the air, too. Therefore, when a part of the pipes in the raw material gas pipe path is opened to the air, the moisture and the impurity gas such as a nitrogen gas are immediately adsorbed to a pipe surface. If the raw material gas flows in the raw material gas pipe to which the impurity gas is adsorbed, not only the impurity gas and the moisture contained in the high-purity raw material gas but also the impurity gas adhering to the pipe are separated by the gas flow, which may lower the purity of the supplied raw material gas.

If moisture or an impurity gas such as a nitrogen-based gas, a carbon-based gas, or a sulfide gas is contained in the raw material gas, not only the ozone gas but also N radical and OH radical gases are generated by discharging. These radical gases are combined with the moisture, thus outputting the ozone gas that contains cluster molecule gases of nitric acid and hydrogen peroxide water.

Since these cluster molecule gases of nitric acid and hydrogen peroxide water are very active gases, a chemical reaction occurs on a metal surface of the ozone-gas output gas pipe, the valve, or the like, to cause corrosion of the pipe surface. This may cause a corroded-metal impurity (metal contamination) to be contained in the output ozone gas.

An increase in the amount of the metal impurity (metal contamination) contained in the output ozone gas causes a deterioration in the performance of formation of, for example, an oxide film that is formed on a semiconductor by an oxide film process using the ozone gas.

From the above, it has been confirmed from tests that the quality of an output ozone gas is deteriorated if an impurity gas or moisture is contained in the raw material gas. Accordingly, the gas filters for the purpose of trapping the impurity gas or moisture are mounted to a raw material gas supply part. Particularly, in the embodiment 7, in the raw material gas inlet ports 14-1 to 14-n of the ozone generation units 7-1 to 7-n, the gas filters 52-1 to 52-n are mounted at positions that allow easy replacement, so that the impurity gas or moisture are removed.

In this configuration, one gas filter 52-1 to 52-n is provided. However, depending on a type of the impurity gas, a plurality of gas filters may be provided in series and at multiple stages, or an impurity gas filter and a moisture trapping gas filter may be provided in series and at multiple stages.

The other parts, pipe paths, and the like, of the configuration are identical to those of the ozone generation unit 7X2 shown in FIG. 14, except that the gas filter 52 replaces the super-high purity moisture remover 59. Therefore, a description thereof is omitted.

As shown in FIG. 23, a raw material gas pipe (the raw material gas supply port 14+the gas filter 52) and an output gas pipe system (ozone gas output port 15) are integrated into a gas pipe integrated block 30 as a gas pipe integrated block structure. Thereby, the ozone generator 1, the ozone power source 2, and the gas pipe system are packaged, and thus the ozone generation unit 7X5 can be further downsized. The raw material gas supply port 14 and the gas filter 52 are coupled to each other.

Similarly to the embodiment 7, at the raw material gas supply port 14 provided at a rear surface of the nitrogen-free ozone generation units 7-1 to 7-n, the gas filter 52 (gas filters 52-1 to 52-n) is mounted at a position that allows easy replacement. As a result, the ozone gas having a higher purity is provided, and additionally, the mounted gas filter 52 can remove the impurity gas. This exerts an effect that a time during which a purge gas is flowed prior to generation of the ozone gas can be considerably shortened.

<Others>

In the embodiments 1 to 7 above, the description has been give to the system for supplying the ozone gas with a predetermined ozone flow rate and a predetermined ozone concentration in an ozone-gas multi-processing apparatus for use in a semiconductor manufacturing apparatus that requires an ozone treatment apparatus capable of generating about several tens to 500 g/h ozone.

Instead of the ozone treatment apparatus 12 described above, an ozone-bleaching apparatus for pulp, an ozone treatment apparatus for pool water, an ozone treatment apparatus for clean and sewage water, and an ozone treatment apparatus for a chemical plant, which require a larger amount of ozone gas, may be adopted. For example, in a case of a processing apparatus that requires one to several kg/h ozone gas, a plurality of nitrogen-free ozone generation units 7-1 to 7-n are installed in the ozone gas supply system 10 (101 to 104) described above, and output ozone gases of the nitrogen-free ozone generation units 7-1 to 7-n are collectively supplied to one ozone treatment apparatus. This exerts an effect that the process can be easily performed at a relatively low cost and excellent maintainability is obtained. Therefore, the field of application of the ozone gas supply system is expanded.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The present invention relates to a nitrogen-free ozone generation unit provided with a function having a plurality of means for supplying an ozone gas, and an ozone gas supply system for supplying the ozone gas to a plurality of ozone treatment apparatuses. An object of the present invention is to achieve downsizing of the nitrogen-free ozone generation unit provided with a function having a plurality of means for outputting an ozone gas. However, obviously, also in a gas generation unit for a gas other than the ozone gas and a gas supply system for supplying the generated gas other than the ozone gas to a plurality of gas processing apparatuses, it is preferable to integrate and downsize a gas generator unit provided with a function having a plurality of means for outputting a gas, and build a gas generation system having a plurality of gas generation units installed therein.

The invention claimed is:

1. A nitrogen-free ozone generation unit that supplies, to an ozone treatment apparatus, an ozone gas having been set to a predetermined supply flow rate and a predetermined concentration, said nitrogen-free ozone generation unit comprising:
 a nitrogen-free ozone generator for generating an ozone gas, in which a photocatalytic material for generating ozone is applied to a discharge surface;
 an ozone power source for controlling power that is supplied to said nitrogen-free ozone generator;
 a controller associated with said ozone generator, said controller including at least two of
  a flow-rate-detector/flow-rate-adjuster including a mass flow controller (MFC) for controlling a flow rate of a raw material gas that is inputted to said nitrogen-free ozone generator,
  a gas filter for processing an ozone gas outputted from said nitrogen-free ozone generator so as to remove an impurity and a foreign substance therefrom,
  a pressure-detector/pressure-adjuster including an automatic pressure controller (APC) for automatically controlling internal pressure that is pressure within said nitrogen-free ozone generator, and
  an ozone concentration detector including an ozone concentration meter for detecting an ozone concentration value of the ozone gas outputted from said nitrogen-free ozone generator;
 a raw material gas supply port for supplying the raw material gas from outside to said nitrogen-free ozone generator;
 an ozone gas output port for outputting, to the outside, an ozone gas obtained from said nitrogen-free ozone generator through at least part of said controller; and
 cooling water inlet/outlet ports for supplying cooling water obtained from the outside to said nitrogen-free ozone generator and discharging said cooling water from said nitrogen-free ozone generator, said nitrogen-free ozone generation unit comprising:
a control panel having a front surface and a back surface, wherein
said control panel is arranged at a front surface of said nitrogen-free ozone generation unit;
said ozone power source is arranged on said back surface of said control panel;
said ozone generator is arranged at the back of said ozone power source so as to arrange said raw material gas supply port, said ozone gas output port and said cooling water inlet/outlet ports in a back surface side of said nitrogen-free ozone generation unit;
said raw material gas supply port, said flow-rate-detector/flow-rate-adjuster connected to said ozone gas output port, said gas filter, said pressure-detector/pressure adjuster and said ozone concentration detector are arranged at a back portion and an upper portion, or at a side surface of said back portion, of said ozone generator;
said raw material gas supply port, said ozone gas output port, and said cooling water inlet/outlet ports are arranged so as to be connectable to said back surface of said nitrogen-free ozone generation unit, and
said nitrogen-free ozone generation unit being formed as an integrated structure in which said nitrogen-free ozone generator, said ozone power source, said controller, said raw material gas supply port, said ozone gas output port, and said cooling water inlet/outlet ports are assembled together.

2. The nitrogen-free ozone generation unit according to claim 1, further comprising
a super-high purity moisture remover for removing a small amount of moisture contained in said raw material gas that is supplied from said raw material gas supply port and then supplying said raw material gas to said nitrogen-free ozone generation unit, wherein
said nitrogen-free ozone generation unit is formed as the integrated structure in which said super-high purity moisture remover is also assembled together.

3. The nitrogen-free ozone generation unit according to claim 1, further comprising
a raw material gas filter for removing an impurity gas contained in said raw material gas that is supplied from said raw material gas supply port and then supplying said raw material gas to said nitrogen-free ozone generation unit, wherein
said nitrogen-free ozone generation unit is formed as the integrated structure in which said raw material gas filter is also assembled together.

4. The nitrogen-free ozone generation unit according to claim 1, comprising
an ozone control part for performing an initial operation of said ozone power source in which said ozone power source is driven with a predetermined set power amount (Ws), and after the elapse of a predetermined time period, performing a Proportional-Integral-Derivative (PID) control on power supplied by said ozone power source based on comparison between an ozone concentration (C) detected by said ozone concentration meter and an ozone concentration (Cs) that has been set.

5. The nitrogen-free ozone generation unit according to claim 1,
said controller including said flow-rate-detector/flow-rate-adjuster, said gas filter, said pressure-detector/pressure-adjuster, and said ozone concentration detector,
said nitrogen-free ozone generation unit further comprising
a gas pipe integrated block to which each of said nitrogen-free ozone generator, said flow-rate-detector/flow-rate-adjuster, said gas filter, said pressure-detector/pressure-adjuster, said ozone concentration detector, said raw material gas supply port, said ozone gas output port, and said cooling water inlet/outlet ports is mounted in close contact, wherein
said gas pipe integrated block has a plurality of internal pipe paths,
said plurality of internal pipe paths are connected to said ozone generator, said flow-rate-detector/flow-rate-adjuster, said gas filter, said pressure-detector/pressure-adjuster, said ozone concentration detector, said raw material gas supply port, and said ozone gas output port, to thereby form a raw material gas input pipe path and an ozone gas output pipe path, said raw material gas input pipe path extends from said raw material gas supply port through said flow-rate-detector/flow-rate-adjuster to said nitrogen-free ozone gas generator, and said ozone gas output pipe path extends from said nitrogen-free ozone generator through said gas filter, said ozone concentration detector, and said pressure-detector/pressure-adjuster, to said ozone gas output port.

6. An ozone gas supply system that supplies, to a plurality of ozone treatment apparatuses, an ozone gas having been set to a predetermined supply flow rate and a predetermined concentration, said ozone gas supply system including
a plurality of nitrogen-free ozone generation units, each of said plurality of ozone generation units including the nitrogen-free ozone generation unit that supplies, to an ozone treatment apparatus, an ozone gas having been set to a predetermined supply flow rate and a predetermined concentration,
said nitrogen-free ozone generation unit comprising:
a nitrogen-free ozone generator for generating an ozone gas, in which a photocatalytic material for generating ozone is applied to a discharge surface;
an ozone power source for controlling power that is supplied to said nitrogen-free ozone generator;
a controller associated with said ozone generator, said controller including
a flow-rate-detector/flow-rate-adjuster including a mass flow controller (MFC) for controlling a flow rate (Q) of a raw material gas that is inputted to said nitrogen-free ozone generator,
a gas filter for processing an ozone gas outputted from said nitrogen-free ozone generator so as to remove an impurity and a foreign substance therefrom,
a pressure-detector/pressure-adjuster including an automatic pressure controller (APC) for automatically controlling internal pressure that is pressure within said nitrogen-free ozone generator, and
an ozone concentration detector including an ozone concentration meter for detecting an ozone concentration value of the ozone gas outputted from said nitrogen-free ozone generator;
a raw material gas supply port for supplying the raw material gas from outside to said nitrogen-free ozone generator;
an ozone gas output port for outputting, to the outside, an ozone gas obtained from said nitrogen-free ozone generator through at least part of said controller; and
cooling water inlet/outlet ports for supplying cooling water obtained from the outside to said nitrogen-free ozone generator and discharging said cooling water from said nitrogen-free ozone generator, said nitrogen-free ozone generation unit comprising:
a control panel having a front surface and a back surface, wherein
said control panel is arranged at a front surface of said nitrogen-free ozone generation unit;
said ozone power source is arranged on said back surface of said control panel;
said ozone generator is arranged at the back of said ozone power source so as to arrange said raw material gas supply port, said ozone gas output port and said cooling water inlet/outlet ports in a back surface side of said nitrogen-free ozone generation unit;
said raw material gas supply port, said flow-rate-detector/flow-rate-adjuster connected to said ozone gas output port, said gas filter, said pressure-detector/pressure adjuster and said ozone concentration detector are arranged at a back portion and an upper portion, or at a side surface of said back portion, of said ozone generator;
said raw material gas supply port, said ozone gas output port, and said cooling water inlet/outlet ports are arranged so as to be connectable to said back surface of said nitrogen-free ozone generation unit, and
said nitrogen-free ozone generation unit being formed as an integrated structure in which said nitrogen-free ozone generator, said ozone power source, said controller, said raw material gas supply port, said ozone gas output port, and said cooling water inlet/outlet ports are assembled together,
said nitrogen-free ozone generation unit further comprising:
a gas pipe integrated block to which each of said nitrogen-free ozone generator, said flow-rate-detector/flow-rate-adjuster, said gas filter, said pressure-detector/pressure-adjuster, said ozone concentration detector, said raw material gas supply port, said ozone gas output port, and said cooling water inlet/outlet ports is mounted in close contact, wherein
said gas pipe integrated block has a plurality of internal pipe paths,
said plurality of internal pipe paths are connected to said ozone generator, said flow-rate-detector/flow-rate-adjuster, said gas filter, said pressure-detector/pressure-adjuster, said ozone concentration detector, said raw material gas supply port, and said ozone gas output port, to thereby form a raw material gas input pipe path and an ozone gas output pipe path, said raw material gas input pipe path extends from said raw material gas supply port through said flow-rate-detector/flow-rate-adjuster to said nitrogen-free ozone gas generator, and said ozone gas output pipe path extends from said nitrogen-free ozone generator through said gas filter, said ozone concentration detector, and said pressure-detector/pressure-adjuster, to said ozone gas output port, said ozone gas supply system further comprising:
an ozone gas output flow rate management unit configured to receive a plurality of ozone gas outputs from a plurality of said nitrogen-free ozone generators in said plurality of nitrogen-free ozone generation units, and capable of performing an ozone gas output flow rate control for selectively outputting one or a combination of two or more of said plurality of ozone gas outputs to any of said plurality of ozone treatment apparatuses by performing an opening/closing operation on a plurality of ozone gas control valves provided in said ozone gas output flow rate management unit; and
an ozone gas output flow rate management unit control part for, based on a process ozone gas event signal supplied from said plurality of ozone treatment apparatuses, controlling said ozone gas output of each of said plurality of nitrogen-free ozone generation units and causing said ozone gas output flow rate management unit to control said ozone gas output flow rate.

7. The ozone gas supply system according to claim 6, wherein
said plurality of ozone gas control valves include an electrically-operated valve or a pneumatic valve that is openable and closable with electricity or air pressure and
said ozone gas output flow rate management unit control part outputs said control signal such that an ozone flow rate and an ozone concentration of the ozone gas supplied to each of said plurality of ozone treatment apparatuses have desired values.

8. The ozone gas supply system according to claim 6, wherein
said ozone gas output flow rate management unit further comprises a plurality of ozone gas control valve accommodation parts corresponding to said plurality of ozone gas control valves, respectively,
each of said plurality of ozone gas control valves is provided in each corresponding one of said ozone gas control valve accommodation parts,
each of said plurality of ozone gas control valve accommodation parts is mounted in tight contact with said gas pipe integrated block of each corresponding one of said nitrogen-free ozone generation units, and is interposed on said ozone gas output pipe path.

* * * * *